US00RE38790E

(19) United States
(12) Reissued Patent
Maeda et al.

(10) Patent Number: US RE38,790 E
(45) Date of Reissued Patent: Sep. 6, 2005

(54) POWER OUTPUT APPARATUS, METHOD OF CONTROLLING POWER OUTPUT APPARATUS, AND DRIVING SYSTEM WITH POWER OUTPUT APPARATUS INCORPORATED THEREIN

(75) Inventors: Tomoharu Maeda, Toyota (JP); Yoshihide Nii, Anjo (JP); Shoichi Sasaki, Okazaki (JP); Takeshi Kotani, Nisshin (JP); Eiji Yamada, Owariasahi (JP); Yasutomo Kawabata, Aichi-ken (JP)

(73) Assignee: Toyota Jidosha Kabushiki Kaisha, Toyota (JP)

(21) Appl. No.: 10/191,281

(22) PCT Filed: Oct. 28, 1996

(86) PCT No.: PCT/JP96/03157

§ 371 (c)(1),
(2), (4) Date: May 5, 1998

(87) PCT Pub. No.: WO97/18101

PCT Pub. Date: May 22, 1997

Related U.S. Patent Documents

Reissue of:
(64) Patent No.: 6,087,734
Issued: Jul. 11, 2000
Appl. No.: 09/068,208
Filed: May 5, 1998

(30) Foreign Application Priority Data

Nov. 14, 1995 (JP) ..... 7-321060
Jun. 26, 1996 (JP) ..... 8-186736

(51) Int. Cl.[7] ..... F02N 11/06

(52) U.S. Cl. ..... 290/40 C; 322/16; 318/140; 180/65.2

(58) Field of Search ..... 290/40 C, 40 B; 322/16, 14, 15; 318/77, 9, 140; 180/65.2

(56) References Cited

U.S. PATENT DOCUMENTS

| | | | | |
|---|---|---|---|---|
| 3,683,249 | A | 8/1972 | Shibata | 318/205 |
| 3,789,281 | A | 1/1974 | Shibata | 318/696 |
| 5,621,304 | A | 4/1997 | Kiuchi et al. | 322/18 |
| 5,650,713 | A | 7/1997 | Takeuchi et al. | 322/16 |
| 5,791,426 | A | 8/1998 | Yamada et al. | 180/65.2 |
| 5,801,497 | A | 9/1998 | Shamoto et al. | 318/139 |
| 5,804,934 | A | 9/1998 | Yamada et al. | 318/77 |

(Continued)

FOREIGN PATENT DOCUMENTS

| | | |
|---|---|---|
| EP | 0 725 474 A1 | 8/1996 |
| JP | 49-043311 | 4/1974 |
| JP | 50-30223 | 3/1975 |
| JP | 51-22132 | 7/1976 |
| JP | 53-133814 | 11/1978 |
| JP | 55-1030100 | 8/1980 |
| JP | 7-135701 | 5/1995 |

*Primary Examiner*—Nicholas Ponomarenko
(74) *Attorney, Agent, or Firm*—Oliff & Berridge, PLC

(57) ABSTRACT

A power output apparatus 20 includes a clutch motor, an assist motor, and a controller. The clutch motor and the assist motor are controlled by the controller to enable the power output from an engine to a crankshaft 56, and expressed as the product of its revolving speed and torque, to be converted to the power expressed as the product of a revolving speed and a torque of a drive shaft and to be output to the drive shaft. The engine can be driven at an arbitrary driving point defined by a revolving speed and a torque, as long as the energy or power output to the crankshaft is identical. A desired driving point that attains the highest possible efficiency with respect to each amount of output energy is determined in advance. In order to allow the engine to be driven at the desired driving point, the controller controls the clutch motor and the assist motor as well as the fuel injection and the throttle valve position. Such control procedures of the power output apparatus enhance the energy efficiency of the whole power output apparatus.

96 Claims, 36 Drawing Sheets

U.S. PATENT DOCUMENTS 5,818,116 A 10/1998 Nakae et al. ..... 290/38 R
5,903,113 A 5/1999 Yamada et al. ..... 318/10
5,905,346 A 5/1999 Yamada et al. ..... 318/50
5,909,094 A 6/1999 Yamada et al. ..... 318/140
5,914,575 A 6/1999 Sasaki ..... 318/150
5,917,248 A 6/1999 Seguchi et al. ..... 290/31
5,920,160 A 7/1999 Yamada et al. ..... 318/9
5,935,040 A 8/1999 Tabata et al. ..... 477/3
5,936,312 A 8/1999 Koide et al. ..... 290/40 R
5,942,862 A 8/1999 Yamada et al. ..... 318/9

POWER OUTPUT APPARATUS, METHOD OF CONTROLLING POWER OUTPUT APPARATUS, AND DRIVING SYSTEM WITH POWER OUTPUT APPARATUS INCORPORATED THEREIN

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a power output apparatus, a method of controlling a power output apparatus, and a driving system with a power output apparatus incorporated therein. More concretely, the present invention pertains to a power output apparatus for outputting power generated by an engine to a drive shaft at a high efficiency and a method of controlling such a power output apparatus, as well as a driving system with such a power output apparatus incorporated therein.

2. Description of Related Art

In known power output apparatuses mounted on a vehicle, an output shaft of an engine is electromagnetically linked with a drive shaft, which connects with a rotor of a motor, by means of an electromagnetic coupling, so that power of the engine is transmitted to the drive shaft (as disclosed in, for example, JAPANESE PATENT LAYING-OPEN GAZETTE No. 53-133814). The electromagnetic coupling of the power output apparatus transmits part of the power output from the engine as a torque to the drive shaft via electromagnetic connection, and supplies electric power regenerated by sliding motions of the electromagnetic coupling to the motor and secondary cells, which are connected in parallel with the electromagnetic coupling. When the torque transmitted to the drive shaft by means of the electromagnetic coupling is insufficient, the motor applies an additional torque to the drive shaft with the electric power regenerated by the electromagnetic coupling or the electric power released from the secondary cells. The motor works as a generator when a braking force is applied to the drive shaft, so as to regenerate the energy of rotational motion of the drive shaft as electrical energy and store the regenerated electrical energy in the secondary cells.

In the conventional power output apparatuses, however, problems, such as an extremely low energy efficiency of the whole apparatus or an extremely poor emission, arise in some cases. The power output apparatus can implement torque conversion of all the power output from the engine with the electromagnetic coupling and the motor and output the converted power to the drive shaft. The electromagnetic coupling and the motor carry out energy conversion of the power or energy expressed as the product of the torque and the revolving speed of the engine into the power or energy expressed as the product of the torque and the revolving speed of the drive shaft under the condition of constant energy on the assumption that the conversion efficiency is an ideal state (that is, the value '1'), the object of torque conversion is to make the power output from the engine equal to the power output to the drive shaft. The engine may accordingly be driven at any driving point (defined by the revolving speed and the torque) that can output energy identical with the power. Without the active control of the driving point of the engine, this often causes the engine to be driven at driving points of low energy efficiency or poor emission.

SUMMARY OF THE INVENTION

One object of the present invention is thus to provide a power output apparatus and a method of controlling the same that enhance the energy efficiency of the whole power output apparatus.

Another object of the present invention is to provide a power output apparatus and a method of controlling the same that improve the emission.

Still another object is to provide a power output apparatus and a method of controlling the same that enable the engine to be smoothly shifted to a new driving point with a variation in power to be output to the drive shaft.

Further object is to provide a driving system that prevents the driving system itself or a power output apparatus or any other equipment incorporated in the driving system from resonating due to an operation of the engine in the power output apparatus.

At least part of the above objects is realized by a first power output apparatus for outputting power to a drive shaft. The first power output apparatus includes: an engine having an output shaft; energy adjustment means having a first shaft connected with the output shaft of the engine and a second shaft connected with the drive shaft, the energy adjustment means adjusting a difference in energy between power input into or output from the first shaft and power input into or output from the second shaft by regulating input and output of corresponding electrical energy; a drive motor, wherein power is transmitted between the drive motor and the drive shaft; target power setting means for setting a target power output to the drive shaft; driving state setting means for setting a target driving state of the engine that outputs energy corresponding to the target power set by the target power setting means, based on a predetermined condition; and control means for controlling the engine, so as to enable the engine to be driven in the target driving state set by the driving state setting means, and for controlling the energy adjustment means and the drive motor, so as to enable power output from the engine to be subjected to torque conversion and output as the target power to the drive shaft.

The first power output apparatus of the invention enables the engine to be driven in the target driving state that has been set based on the predetermined condition, among the available driving states which can output energy corresponding to the target power.

In the first power output apparatus, the predetermined condition used for setting the target driving state may be a condition for enhancing an energy efficiency of the engine that outputs energy corresponding to the target power. This condition enhances the energy efficiency of the engine. The predetermined condition may also be a condition for enhancing a comprehensive efficiency, which is calculated by multiplying an energy efficiency of the engine that outputs energy corresponding to the target power by a transmission efficiency of the energy adjustment means and the drive motor when the power output from the engine is subjected to torque conversion and output to the drive shaft. This condition enhances the efficiency of the whole power output apparatus. The predetermined condition may otherwise be a condition for continuously varying a driving state of the engine with a variation in target power. This condition allows the engine to smoothly shift its driving state with a variation in target power.

In accordance with one aspect of the present invention, the energy adjustment means of the first power output apparatus may be constructed as a twin-rotor motor comprising a first rotor connected with the first shaft and a second rotor connected with the second shaft, the second rotor being rotatable relative to the first rotor, whereby power is transmitted between the first shaft and the second shaft via an electromagnetic coupling of the first rotor with the second rotor, the twin-rotor motor inputting and outputting electrical energy based on the electromagnetic coupling of the first rotor with the second rotor and a difference in revolving speed between the first rotor and the second rotor.

In the first power output apparatus including the twin-rotor motor as the energy adjustment means, the drive motor may include the second rotor included in the twin-rotor motor and a stator for rotating the second rotor. This effectively reduces the size of the whole power output apparatus.

In accordance with another aspect of the present invention, the energy adjustment means of the first power output apparatus may be constructed as: three-shaft-type power input and output means connected with the first shaft, the second shaft, and a third shaft, the three-shaft-type power input and output means for, when powers input into or output from any two shafts among the three different shafts are determined, automatically setting a power input into or output from a residual shaft based on the powers thus determined; and a shaft motor connected with the third shaft, wherein power is transmitted between the third shaft and the shaft motor.

In accordance with another aspect of the present invention, the first power output apparatus further includes driving state detecting means for detecting a driving state of the engine. The control means further has means for controlling the energy adjustment means, so as to enable the engine to be driven in the target driving state, based on the driving state of the engine detected by the driving state detecting means. This structure ensures the operation of the engine in the target driving state.

In accordance with another aspect of the present invention, the first power output apparatus further includes driving state detecting means for detecting a driving state of the engine. The control means further has tentative target driving state setting means for, when a state deviation of the driving state detected by the driving state detecting means from the target driving state is out of a predetermined range, selecting a driving state within the predetermined range based on the state deviation and the predetermined condition and setting the selected driving state as a tentative target driving state. The tentative target driving state set by the tentative target driving state setting means is used in place of the target driving state for operation control of the engine and control of the energy adjustment means and the drive motor, until the state deviation enters the predetermined range. Even when the newly set target driving state has a large state deviation, this structure enables the engine to stably approach to and eventually reach the target driving state. This effectively prevents the engine from stalling or stopping the revolutions of its output shaft due to the large state deviation.

In the first power output apparatus wherein the control means has the tentative target driving state setting means, it is preferably that the tentative target driving state setting means further includes predetermined range setting means for setting the predetermined range based on the driving state detected by the driving state detecting means. This structure enables the requirement or non-requirement for setting the tentative target driving state to be determined according to the driving state of the engine.

In the first power output apparatus wherein the control means has the tentative target driving state setting means, the control means may further include means for controlling the energy adjustment means, so as to enable the engine to be driven in the target driving state, based on the driving state detected by the driving state detecting means, when the state deviation is within the predetermined range. This structure further ensures the operation of the engine in the target driving state when the state deviation is within the predetermined range.

In accordance with one aspect of the present invention, the first power output apparatus, wherein the control means has the tentative target driving state setting means, further includes storage battery means being charged with electrical energy taken out of the energy adjustment means, being charged with electrical energy taken out of the drive motor, being discharged to release electrical energy used in the energy adjustment means, and being discharged to release electrical energy used in the drive motor. The control means further has means for, when the tentative target driving state is used in place of the target driving state for the operation control of the engine and the control of the energy adjustment means and the drive motor, utilizing the electrical energy stored into or released from the storage battery means and controlling the drive motor, so as to enable the drive motor to input or output a specific power into or from the drive shaft, the specific power corresponding to an energy difference between the target power and the power output from the engine that is driven in the tentative target driving state. This structure enables the target power to be output to the drive shaft even, when there is a large difference between the actual driving state of the engine and the target driving state.

In the first power output apparatus, it is also preferable that the control means further includes: driving state estimating means for estimating a driving state of the engine when the target power setting means sets a different target power; and estimated-condition control means for controlling the energy adjustment means and the drive motor based on the estimated driving state of the engine. This structure enables the engine to smoothly shift to the target driving state. With a variation in target power, the first power output apparatus constructed as above can effectively implement torque conversion of the power output from the engine and output the converted power to the drive shaft with a high efficiency.

In the first power output apparatus wherein the control means has the driving state estimating means and the estimated-condition control means, it is further preferable that the driving state estimating means includes means for estimating the driving state of the engine based on a revolving speed of the output shaft of the engine and a state of the energy adjustment means.

In the first power output apparatus wherein the control means has the driving state estimating means and the estimated-condition control means, it is also preferable that the estimated-condition control means further has means for controlling the energy adjustment means and the drive motor, so as to enable an estimated power output from the engine corresponding to the driving state of the engine estimated by the driving state estimating means to be subjected to torque conversion and output as the target power to the drive shaft. This structure enables the power output from the engine to be subjected to torque conversion and to be output to the drive shaft, even in the transient period of varied target power.

In accordance with another aspect of the present invention, the first power output apparatus, wherein the control means has the driving state estimating means and the estimated-condition control means, further includes storage battery means being charged with electrical energy taken out of the energy adjustment means, being charged with electrical energy taken out of the drive motor, being discharged to release electrical energy used in the energy adjustment means, and being discharged to release electrical energy used in the drive motor. The estimated-condition control means has means for utilizing the electrical energy stored into or released from the storage battery means and controlling the drive motor, so as to enable the drive motor to input or output a specific power into or from the drive shaft, the specific power corresponding to an energy difference between the target power and the estimated power output from the engine corresponding to the driving state of the engine estimated by the driving state estimating means. Even when the engine is not driven in the target driving state in the transient period of varied target power, the target power can be thereby output to the drive shaft.

The present invention is also directed to a second power output apparatus for outputting power to a drive shaft. The second power output apparatus includes: an engine having an output shaft; energy adjustment means having a first shaft connected with the output shaft of the engine and a second shaft connected with the drive shaft, the energy adjustment means adjusting a difference in energy between power input into or output from the first shaft and power input into or output from the second shaft by regulating input and output of corresponding electrical energy; a drive motor, wherein power is transmitted between the drive motor and the output shaft of the engine; target power setting means for setting a target power output to the drive shaft; driving state setting means for setting a target driving state of the engine that outputs energy corresponding to the target power set by the target power setting means, based on a predetermined condition; and control means for controlling the engine, so as to enable the engine to be driven in the target driving state set by the driving state setting means, and for controlling the energy adjustment means and the drive motor, so as to enable power output from the engine to be subjected to torque conversion and output as the target power to the drive shaft.

The second power output apparatus of the invention enables the engine to be driven in the target driving state that has been set based on the predetermined condition, among the available driving states which can output energy corresponding to the target power.

In the second power output apparatus, the predetermined condition used for setting the target driving state may be a condition for enhancing an energy efficiency of the engine that outputs energy corresponding to the target power. This condition enhances the energy efficiency of the engine. The predetermined condition may also be a condition for enhancing a comprehensive efficiency, which is calculated by multiplying an energy efficiency of the engine that outputs energy corresponding to the target power by a transmission efficiency of the energy adjustment means and the drive motor when the power output from the engine is subjected to torque conversion and output to the drive shaft. This condition enhances the efficiency of the whole power output apparatus. The predetermined condition may otherwise be a condition for continuously varying a driving state of the engine with a variation in target power. This condition allows the engine to smoothly shift its driving state with a variation in target power.

In accordance with one aspect of the present invention, the energy adjustment means of the second power output apparatus may be constructed as a twin-rotor motor comprising a first rotor connected with the first shaft and a second rotor connected with the second shaft, the second rotor being rotatable relative to the first rotor, whereby power is transmitted between the first shaft and the second shaft via an electromagnetic coupling of the first rotor with the second rotor, the twin-rotor motor inputting and outputting electrical energy based on the electromagnetic coupling of the first rotor with the second rotor and a difference in revolving speed between the first rotor and the second rotor.

In the second power output apparatus including the twin-rotor motor as the energy adjustment means, the drive motor may include the first rotor included in the twin-rotor motor and a stator for rotating the first rotor. This effectively reduces the size of the whole power output apparatus.

In accordance with another aspect of the present invention, the energy adjustment means of the second power output apparatus may be constructed as: three-shaft-type power input and output means connected with the first shaft, the second shaft, and a third shaft, the three-shaft-type power input and output means for, when powers input into or output from any two shafts among the three different shafts are determined, automatically setting a power input into or output from a residual shaft based on the powers thus determined; and a shaft motor connected with the third shaft, wherein power is transmitted between the third shaft and the shaft motor.

In accordance with another aspect of the present invention, the second power output apparatus further includes driving state detecting means for detecting a driving state of the engine. The control means further has tentative target driving state setting means for, when a state deviation of the driving state detected by the driving state detecting means from the target driving state is out of a predetermined range, selecting a driving state within the predetermined range based on the state deviation and the predetermined condition and setting the selected driving state as a tentative driving state. The tentative target driving state set by the tentative target driving state setting means is used in place of the target driving state for operation control of the engine and control of the energy adjustment means and the drive motor, until the state deviation enters the predetermined range. Even when the newly set target driving state has a large state deviation, this structure enables the engine to stably approach to and eventually reach the target driving state. This effectively prevents the engine from stalling or stopping the revolutions of its output shaft due to the large state deviation.

In the second power output apparatus, it is also preferable that the control means further includes: driving state estimating means for estimating a driving state of the engine when the target power setting means sets a different target power; and estimated-condition control means for controlling the energy adjustment means and the drive motor based on the estimated driving state of the engine. This structure enables the engine to smoothly shift to the target driving states With a variation in target power, the first power output apparatus constructed as above can effectively implement torque conversion of the power output from the engine and output the converted power to the drive shaft with a high efficiency.

In the second power output apparatus wherein the control means has the driving state estimating means and the estimated-condition control means, it is also preferable that the estimated-condition control means further has means for controlling the energy adjustment means and the drive motor, so as to enable an estimated power output from the engine corresponding to the driving state of the engine estimated by the driving state estimating means to be subjected to torque conversion and output as the target power to the drive shaft. This structure enables the power output from the engine to be subjected to torque conversion and to be output to the drive shaft, even in the transient period of varied target power.

In accordance with another aspect of the present invention, the second power output apparatus, wherein the control means has the driving state estimating means and the estimated-condition control means, further includes storage battery means being charged with electrical energy taken out of the energy adjustment means, being charged with electrical energy taken out of the drive motor, being discharged to release electrical energy used in the energy adjustment means, and being discharged to release electrical energy used in the drive motor. The estimated-condition control means has means for utilizing the electrical energy stored into or released from the storage battery means and controlling the drive motor, so as to enable the drive motor to input or output a specific power into or from the output shaft of the engine, the specific power corresponding to an energy difference between the target power and the estimated power output from the engine corresponding to the driving state of the engine estimated by the driving state estimating means. Even when the engine is not driven in the target driving state in the transient period of varied target power, the target power can be thereby output to the drive shaft.

The present invention is further directed to a first driving system, which includes: an engine having an output shaft; energy adjustment means having a first shaft connected with the output shaft of the engine and a second shaft connected with a drive shaft of the driving system, the energy adjustment means adjusting a difference in energy between power input into or output from the first shaft and power input into or output from the second shaft by regulating input and output of corresponding electrical energy; a drive motor, wherein power is transmitted between the drive motor and the drive shaft; target power setting means for setting a target power output to the drive shaft; driving state setting means for setting a target driving state of the engine that outputs energy corresponding to the target power set by the target power setting means, based on a first condition for enhancing an energy efficiency of the engine that outputs energy corresponding to the target power and a second condition for making a vibration due to an operation of the engine out of a range of resonance frequency of the driving system; and control means for controlling the engine, so as to enable the engine to be driven in the target driving state set by the driving state setting means, and for controlling the energy adjustment means and the drive motor, so as to enable power output from the engine to be subjected to torque conversion and output as the target power to the drive shaft.

Typical examples of the first driving system of the present invention include vehicles, ships, airplanes, and various industrial machines. The first driving system can effectively prevent the driving system itself or a power output apparatus or any other equipment incorporated in the driving system from resonating due to an operation of the engine. No undesirable stress due to the resonance is thereby applied to the driven system or other equipment incorporated in the driving system, so that the driving system and the other equipment have better durability and the engine can be driven at driving points of the highest possible efficiency. This improves the energy efficiency of the whole system.

In accordance with one aspect of the present invention, the energy adjustment means of the first driving system may be constructed as a twin-rotor motor comprising a first rotor connected with the first shaft and a second rotor connected with the second shaft, the second rotor being rotatable relative to the first rotor, whereby power is transmitted between the first shaft and the second shaft via an electromagnetic coupling of the first rotor with the second rotor, the twin-rotor motor inputting and outputting electrical energy based on the electromagnetic coupling of the first rotor with the second rotor and a difference in revolving speed between the first rotor and the second rotor.

In the first driving system including the twin-rotor motor as the energy adjustment means, the drive motor may include the second rotor included in the twin-rotor motor and a stator for rotating the second rotor. This effectively reduces the size of the whole power output apparatus.

In accordance with another aspect of the present invention, the energy adjustment means of the first driving system may be constructed as: three-shaft-type power input and output means connected with the first shaft, the second shaft, and a third shaft, the three-shaft-type power input and output means for, when powers input into or output from any two shafts among the three different shafts are determined, automatically setting a power input into or output from a residual shaft based on the powers thus determined; and a shaft motor connected with the third shaft, wherein power is transmitted between the third shaft and the shaft motor.

The present invention is further directed to a second driving system, which includes: an engine having an output shaft; energy adjustment means having a first shaft connected with the output shaft of the engine and a second shaft connected with a drive shaft of the driving system, the energy adjustment means adjusting a difference in energy between power input into or output from the first shaft and power input into or output from the second shaft by regulating input and output of corresponding electrical energy; a drive motor, wherein power is transmitted between the drive motor and the output shaft of the engine; target power setting means for setting a target power output to the drive shaft; driving state setting means for setting a target driving state of the engine that outputs energy corresponding to the target power set by the target power setting means, based on a first condition for enhancing an energy efficiency of the engine that outputs energy corresponding to the target power and a second condition for making a vibration due to an operation of the engine out of a range of resonance frequency of the driving system; and control means for controlling the engine, so as to enable the engine to be driven in the target driving state set by the driving state setting means, and for controlling the energy adjustment means and the drive motor, so as to enable power output from the engine to be subjected to torque conversion and output as the target power to the drive shaft.

Typical examples of the second driving system of the present invention include vehicles, ships, airplanes, and various industrial machines. The second driving system can effectively prevent the driving system itself or a power output apparatus or any other equipment incorporated in the driving system from resonating due to an operation of the engine. No undesirable stress due to the resonance is thereby applied to the driving system or other equipment incorporated in the driving system, so that the driving system and the other equipment have better durability and the engine can be driven at driving points of the highest possible efficiency. This improves the energy efficiency of the whole system.

In accordance with one aspect of the present invention, the energy adjustment means of the second driving system may be constructed as a twin-rotor motor comprising a first rotor connected with the first shaft and a second rotor connected with the second shaft, the second rotor being rotatable relative to the first rotor, whereby power is transmitted between the first shaft and the second shaft via an electromagnetic coupling of the first rotor with the second rotor, the twin-rotor motor inputting and outputting electrical energy based on the electromagnetic coupling of the first rotor with the second rotor and a difference in revolving speed between the first rotor and the second rotor.

In the second driving system including the twin-rotor motor as the energy adjustment means, the drive motor may include the first rotor included in the twin-rotor motor and a stator for rotating the first rotor. This effectively reduces the size of the whole power output apparatus.

In accordance with another aspect of the present invention, the energy adjustment means of the second driving system may be constructed as: three-shaft-type power input and output means connected with the first shaft the second shaft, and a third shaft, the three-shaft-type power input and output means for, when powers input into or output from any two shafts among the three different shafts are determined, automatically setting a power input into or output from a residual shaft based on the powers thus determined; and a shaft motor connected with the third shaft, wherein power is transmitted between the third shaft and the shaft motor.

At least part of the above objects is also realized by a first method of controlling a power output apparatus for outputting power to a drive shaft. The first method includes the steps of: (a) providing an engine having an output shaft; energy adjustment means having a first shaft connected with the output shaft of the engine and a second shaft connected with the drive shaft, the energy adjustment means adjusting a difference in energy between power input into or output from the first shaft and power input into or output from the second shaft by regulating input and output of corresponding electrical energy; and a drive motor, wherein power is transmitted between the drive motor and the drive shaft; (b) setting a target power output to the drive shaft; (c) setting a target driving state of the engine that outputs energy corresponding to the target power set in the step (b), based on a specific condition of selecting a specific driving point that attains a highest possible efficiency among a plurality of available driving points of the engine that outputs energy corresponding to the target power; and (d) controlling the engine, so as to enable the engine to be driven in the target driving state set in the step (c), and for controlling the energy adjustment means and the drive motor, so as to enable power output from the engine to be subjected to torque conversion and output as the target power to the drive shaft.

The first method of the present invention enables the engine to be driven in a specific driving point that attains the highest possible efficiency among a plurality of available driving points of the engine that outputs energy corresponding to the target power. This further enhances the energy efficiency of the power output apparatus.

In the first method of the present invention, the step (d) may further include the steps of: (e) detecting a driving state of the engine; (f) when a state deviation of the driving state of the engine detected in the step (e) from the target driving state is out of a predetermined range, selecting a driving state within the predetermined range based on the state deviation and the specific condition and setting the selected driving state as a tentative target driving state; and (g) using the tentative target driving state set in the step (f) in place of the target driving state, in order to control the engine, the energy adjustment means, and the drive motor, until the state deviation enters the predetermined range. Even when the newly set target driving state has a large state deviation, this structure enables the engine to stably approach to and eventually reach the target driving state. This effectively prevents the engine from stalling or stopping the revolutions of its output shaft due to the large state deviation.

In the first method of the present invention, it is also desirable that the step (d) further includes the steps of: (h) when a different target power is set, estimating a driving state of the engine based on a revolving speed of the output shaft of the engine and a state of the energy adjustment means; and (i) controlling the energy adjustment means and the drive motor, so as to enable power output from the engine to be subjected to torque conversion and output to the drive shaft, based on the estimated driving state of the engine. With a variation in target power, this structure enables the power output from the engine to be subjected to torque conversion and to be output to the drive shaft with a high efficiency.

The present invention is further directed to a second method of controlling a power output apparatus for outputting power to a drive shaft. The second method includes the steps of: (a) providing an engine having an output shaft; energy adjustment means having a first shaft connected with the output shaft of the engine and a second shaft connected with the drive shaft, the energy adjustment means adjusting a difference in energy between power input into or output from the first shaft and power input into or output from the second shaft by regulating input and output of corresponding electrical energy; and a drive motor, wherein power is transmitted between the drive motor and the drive shaft; (b) setting a target power output to the drive shaft; (c) setting a target driving state of the engine that outputs energy corresponding to the target power set in the step (b), based on a specific condition of selecting a specific driving point that attains a highest possible comprehensive efficiency among a plurality of available driving points of the engine that outputs energy corresponding to the target power, the comprehensive efficiency being calculated by multiplying an energy efficiency of the engine by a transmission efficiency of the energy adjustment means and the drive motor when the power output from the engine is subjected to torque conversion and output to the drive shaft; and (d) controlling the engine, so as to enable the engine to be driven in the target driving state set in the step (c), and for controlling the energy adjustment means and the drive motor, so as to enable power output from the engine to be subjected to torque conversion and output as the target power to the drive shaft.

The second method of the present invention enables the engine to be driven in a specific driving point that attains the highest possible comprehensive efficiency of the whole apparatus, among a plurality of available driving points of the engine that outputs energy corresponding to the target power. This further enhances the energy efficiency of the power output apparatus.

In the second method of the present invention, the step (d) may further include the steps of: (e) detecting a driving state of the engine; (f) when a state deviation of the driving state of the engine detected in the step (e) from the target driving state is out of a predetermined range, selecting a driving state within the predetermined range based on the state deviation and the specific condition and setting the selected driving state as a tentative target driving state; and (g) using the tentative target driving state set in the step (f) in place of the target driving state, in order to control the engine, the energy adjustment means, and the drive motor, until the state deviation enters the predetermined range. Even when the newly set target driving state has a large state deviation, this structure enables the engine to stably approach to and eventually reach the target driving state. This effectively prevents the engine from stalling or stopping the revolutions of its output shaft due to the large state deviation.

In the second method of the present invention, it is also desirable that the step (d) further includes the steps of: (h) when a different target power is set, estimating a driving state of the engine based on a revolving speed of the output shaft of the engine and a state of the energy adjustment means; and (i) controlling the energy adjustment means and the drive motor, so as to enable power output from the engine to be subjected to torque conversion and output to the drive shaft, based on the estimated driving state of the engine. With a variation in target power, this structure enables the power output from the engine to be subjected to torque conversion and to be output to the drive shaft with a high efficiency.

These and other objects, features, aspects, and advantages of the present invention will become more apparent from the following detailed description of the preferred embodiments with the accompanying drawings.

DETAILED DESCRIPTION OF THE INVENTION

Figure 1:
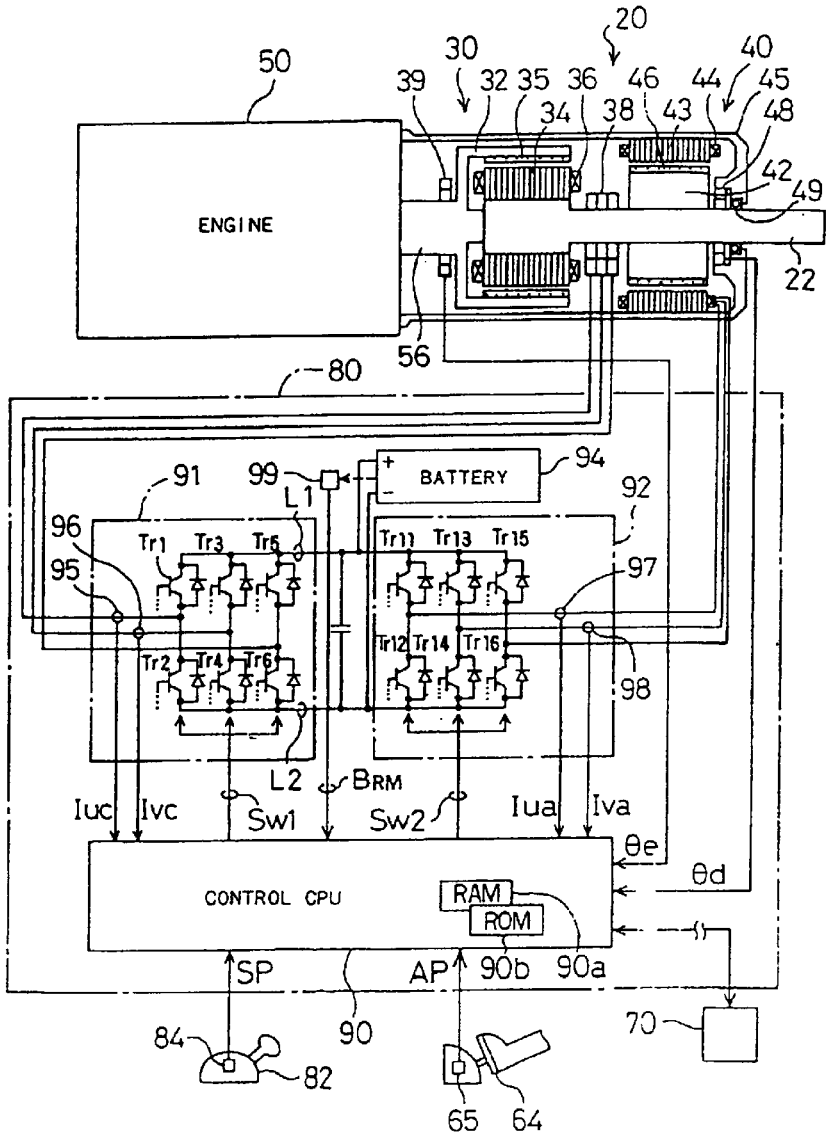
FIG. 1 is a schematic view illustrating structure of a power output apparatus as a first embodiment according to the present invention.
Figure 2:
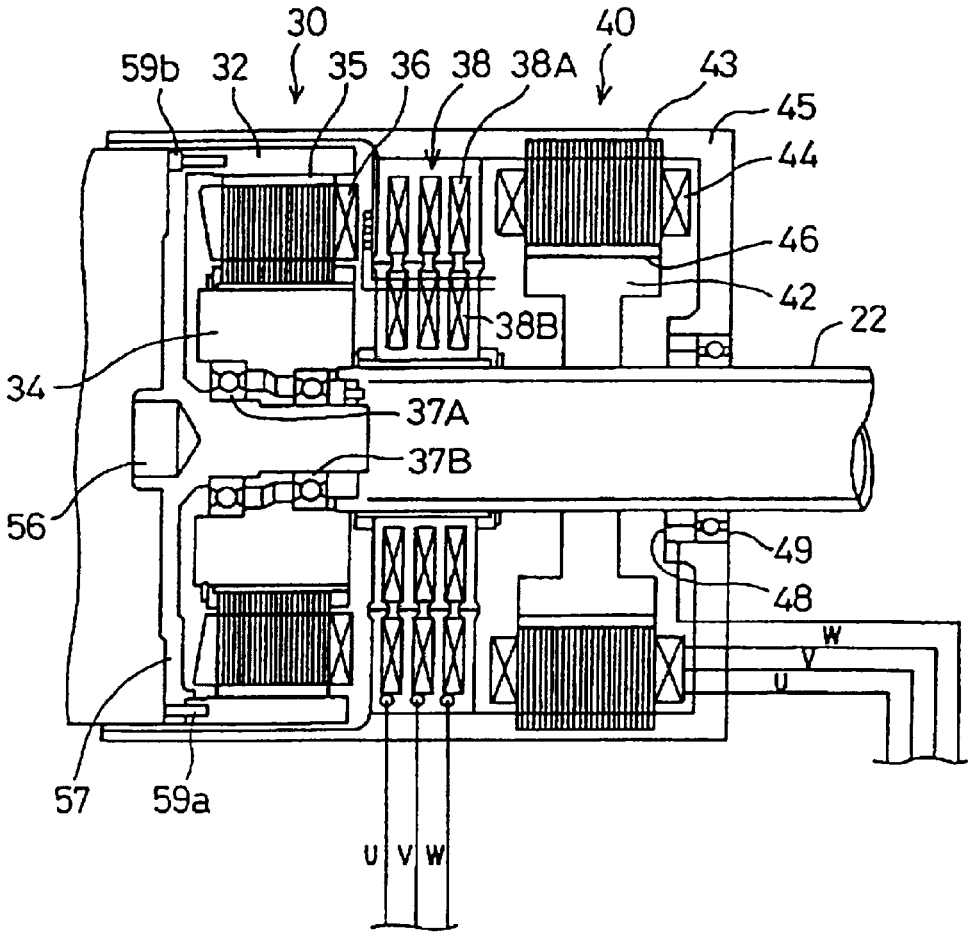
FIG. 2 is a cross sectional view illustrating detailed structures of a clutch motor and an assist motor included in the power output apparatus of FIG. 1.
Figure 3:
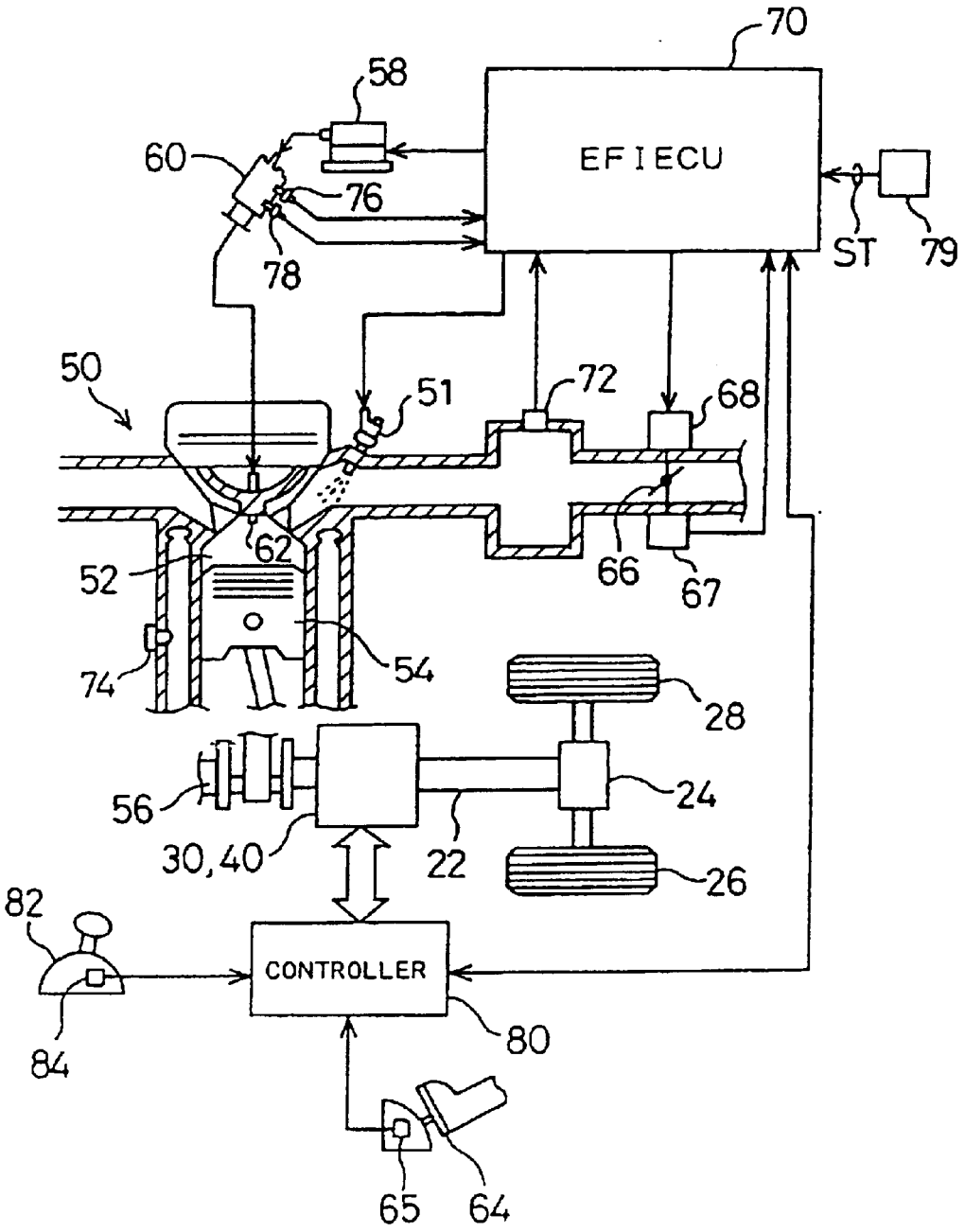
FIG. 3 is a schematic view illustrating general structure of a vehicle with the power output apparatus of FIG. 1 incorporated therein.

Preferable embodiments of the present invention are described hereafter. FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating general structure of a vehicle with the power output apparatus 20 of FIG. 1 incorporated therein. The general structure of the vehicle is described first for the convenience of description.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position BP of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50 for generating power, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to one end of the crankshaft 56 of the engine 50, whereas the inner rotor 34 thereof is mechanically linked with the rotor 42 of the assist motor 40.

Structures of the clutch motor 30 and the assist motor 40 are described briefly. As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. Laminated sheets of non-directional electromagnetic steel are used to form teeth and slots for the three-phase coils 36 in the inner rotor 34. A resolver 39 for measuring a rotational angle θe of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. The rotation and axial torque of the crankshaft 56 of the engine 50 are accordingly transmitted via the outer rotor 32 and the inner rotor 34 of the clutch motor 30 to the drive shaft 22 while the rotation and torque of the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 mounted thereon and the inner rotor 34 with the three-phase coils 36 attached thereto. The detailed structure of the clutch motor 30 is described according to the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30 and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38A fixed to the casing 45 and secondary windings 38B attached to the drive shaft 22 coupled with the inner rotor 34. Electromagnetic induction enables electric power to be transmitted from the primary windings 38A to the secondary windings 38B or vice versa. The rotary transformer 38 has windings for the three phases, that is, U, V, and W phases, to allow for the transmission of three-phase electric currents.

Interaction between a magnetic field formed by one adjoining pair of permanent magnets 35 and a revolving magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (the number of revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later, based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input port. The input data include a rotational angle θe of the crankshaft 56 of the engine 50 measured with the resolver 39, a rotational angle θd of the drive shaft 22 measured with the resolver 48, an accelerator pedal position AP (step-on amount of the accelerator pedal 64) output from the accelerator position sensor 65, a gearshift position SP output from the gearshift position sensor 84, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines L1 and L2. The three-phase coils (U,V,W) 36 of the clutch motor 30 are connected via the rotary transformer 38 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output apparatus 20 thus constructed works in accordance with the operation principles discussed below, especially with the principle of torque conversion. By way of example, it is assumed that the crankshaft 56 of the engine 50 driven by the EFIECU 70 rotates at a revolving speed (the number of revolutions per a predetermined time period) Ne, which is equal to a predetermined value N1. In the description below, the revolving speed Ne of the crankshaft 56 is also referred to as the revolving speed Ne of the engine 50. While the transistors Tr1 through Tr6 in the first driving circuit 91 are in OFF position, the controller 80 does not supply any electric current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors TR1 through Tr6 in the first driving circuit 91, a constant electric current flows through the three-phase coils 36 of the clutch motor 30, based on the difference between the revolving speed Ne of the engine 50 and a revolving speed Nd of the drive shaft 22 (in other words, a difference Nc (=Nc−Nd) between the revolving speed of the outer motor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the engine 50. In this state, the clutch motor 30 functions as a generator and carries out the regenerative operation to regenerate an electric current via the first driving circuit 91.

In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
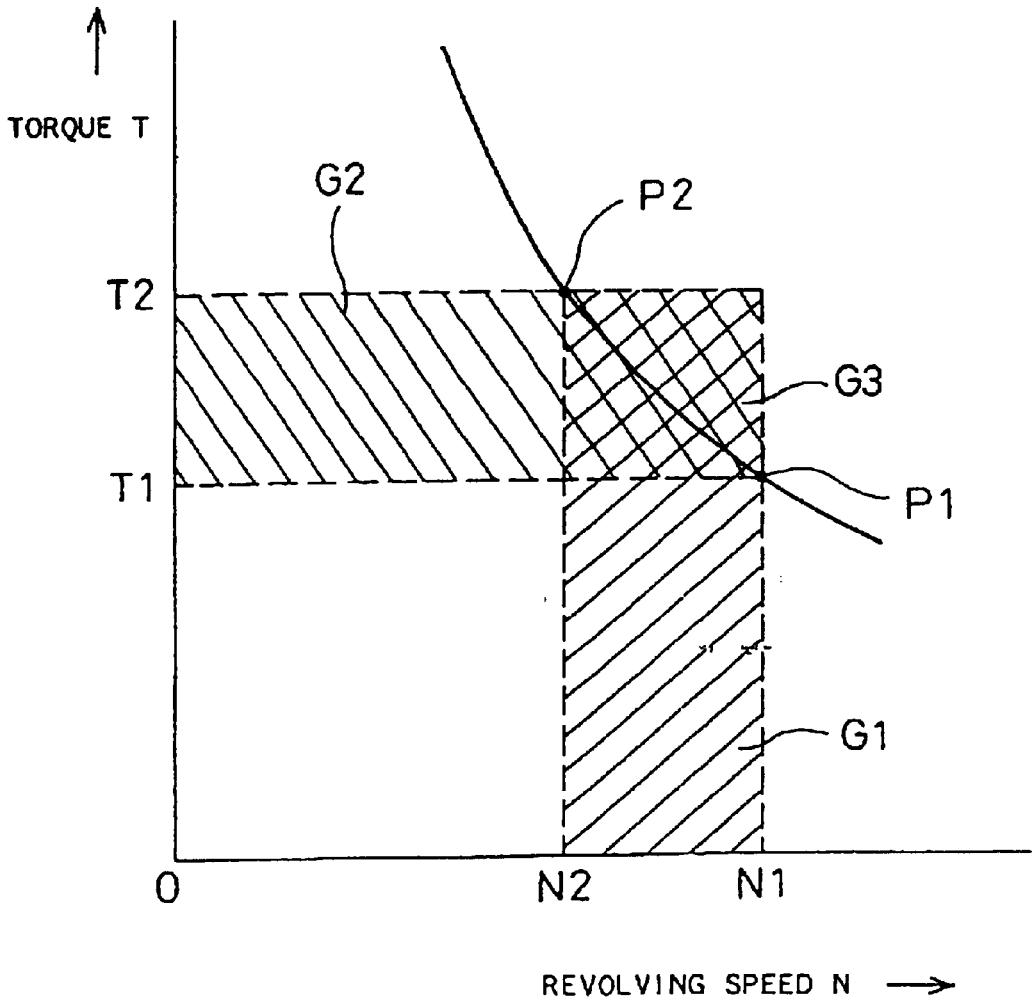
FIG. 4 is a graph showing the operation principle of the power output apparatus.

Referring to FIG. 4, in the power output apparatus 20, when the engine 50 is driven at a first driving point P1, where the engine speed Ne is equal to a predetermined revolving speed N1 and an engine torque Te is equal to a predetermined value T1, the clutch motor 30 carries out the regenerative operation to produce an energy defined by a first area G1. The energy of the first area G1 is supplied to the assist motor 40 as an energy defined by a second area G2. The drive shaft 22 is accordingly driven at a second driving point P2, where the drive shaft speed Nd is equal to a predetermined revolving speed N2 and a drive shaft torque Td is equal to a predetermined value T2. The torque conversion is carried out in the manner discussed above, and the energy corresponding to the slip in the clutch motor 30 or the revolving speed difference Nc (=Ne−Nd) is consequently given as a torque to the drive shaft 22.

In accordance with another example, it is assumed that the engine 50 is driven at the second driving point P2, where the engine speed Ne is equal to the predetermined revolving speed N2 and the engine torque Te is equal to the predetermined value T2, while the revolving speed Nd of the drive shaft 22 is equal to the predetermined revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). The clutch motor 30 accordingly functions as a normal motor and consumes electric power to supply the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using electric power stored in the battery 94.

Referring back to FIG. 4, when the engine 50 is driven at the second driving point P2, where the revolving speed Ne=N2 and the torque Te=T2, the assist motor 40 regenerates an energy corresponding to the sum of the second area G2 and a third area G3. The energy of the areas G2 and G3 is supplied to the clutch motor 30 as an energy defined by the sum of the first area G1 and the third area G3. The drive shaft 22 is accordingly driven at the first driving point P1, where the revolving speed Nd=N1 and the torque Td=T1.

Other than the torque conversion discussed above, the power output apparatus 20 of the embodiment can charge the battery 94 with an excess of electrical energy or discharge the battery 94 to supplement the electrical energy. This is implemented by controlling the mechanical energy output from the engine 50 (that is, the product of the torque Te and the revolving speed Ne), the electrical energy regenerated or consumed by the clutch motor 30, and the electrical energy consumed or regenerated by the assist motor 40. The power (energy) output from the engine 50 can thus be transmitted to the drive shaft 22 at a higher efficiency.

Figure 5:
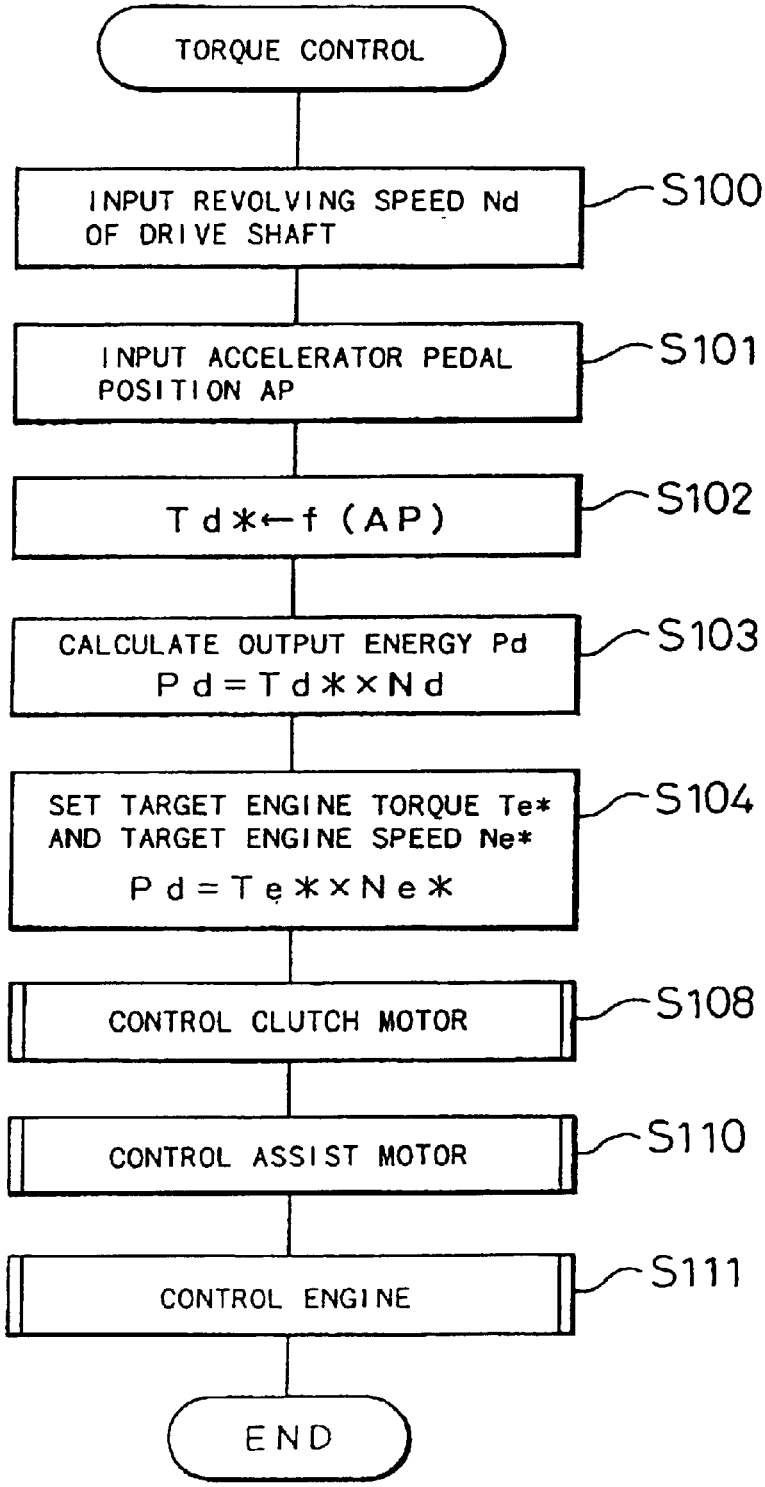
FIG. 5 is a flowchart showing a torque control routine executed in the first embodiment by the control CPU of the controller.

The concrete procedure of torque conversion executed by the power output apparatus 20 is described according to a torque control routine shown in the flowchart of FIG. 5. The torque control routine is executed repeatedly at predetermined time intervals after the driver has started the vehicle.

When the program enters the torque control routine, the control CPU 90 of the controller 80 first receives data of revolving speed Nd of the drive shaft 22 at step S100. The revolving speed Nd of the drive shaft 22 can be computed from the rotational angle θd of the drive shaft 22 read from the resolver 48. At subsequent step S101, the control CPU 90 reads the accelerator pedal position AP detected by the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S102 at which the control CPU 90 computes a target output torque Td* corresponding to the input accelerator pedal position AP. The target output torque Td* implies a target torque to be output to the drive shaft 22 and is hereinafter referred to as the 'output torque command value'. In this embodiment, output torque command values Td* corresponding to the respective accelerator pedal positions AP have been set in advance and stored in the ROM 90b. In response to an input of the accelerator pedal position AP, the output torque command value Td* corresponding to the input accelerator pedal position AP is extracted from the output torque command values Td* stored in the ROM 90b.

At step S103, an amount of energy Pd (target energy) to be output to the drive shaft 22 is calculated from the extracted output torque command value Td* and the input revolving speed Nd of the drive shaft 22 according to the equation of Pd=Td*×Nd. The program then proceeds to step S104 at which the control CPU 90 sets a target engine torque Te* and a target engine speed Ne* of the engine 50 based on the output energy Pd thus obtained. The energy supplied from the engine 50 is equal to the product of the torque Te and the revolving speed Ne of the engine 50, so that the relationship between the output energy Pd, the target engine torque Te*, and the target engine speed Ne* can be defined as Pd=Te*×Ne*. There are, however, numerous combinations of the target engine torque Te* and the target engine speed Ne* of the engine 50 satisfying the above relationship. In this embodiment, favorable combinations of the target torque Te* and the target revolving speed Ne* of the engine 50 are experimentally or otherwise determined in advance for the respective amounts of output energy Pd. In such favorable combinations, the engine 50 is driven at highest possible efficiency and the driving state of the engine 50 is smoothly varied with a variation in output energy Pd. The predetermined favorable combinations are stored in the form of a map in the ROM 90b. In practice, the target torque Te* and the target revolving speed Ne* of the engine 50 corresponding to the output energy Pd obtained at step S103 is read from the map at step S104. The following gives a further description of the map.

Figure 6:
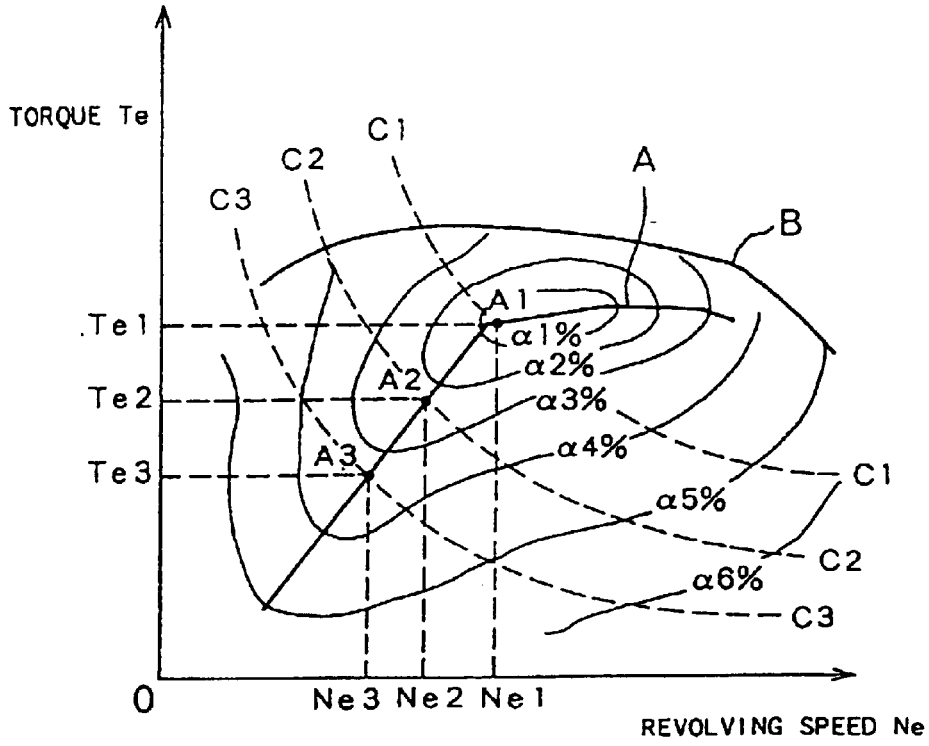
FIG. 6 is a graph illustrating driving points of the engine defined by the target engine torque and the target revolving speed.

FIG. 6 is a graph showing driving points of the engine 50 (defined by the target engine torque Te* and the target engine speed Ne*) with their efficiencies. The curve B in FIG. 6 represents a boundary of an engine-operable range, in which the engine 50 can be driven. In the engine-operable range, efficiency curvesr such as curves α1 through α6, can be drawn by successively joining the driving points having the identical efficiency. In the engine-operable range, constant-output energy curves, such as curves C1—C1 through C3—C3; can also be drawn on each curve of constant-output energy, the energy output from the engine 50 and defined as the product of the torque Te and the revolving speed Ne is constant. The graph of FIG. 7 shows the efficiency of the respective driving points along the constant-output energy curves C1—C1 through C3—C3 plotted against the revolving speed Ne of the engine 50.

Figure 7:
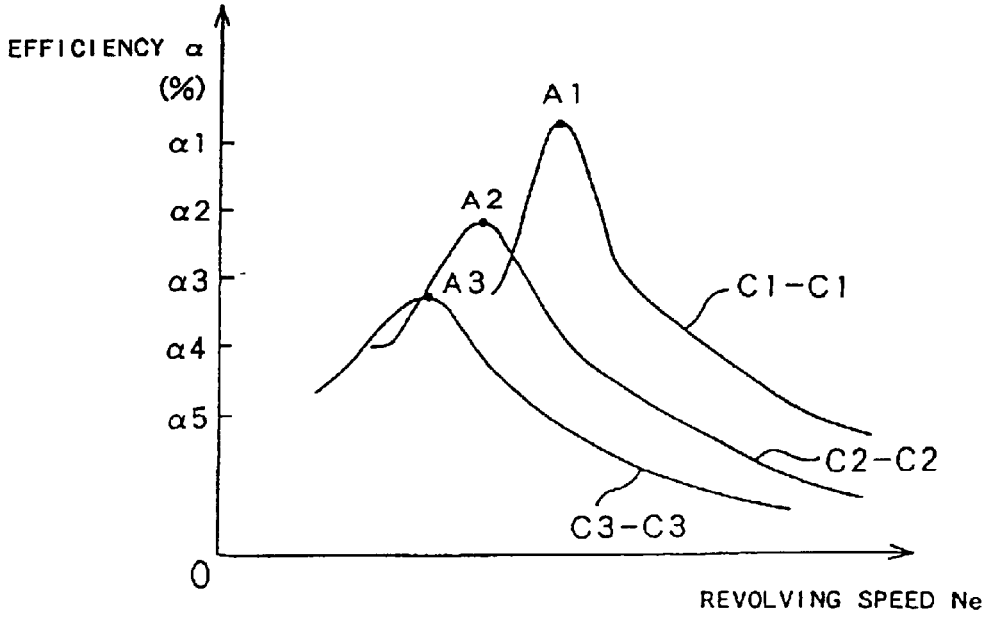
FIG. 7 is a graph showing the efficiency of the engine along the constant-output energy curves against the revolving speed of the engine.

Referring to FIG. 7, the efficiency with respect to the same output energy from the engine 50 is significantly varied by the driving point of the engine 50. On the constant-output energy curve C1—C1, for example, the efficiency of the engine 50 reaches its maximum when the engine 50 is driven at a driving point A1 (torque Te1 and revolving speed Ne1). Such a driving point attaining the highest possible efficiency exists on each constant-output energy curve; a driving point A2 for the constant-output energy curve C2—C2 and a driving point A3 for the constant-output energy curve C3—C3. The curve A in FIG. 6 is obtained by joining such driving points attaining the highest possible efficiency of the engine 50 for the respective amounts of output energy Pd by a continuous curve. The map representing the relationship between each driving point (torque Te and revolving speed Ne) on the curve A and the output energy Pd is used at step S104 in the flowchart of FIG. 5 for setting the target torque Te* and the target revolving speed Ne* of the engine 50.

The curve A should be continuous because of the following reason. In case that discontinuous curves are used to set the driving point of the engine 50 against a variation in output energy Pd, the driving state of the engine 50 is abruptly varied with a variation in output energy Pd crossing over the discontinuous driving points. The abrupt variation may prevent the driving state from being smoothly shifted to a target level and thereby cause knocking or another undesirable condition. Each driving point on the curve A may accordingly not correspond to the driving point attaining the highest possible efficiency on the curve of output energy Pd=constant.

After setting the target torque Te* and the target revolving speed Ne* of the engine 50, the program proceeds to steps S108, S110, and S111 to control the clutch motor 30, the assist motor 40, and the engine 50 based on the target engine torque Te* and the target engine speed Ne*, respectively. As a matter of convenience of illustration, the control operations of the clutch motor 30, the assist motor 40, and the engine 50 are shown as separate steps. In the actual procedure, however, these control operations are carried out simultaneously. By way of example, the control CPU 90 simultaneously controls the clutch motor 30 and the assist motor 40 by utilizing an interrupting process, while transmitting an instruction to the EFIECU 70 through communication in order to allow the EFIECU 70 to control the engine 50 concurrently. The concrete procedures of the control are described below.

Figure 8:
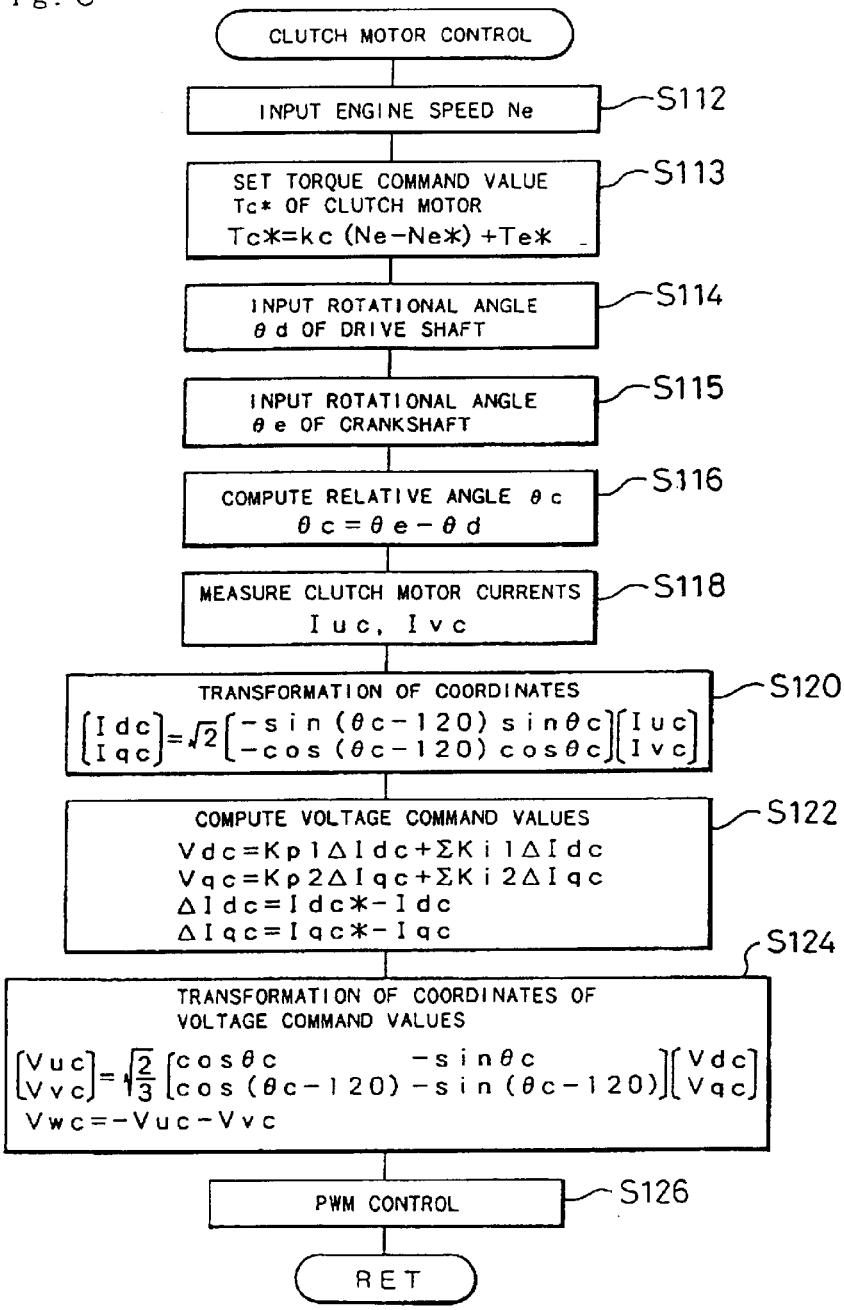
FIG. 8 is a flowchart showing a fundamental procedure of controlling the clutch motor executed by the controller.

FIG. 8 is a flowchart showing details of the control process of the clutch motor 30 executed at step S108 in the flowchart of FIG. 5. When the program enters the clutch motor control routine, the control CPU 90 of the controller 80 first reads the revolving speed Ne of the engine 50 at step S112. The revolving speed Ne of the engine 50 may be calculated from the rotational angle θe of the crankshaft 56 read from the resolver 39 or directly measured with the speed sensor 76 mounted on the distributor 60. In case that the speed sensor 76 is used, the control CPu 90 receives data of revolving speed Ne from the EFIECU 70 connecting with the speed sensor 76 through communication.

At subsequent step S113, a target clutch torque or torque command value Tc* of the clutch motor 30 is then calculated according to Equation (1) given below:

$$Tc^*=kc(Ne-Ne^*)+Te^* \quad (1)$$

wherein kc represents a coefficient of proportionality.

The torque command value Tc* of the clutch motor 30 is varied according to the deviation of the actual revolving speed Ne of the engine 50 from the target engine speed Ne*, in order to enable the engine 50 to be driven stably at the driving point of the target engine torque Te* and the target engine speed Ne*. Even when it is desirable to drive the engine 50 at the driving point of the target engine torque Te* and the target engine speed Ne*, since the torque Te of the engine 50 corresponds to the reaction against the loading torque Tc of the clutch motor 30, the function of the engine 50 alone does not allow the engine 50 to be driven at the desired driving point. Compared with the clutch motor 30 and the assist motor 40, the driving state of the engine 50 is fluctuated more significantly. Even when the actual torque Tc of the clutch motor 30 is set equal to the target engine torque Te* and the torque Te of the engine 50 is thereby made identical with the target engine torque Te*, the revolving speed Ne of the engine 50 may not be coincident with the target engine speed Ne*. The structure of the embodiment accordingly does not set the torque command value Tc* of the clutch motor 30 equal to the target engine torque Te* of the engine 50, but introduces a correction term based on the difference between the actual revolving speed Ne of the engine 50 and the target engine speed Ne*.

Figure 9:
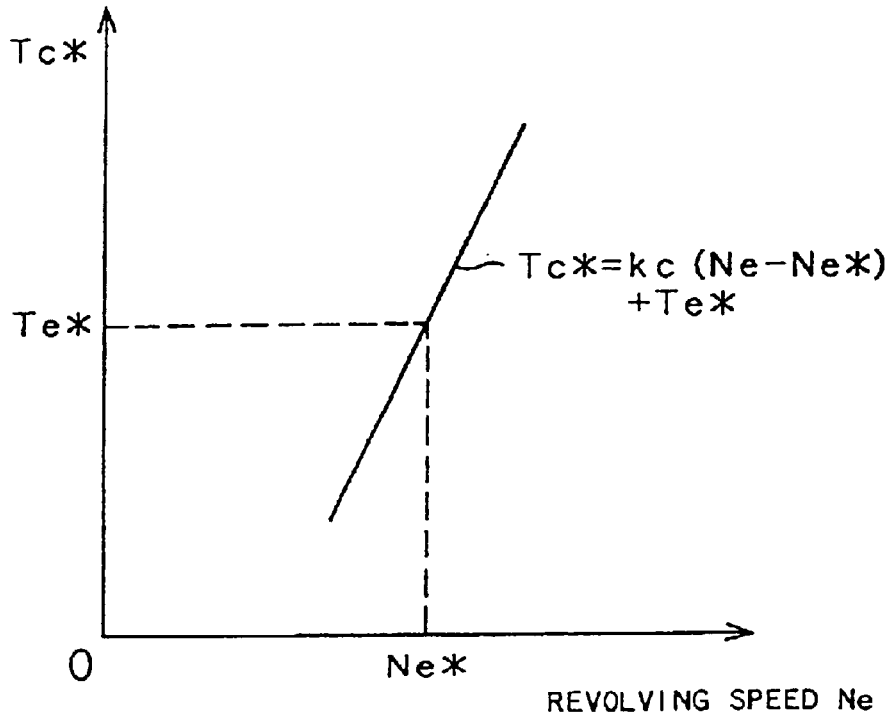
FIG. 9 is a graph showing the relationship between the torque command value of the clutch motor and the target torque and the target revolving speed of the engine.

The graph of FIG. 9 shows the relationship between the torque command value Tc* of the clutch motor 30 and the target torque Te* and the target revolving speed Ne* of the engine 50. Referring to FIG. 9, when the revolving speed Ne of the engine 50 is greater than the target engine speed Ne*, the torque command value Tc* is set equal to a value greater than the target engine torque Te*, in order to allow the clutch motor 30 to reduce the revolving speed Ne of the engine 50. When the revolving speed Ne of the engine 50 is less than the target engine speed Ne*, on the contrary, the torque command value Tc* is set equal to a value smaller than the target engine torque Te*, in order to allow the clutch motor 30 to enhance the revolving speed Ne of the engine 50.

Referring back to the flowchart of FIG. 8, the control CPU 90 reads the rotational angle θd of the drive shaft 22 from the resolver 48 at step S114 and the rotational angle θe of the crankshaft 56 of the engine 50 from the resolver 39 at step S115. The control CPU 90 then computes a relative angle θc of the drive shaft 22 to the crankshaft 56 by the equation of θc=θe−θd at step S116.

The program proceeds to step S118, at which the control CPU 90 reads the clutch motor currents Iuc and Ivc, which respectively flow through the U phase and V phase of the three-phase coils 36 in the clutch motor 30 and are measured by the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (2) given below:

$$\begin{bmatrix} Idc \\ Iqc \end{bmatrix} = \sqrt{2}\begin{bmatrix} -\sin(\theta c - 120) & \sin\theta c \\ -\cos(\theta c - 120) & \cos\theta c \end{bmatrix}\begin{bmatrix} Iwc \\ Ivc \end{bmatrix} \quad (2)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and subsequently determines voltage command values Vdc and Vqc with respect to the d and q axes at step S122. In accordance with a concrete procedure, the control CPU 90 executes arithmetic operations of Equations (3) and Equations (4) given below:

$$\Delta Idc = Idc^* - Idc$$

$$\Delta Iqc = Iqc^* - Iqc \quad (3)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (4)$$

wherein Kp1, Kp2, Ki1, and Ki2 represent coefficients, which are adjusted to be suited to the characteristics of the motor applied. Each voltage command value Vdc (Vqc) includes a part in proportion to the deviation ΔI from the current command value I* (the first term in the right side of Equation (4)) and a summation of historical data of the deviations ΔI for 'i' times (the second term in the right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as expressed by Equations (5) given below:

$$\begin{bmatrix} Vwc \\ Vvc \end{bmatrix} = \sqrt{\frac{2}{3}}\begin{bmatrix} \cos\theta c & -\sin\theta c \\ \cos(\theta c - 120) & -\sin(\theta c - 120) \end{bmatrix}\begin{bmatrix} Vdc \\ Vqc \end{bmatrix} \quad (5)$$

$$Vwc = -Vuc - Vvc$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values Vuc, Vvc, and Vwc determined by Equations (5) above.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne−Nd) is positive, the clutch motor 30 is controlled to carry out the regenerative operation and produce a regenerative current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the revolving magnetic field generated by the currents flowing through the three-phase coils 36 mounted on the inner rotor 34 of the clutch motor 30. The identical switching control is executed for both the regenerative operation and the power operation of the clutch motor 30 as long as the sign of the torque command value Tc* is not changed. The clutch motor control routine of FIG. 8 is thus applicable to both the regenerative operation and the power operation. Under the condition of braking the drive shaft 22 or moving the vehicle in reverse, the torque command value Tc* has the negative sign. The clutch motor control routine of FIG. 8 is also applicable to the control procedure under such conditions, when the relative angle θc obtained at step S116 is varied in the reverse direction.

Figure 10:
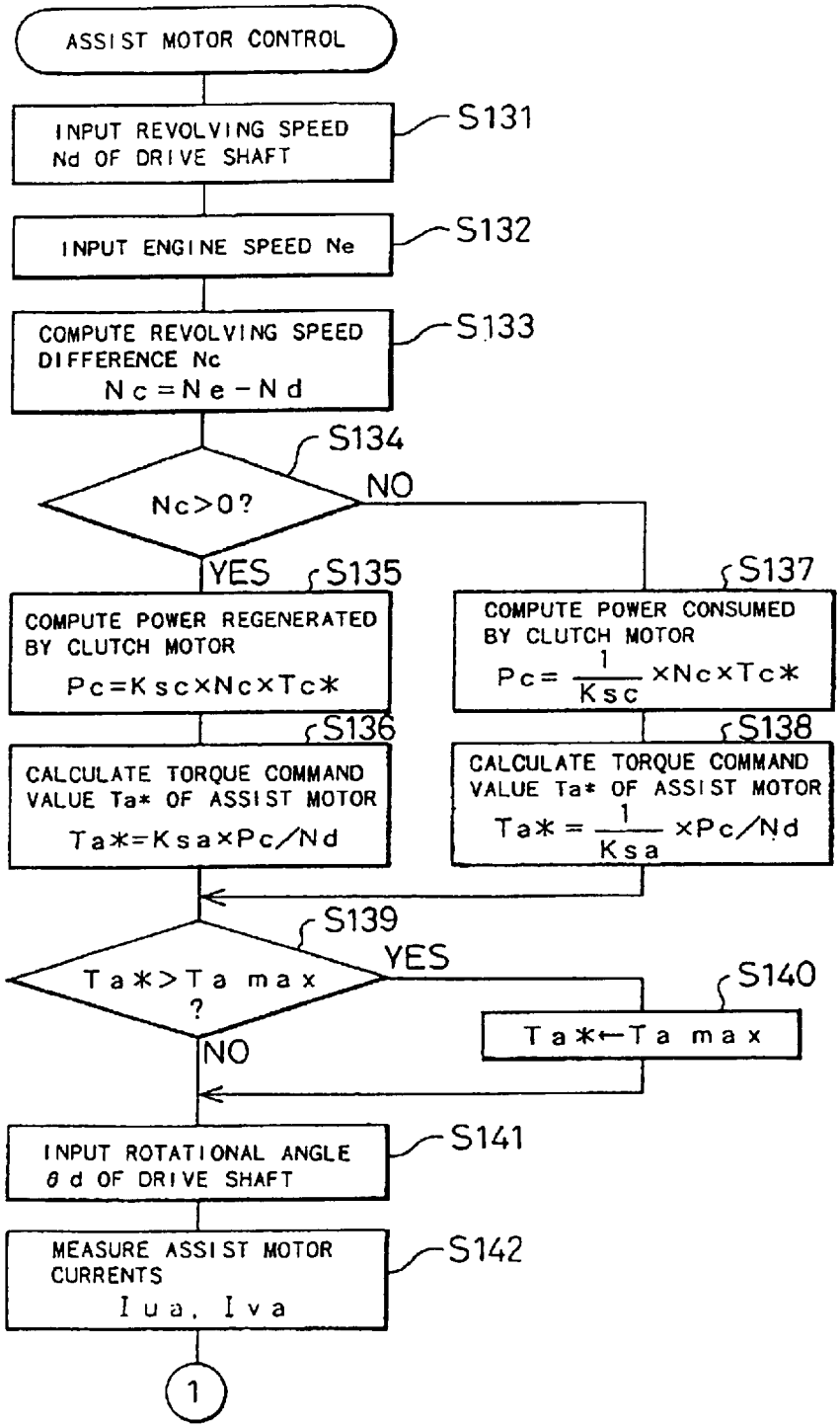
FIGS. 10 and 11 are flowcharts showing a fundamental procedure of controlling the assist motor executed by the controller 80.
Figure 11:
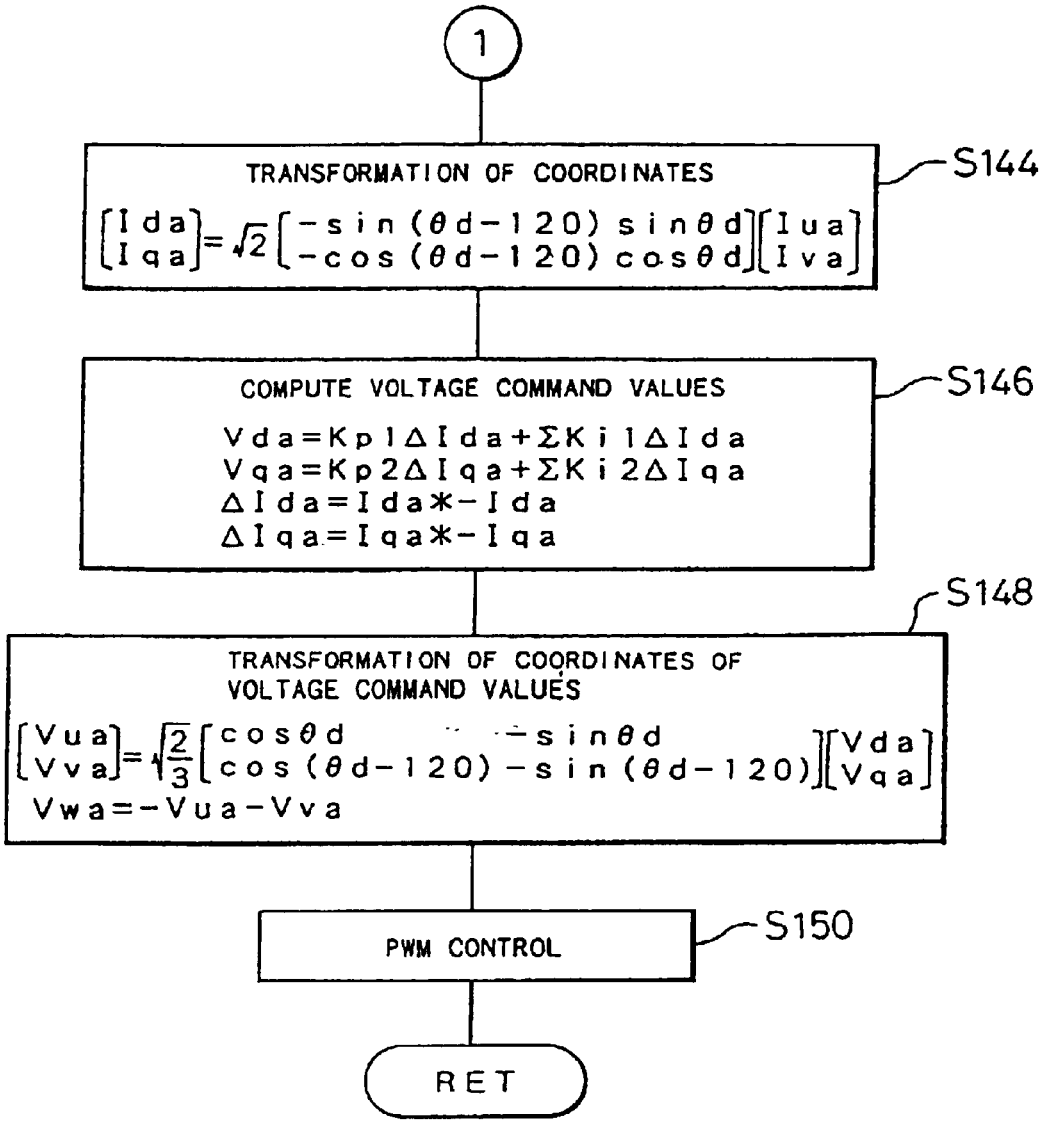

FIGS. 10 and 11 are flowcharts showing details of the torque control process of the assist motor 40 executed at step S110 in the flowchart of FIG. 5. When the program enters the assist motor control routine, the control CPU 90 first reads the revolving speed Nd of the drive shaft 22 at step S131 and the revolving speed Ne of the engine 50 at step S132. The control CPU 90 then calculates a revolving speed difference Nc between the input data of revolving speed Nd of the drive shaft 22 and revolving speed Ne of the engine 50 (Nc=Ne−Nd) at step S133, and checks the sign of the revolving speed difference Nc thus obtained at step S134.

When the revolving speed difference Nc has the positive sign, the clutch motor 30 is under regenerative control and the program proceeds to step S135, at which a power Pc regenerated by the clutch motor 30 is calculated according to Equation (6) given below. At subsequent step S136, the control CPU 90 calculates a torque command value Ta* of the assist motor 40 that consumes the regenerative power Pc, according to Equation (7) given below:

$$Pc = Ksc \times Nc \times Tc^* \quad (6)$$

$$Ta^* = Ksa \times Pc / Nd \quad (7)$$

wherein Ksc in Equation (6) represents the efficiency of the clutch motor 30 and Ksa in Equation (7) the efficiency of the assist motor 40.

When the revolving speed difference Nc has the negative sign, on the other hand, the clutch motor 30 is under power control and the program proceeds to step S137, at which a power Pc consumed by the clutch motor 30 is calculated according to Equation (8) given below. At subsequent step S138, the control CPU 90 calculates a torque command value Ta* of the assist motor 40 that regenerates the consumed power Pc, according to Equation (9) given below. When the revolving speed difference Nc is negative, the power Pc and the torque command value Ta* are also negative and the assist motor 40 applies the torque in reverse of the rotation to the drive shaft 22. The assist motor 40 is accordingly under regenerative control. Although the efficiency Ksc of the clutch motor 30 and the efficiency Ksa of the assist motor 40 in Equations (6) and (7) are also included in Equations (8) and (9), different efficiencies may be applied to the regenerative operation and the power operation in motors having different efficiencies of regenerative operation and power operation.

$$Pc=(1/Ksc)\times Nc\times Tc^* \quad (8)$$

$$Ta^*=(1/Ksa)\times PcNd \quad (9)$$

After the processing of step S136 or S138, the program proceeds to step S139, at which the torque command value Ta* thus calculated is compared with a maximum torque Tamax which the assist motor 40 can apply. When the torque command value Ta* exceeds the maximum torque Tamax, the torque command value Ta* is restricted to and set equal to the maximum torque Tamax at step S140.

The control CPU 90 then reads the rotational angle θd of the drive shaft 22 from the resolver 48 at step S141, and receives data of assist motor currents Iua and Iva at step S142, which respectively flow through the U phase and V phase of the three-phase coils 44 in the assist motor 40 and are measured with the ammeters 97 and 98. The control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 8.

The control of the engine 50 (step S111 in the flowchart of FIG. 5) is executed in the following manner. In order to attain stationary driving at the driving point defined by the target engine torque Te* and the target engine speed Ne* set at step S104 in FIG. 5, the control CPU 90 regulates the torque Te and the revolving speed Ne of the engine 50. In accordance with a concrete procedure, the control CPU 90 transmits the target torque Te* and the target revolving speed Ne* of the engine 50 to the EFIECU 70 through communication, and the EFIECU 70 controls the position of the throttle valve 66 and fuel injection from the fuel injection valve 51 based on the target engine torque Te* and the target engine speed Ne*. The position of the throttle valve 66 is controlled, for example, according to a throttle valve position control routine shown in FIG. 12, whereas the fuel injection control is carried out, for example, according to a fuel injection control routine shown in FIG. 13. These routines are repeatedly executed at predetermined time intervals. The following describes these routines in brief.

Figure 12:
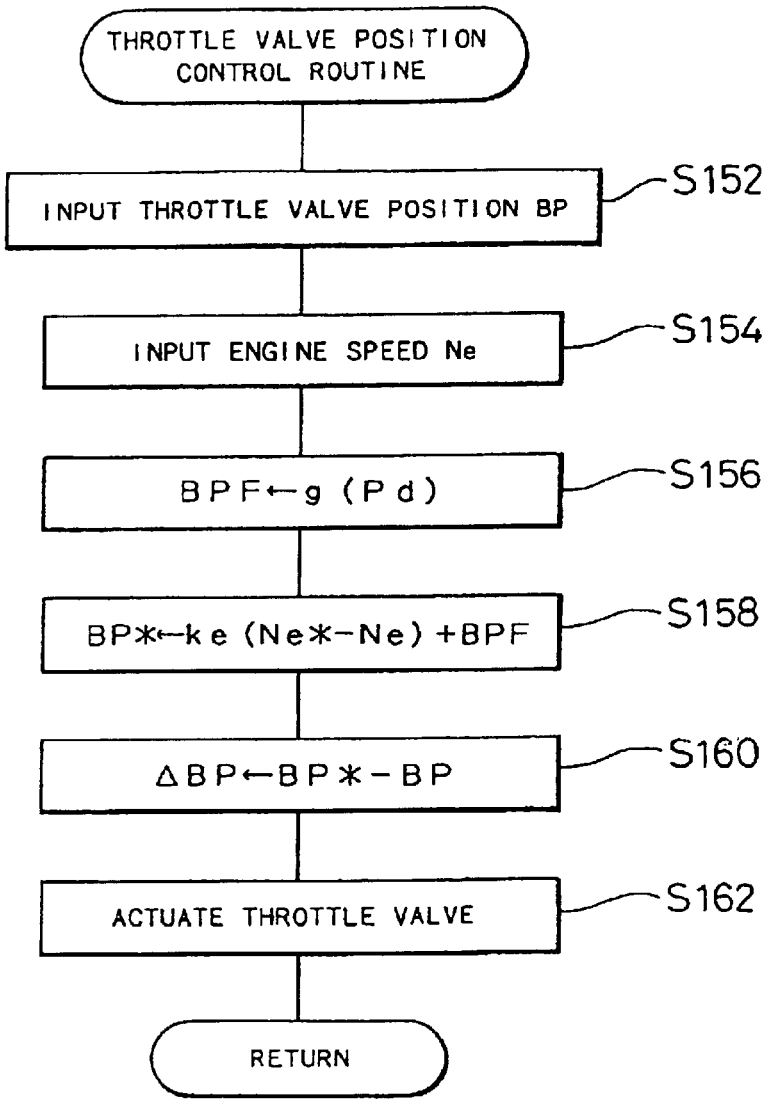
FIG. 12 is a flowchart showing a throttle valve position control routine executed by the electronic control unit.

When the program enters the throttle valve position control routine shown in the flowchart of FIG. 12, the EFIECU 70 first reads the position BP of the throttle valve 66 measured with the throttle valve position sensor 67 at step S152 and the revolving speed Ne of the engine 50 at step S154. The revolving speed Ne of the engine 50 supplied to the EFIECU 70 is typically measured with the speed sensor 76 mounted on the distributor 60. In case that the revolving speed Ne of the engine 50 is calculated from the rotational angle θe of the crankshaft 56 read from the resolver 39, the EFIECU 70 receives the data of rotational angle θe from the controller 80 through communication.

At subsequent step S156, the EFIECU 70 sets a standard position BPF of the throttle valve 66 based on the output energy Pd obtained at step S103 in the flowchart of FIG. 5. In this embodiment, the positions BP of the throttle valve 66 to attain stationary driving of the engine 50 at the driving point of the target engine torque Te* and the target engine speed Ne* are experimentally or otherwise determines for the respective amounts of output energy Pd. The relationship thus obtained is previously stored as a map in a ROM (not shown) included in the EFIECU 70. The position BP corresponding to the given output energy Pd is read from the map as the standard position BPF.

At step S158, the EFIECU 70 then calculates a position command value BP* from the standard position BPF, the revolving speed Ne, and the target engine speed Ne* according to Equation (10) given below:

$$BP^*=ke(Ne^*-Ne)+BPF \quad (10)$$

wherein ke represents a constant of proportionality. The position control value BP* is set in this manner, so that the engine 50 is stably driven at the target engine speed Ne*.

After setting the position command value BP*, the EFIECU 70 subtracts the position BP from the position command value BP* to yield a difference ΔBP at step S160. The actuator 68 then works to drive the throttle valve 66 by the difference ΔBP at step S162, and the program exits from the routine.

Figure 13:
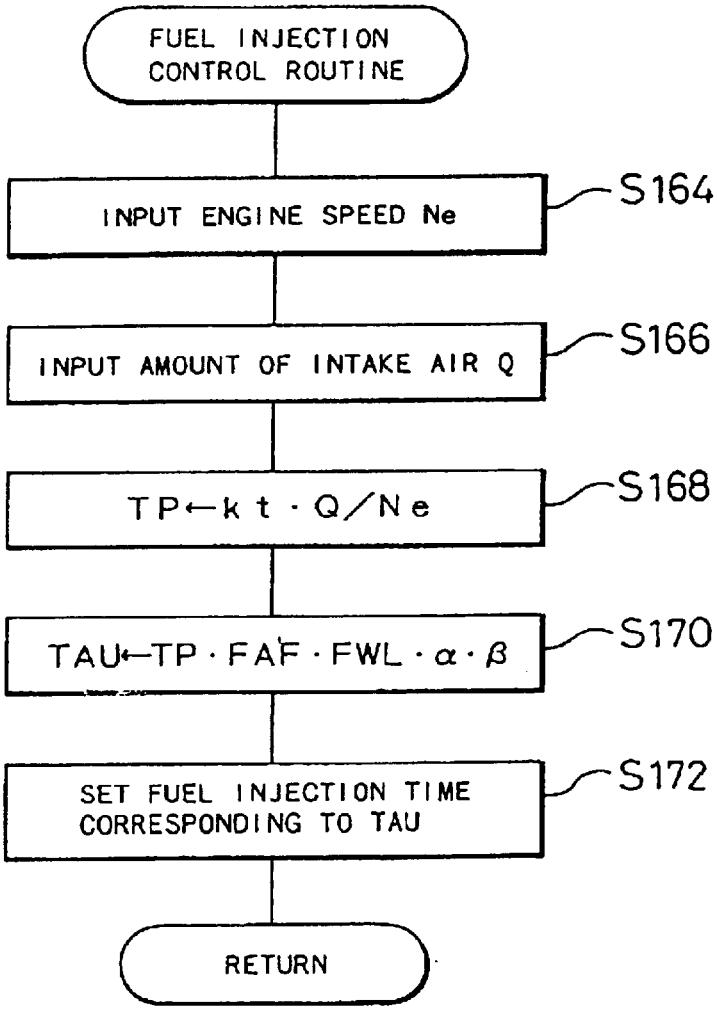
FIG. 13 is a flowchart showing a fuel injection control routine executed by the electronic control unit.

The following describes the fuel injection control executed according to the fuel injection control routine shown in the flowchart of FIG. 13. When the program enters the routine, the EFIECU 70 first receives data of revolving speed Ne of the engine 50 at step S164 and an amount of intake air Q at step S166. The amount of intake air Q can be calculated from the negative pressure in an intake manifold measured by the manifold vacuum sensor 72 and the revolving speed Ne of the engine 50.

At step S168, the EFIECU 70 then calculates a standard amount of fuel injection TP from the resolving speed Ne and the amount intake air Q input at steps S164 and S166 according to Equation (11) given below:

$$TP=kt\cdot Q/Ne \quad (11)$$

An actual amount of fuel injection TAU is then calculated at step S170 by multiplying the standard amount of fuel injection TP by required correction coefficients according to Equation (12) given below:

$$TAU=TP\cdot FAF\cdot FWL\cdot\alpha\cdot\beta \quad (12)$$

FAF, which represents an air/fuel ratio correction coefficient based on a lean-rich state of an air/fuel mixture detected by an air/fuel ratio sensor (not shown), gradually increases by integration until the output of the air/fuel ratio sensor reaches a value corresponding to the rich state of the air/fuel mixture, and then gradually decreases by integration until the output reaches a value corresponding to the lean state. FWL represents a warm-up increase correction coefficient and takes a value equal to or greater than 1.0 when the temperature of cooling water is not higher than 60° C. α and β represent other correction coefficients relating to, for example, intake temperature correction, transient correction, and power voltage correction.

After calculating the actual amount of fuel injection TAU at step S170, the program proceeds to step S172 to set a fuel injection time corresponding to the actual amount of fuel injection TAU on a counter (not shown) that determines an opening time period, for which the fuel injection valve 51 is open. The program then enters a fuel injection valve driving routine (not shown) to drive and open the fuel injection valve 51 for the opening time period present on the counter and to enable a required amount of fuel to be injected into an intake port of the engine 50.

As discussed above, the power output apparatus 20 of the embodiment selects a driving point attaining the highest possible efficiency among the respective driving points on each curve of constant energy output from the engine 50, and sets the torque Te and the revolving speed Ne at each selected driving point as the target engine torque Te* and the target engine speed Ne*. This enhances the efficiency of the engine 50 and thereby the efficiency of the whole power output apparatus 20. The selected driving points regarding the respective amounts of output energy can be joined with one another to form a continuous curve. The driving point of the engine 50 can thus be varied smoothly with a small amount of variation in output energy Pd. This structure effectively prevents the engine 50 from undesirably stalling or stopping.

The power output apparatus 20 of the embodiment sets the torque command value Tc* of the clutch motor 30 to lessen the difference between the actual revolving speed Ne of the engine 50 and the target engine speed Ne*. This structure enables the engine 50 to be stably driven at the target engine speed Ne*. Adjustment of the position BP of the throttle valve 66 is also carried out to reduce the difference between the actual revolving speed Ne of the engine 50 and the target engine speed Ne*. Such adjustment further facilitates the stable operation of the engine 50 at the target engine speed Ne*.

Although the driving points set as the target engine torque Te* and the target engine speed Ne* are continuous with respect to the amount of output energy in the power output apparatus 20 of the embodiment, they may be discontinuous as long as an abrupt change of the driving point of the engine 50 can be effectively avoided.

As mentioned above, the power output apparatus 20 of the embodiment sets the torque command value Tc* of the clutch motor 30 to lessen the difference between the actual revolving speed Ne of the engine 50 and the target engine speed Ne*. The target torque Te* of the engine 50 may, however, be directly set as the torque command value Tc*. The position command value BP* of the throttle valve 66 is also set to decrease the difference between the actual revolving speed Ne of the engine 50 and the target engine speed Ne*. The standard position BPF may, however, be directly set as the position command value BP*.

The power output apparatus 20 of the embodiment selects a driving point attaining the highest possible efficiency among the respective driving points on each curve of constant energy output from the engine 50, and sets the torque Te and the revolving speed Ne at each selected driving point as the target engine torque Te* and the target engine speed Ne*. Another possible structure sets the torque Te and the revolving speed Ne of a selected driving point, which attains the best possible emission among the respective driving points on each constant-output energy curve, as the target engine torque Te* and the target engine speed Ne*. This structure further improves the emission of the engine 50. Still another possible structure sets the torque Te and the revolving speed Ne of a selected driving point, which has the smallest possible driving noise among the respective driving points on each constant-output energy curve, as the target engine torque Te* and the target engine speed Ne*. This structure further lessens the driving noise of the engine 50.

In the power output apparatus 20 of the embodiment, a map of the selected driving point, which attains the highest possible efficiency among the respective driving points on each constant-output energy curve, is used to set the target engine torque Te* and the target engine speed Ne*. An alternative structure provides a plurality of maps, such as a map of a driving point with the highest efficiency, that of a driving point with the best emission, and that of a driving point with the smallest driving noise, and selects an appropriate map according to the environment in which the vehicle runs. By way of example, a map of the driving point with the highest efficiency is selected while the vehicle runs in the suburbs; and a map of the driving point with the best emission is selected while the vehicle runs in the town. This structure realizes the appropriate operation of the engine 50 based on the environment in which the vehicle runs. The user may select an appropriate map, for example, with a press of a selection button.

Figure 14:
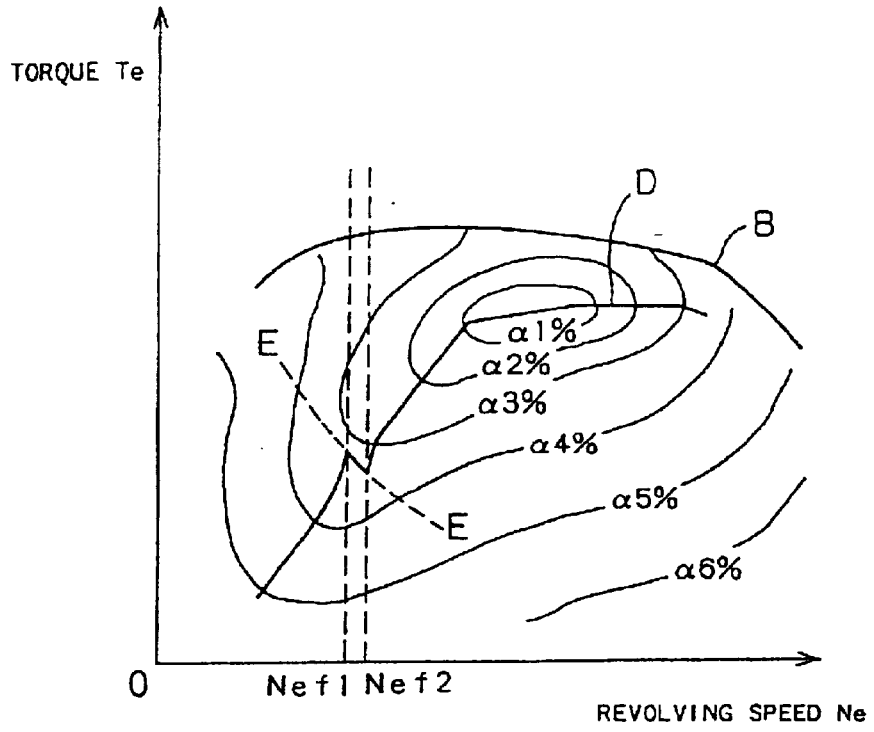
FIG. 14 is a graph showing driving points of the engine by taking into account a resonant revolving speed range of the vehicle or equipment mounted on the vehicle.
Figure 15:
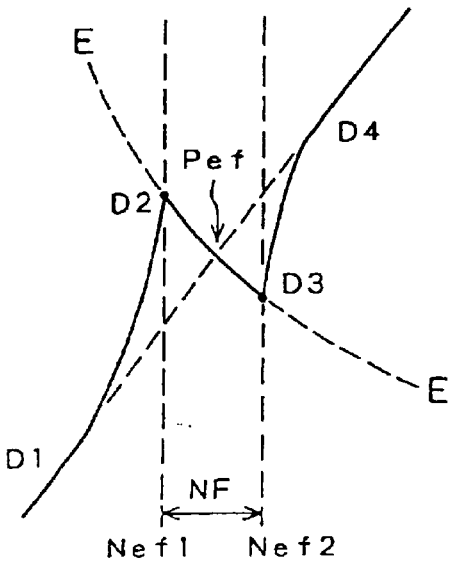
FIG. 15 is an enlarged view showing the resonant revolving speed range of FIG. 14 and its vicinity.

The power output apparatus 20 of the embodiment joins the selected driving points, which attain the highest possible efficiency among the respective driving points on the curves of constant energy output from the engine 50, with one another to yield a continuous curve, so as to provide a map for setting the target torque Te* and the target revolving speed Ne* of the engine 50. In accordance with another possible structure, however, the target engine torque Te* and the target engine speed Ne* may be set out of a predetermined range of driving points of the engine 50. In case that the vehicle or another equipment mounted on the vehicle resonates in a specific range of revolving speed of the engine 50, for example, it may be desirable to avoid driving points in this specific range of revolving speed (that is, resonant revolving speed range NF) when setting the target engine torque Te* and the target engine speed Ne*. The driving points of the engine 50 for setting the target torque Te* and the target revolving speed Ne* in the resonant revolving speed range NF are given as a curve D in FIG. 14. The curve D is identical with the curve A in the graph of FIG. 6, except an area in the vicinity of the resonant revolving speed range NF, that is a range in which the revolving speed Ne of the engine 50 is varied from Nef1 to Nef2. FIG. 15 is an enlarged view showing the area in the vicinity of the resonant revolving speed range NF.

Referring to FIG. 15, the curve D goes as points D1, D2, D3, and D4 in the resonant revolving speed range NF and in its vicinity. A curve E—E including the points D2 and D3 is a constant-output energy curve passing through a driving point Pef, which is on the curve A in the graph of FIG. 6 at a median of the resonant revolving speed range NF. Variation in target engine torque Te* and target engine speed Ne* on the curve D shifts the driving point of the engine 50 from the point D2 to the point D3 or vice versa when the output energy Pd is varied across the curve E—E. This causes an abrupt change of the driving point of the engine 50. Unless the resonant revolving speed range NF is significantly wide, the condition of the engine 50 can smoothly shift to the new driving point without stalling or stopping the engine 50.

Setting the target torque Te* and the target revolving speed Ne* of the engine 50 out of the resonant revolving speed range NF can effectively prevents the vehicle or another equipment mounted on the vehicle from resonating.

In the embodiment discussed above, the target torque Te* and the target revolving speed Ne* of the engine 50 are set out of the resonant revolving speed range NF in which the vehicle or another equipment mounted on the vehicle resonates. Other possible structures may, however, set the target torque Te* and the target revolving speed Ne* of the engine 50 out of a predetermined torque range, out of a predetermined revolving speed range and predetermined torque range (that is, a predetermined range of driving points), or out of a range of driving points in which the vehicle or another equipment mounted on the vehicle resonates with the driving noise of the engine 50.

The following describes another power output apparatus 20A as a second embodiment according to the present invention. The structure of the power output apparatus 20A of the second embodiment is identical with that of the power output apparatus 20 of the first embodiment, and is thus not described specifically. The numerals and symbols used in the description of the first embodiment have the same meanings in the second embodiment, unless otherwise specified.

Figure 16:
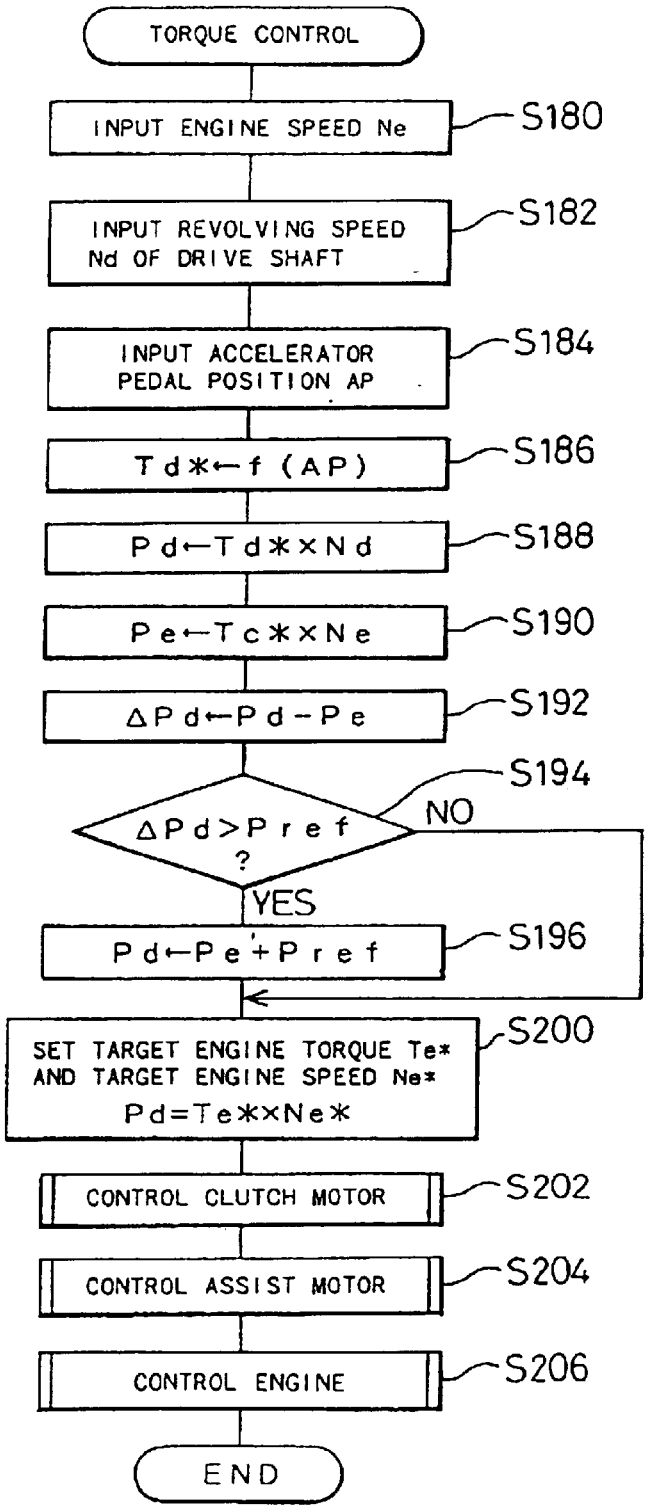
FIG. 16 is a flowchart showing a torque control routine executed in a second embodiment of the present invention by the control CPU of the controller.

The torque control in the power output apparatus 20A of the second embodiment is carried out by executing a torque control routine shown in the flowchart of FIG. 16, instead of the torque control routine in the flowchart of FIG. 5 executed by the power output apparatus 20 of the first embodiment.

When the program enters the torque control routine of FIG. 16, the control CPU 90 of the controller 80 first reads the revolving speed Ne of the engine 50 at step S180 and the revolving speed Nd of the drive shaft 22 at step S182. The control CPU 90 then reads the accelerator pedal position AP measured by the accelerator position sensor 65 at step S184, and determines the output torque command value Td* based on the input accelerator pedal position AP at step S186.

The control CPU 90 calculates a desired output energy Pd by multiplying the output torque command value Td* by the revolving speed Nd of the drive shaft 22 at step S188, and subsequently calculates an actual output energy Pe of the engine 50 by multiplying the torque command value Tc* of the clutch motor 30 by the revolving speed Ne of the engine 50 at step S190. The program then proceeds to step S192 to calculate a difference ΔPd between the desired output energy Pd and the actual output energy Pe. The torque command value Tc* of the clutch motor 30 is used for the calculation of the energy Pe actually output from the engine 550, because the torque Te of the engine 50 is not easily measured while it can be assumed that the torque Te of the engine 50 is equivalent to the torque Tc of the clutch motor 30, that is, the torque command value Tc*. The power output apparatus 20A of the second embodiment also carries out the clutch motor control routine of the first embodiment shown in the flowchart of FIG. 8 as described later, so that the torque command value Tc* of the clutch motor 30 is set at step S113 in the flowchart of FIG. 8.

The difference ΔPd is then compared with a predetermined threshold value Pref at step S194. The threshold value Pref is set as an energy difference between driving points, which can smoothly increase the energy Pe output from the engine 50 without stalling or stopping the engine 50. The threshold value Pref depends upon the characteristics of the engine and the map of the driving point. When the difference ΔPd is greater than the threshold value Pref at step S194, the program determines that the shift from the current driving point of the engine 50 to another driving point corresponding to the output energy Pd can not be implemented smoothly. The program accordingly proceeds to step S196 to add the threshold value Pref to the energy Pe actually output from the engine 50 and set a new output energy Pd, prior to the processing of step S200. When the difference ΔPd is equal to or less than the threshold value Pref, on the contrary, the program determines that the shift from the current driving point of the engine 50 to another driving point corresponding to the output energy Pd can be implemented smoothly, and directly goes to step S200.

At step S200, the target torque Te* and the target revolving speed Ne* of the engine 50 are set using the preset output energy Pd and a map corresponding to that of the first embodiment shown in FIG. 6. Based on the target engine torque Te* and the target engine speed Ne* thus obtained, the clutch motor 30, the assist motor 40, and the engine 50 are controlled respectively at steps S202, S204, and S206. The concrete procedures of steps S202 through S206 are identical with those of steps S108 through S111 of the first embodiment shown in the flowchart of FIG. 5. Like the first embodiment, although the control operations of the clutch motor 30, the assist motor 40, and the engine 50 are shown as separate steps for the matter of convenience, these controls are carried out simultaneously in the actual procedure.

Figure 17:
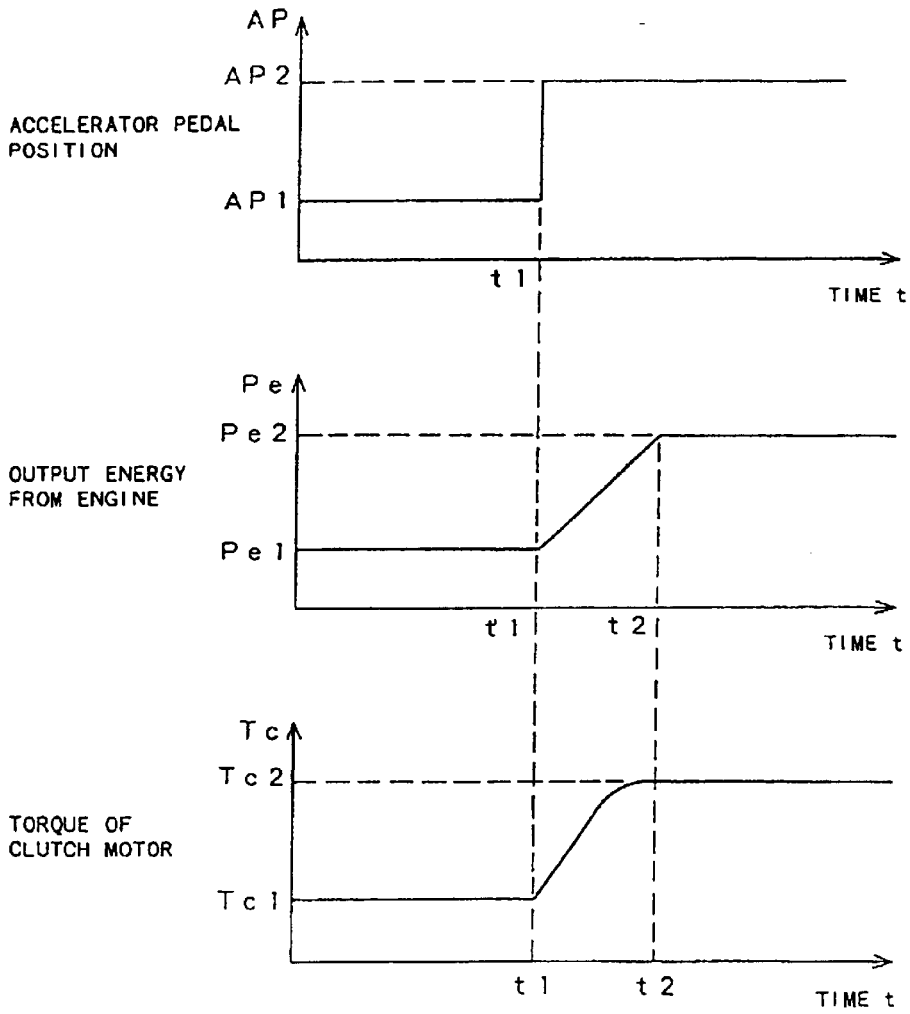
FIG. 17 shows variations in accelerator pedal position, output energy, and torque when the driver steps on the accelerator pedal.

This torque control enables the engine 50 to smoothly increase its output energy Pe, even when the driver steps on the accelerator pedal 64 to a relatively large depth. FIG. 17 shows the variations against time under such conditions. Referring to FIG. 17, by way of example, the driver steps on the accelerator pedal 64 to a relatively large depth at a time point t1 to change the accelerator pedal position AP from a value AP1 to another value AP2. The energy Pe actually output from the engine 50 has values Pe1 and Pe2 respectively corresponding to the values AP1 and AP2 of the accelerator pedal position AP. It is assumed here that the difference between the values Pe1 and Pe2 is remarkably larger than the threshold value Pref. The output energy Pd is then set at step S196 in the flowchart of FIG. 16 by adding the threshold value Pref to the energy Pe actually output from the engine 50, and is used for the control procedures of the engine 50, the clutch motor 30, and the assist motor 40. The energy Pe actually output from the engine 50 and the torque Tc of the clutch motor 30 thus increase little by little. The repetition of this processing enables the actual output energy Pe of the engine 50 to approach the value Pe2 and makes the difference between the actual output energy Pe and the value Pe2 equal to or less than the threshold value Pref. Under such conditions, the output energy Pd corresponding to the step-on amount of the accelerator pedal 64 is directly used for the control operations of the engine 50, the clutch motor 30, and the assist motor 40. The actual output energy Pe of the engine 50 eventually becomes coincident with the value Pe2 at a time point t2.

When the driver steps on the accelerator pedal 64 by a relatively large amount, the power output apparatus 20A of the second embodiment controls the engine 50, the clutch motor 30, and the assist motor 40, based on the output energy at a driving point to which the engine 50 can smoothly shift from the current driving point, instead of the output energy Pd corresponding to the step-on amount of the accelerator pedal 64. This structure enables the driving point of the engine 50 to be smoothly shifted to the driving point giving the output energy Pd corresponding to the step-on amount of the accelerator pedal 64, thereby effectively preventing the engine 50 from stalling or stopping due to an abrupt change of the driving point of the engine 50.

Like the first embodiment, the power output apparatus 20A of the second embodiment sets the torque Te and the revolving speed Ne at a specific driving point, which attains the highest possible efficiency among the respective driving points on each constant-output energy curve of the engine 50, as the target engine torque Te* and the target engine speed Ne*. This further enhances the operation efficiency of the engine 50 and thereby improves the efficiency of the whole power output apparatus 20A.

Although the power output apparatus 20A of the second embodiment uses the predetermined threshold value Pref, the threshold value Pref may be set according to the energy currently output from the engine 50. This alternative structure enables the threshold value Pref to be set more suitably for each driving point of the engine 50.

Figure 18:
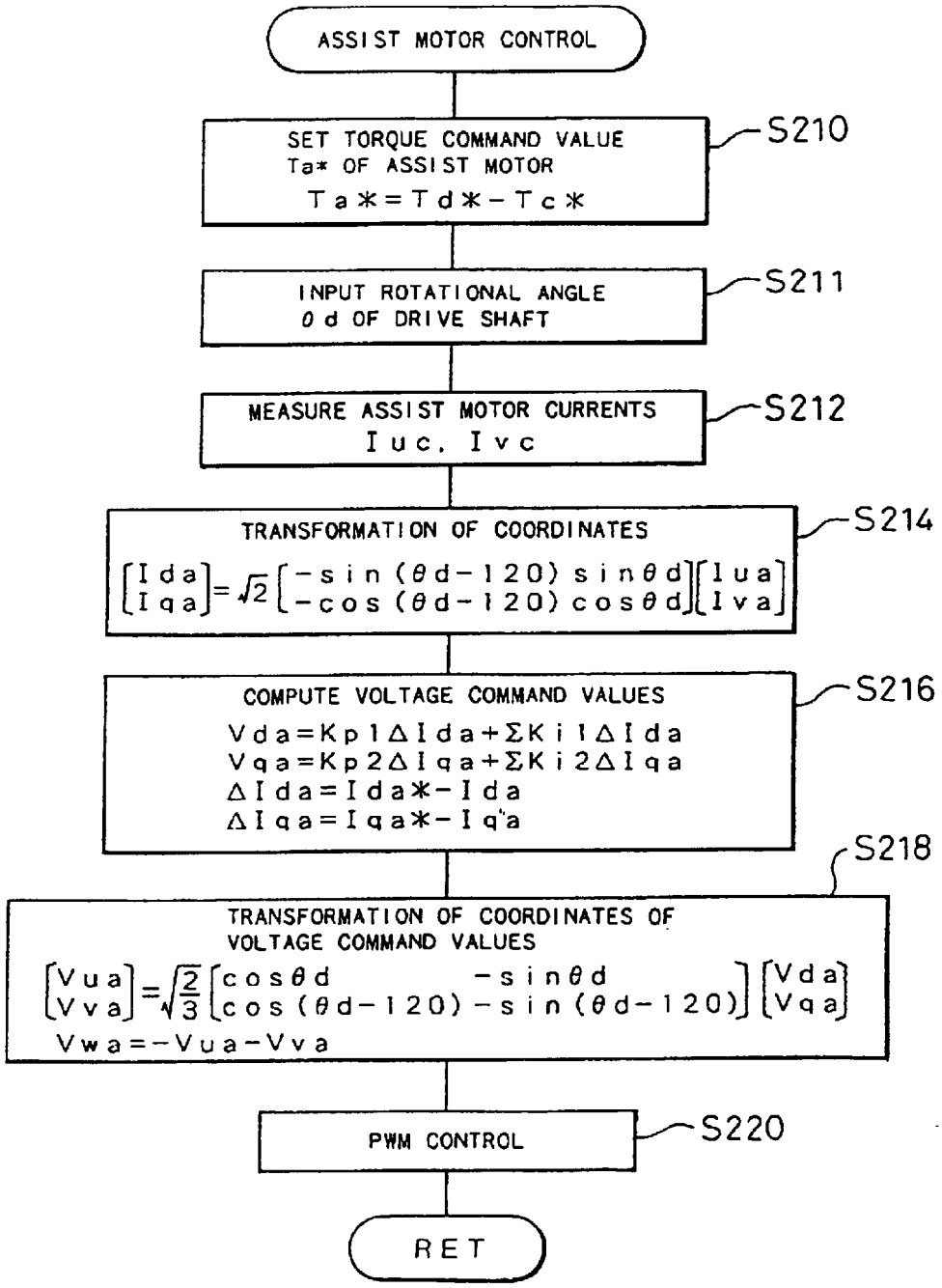
FIG. 18 is a flowchart showing a control procedure of the assist motor executed by the controller in a modification of the second embodiment.

In the power output apparatus 20A of the second embodiment, when the output energy Pd is set by adding the threshold value Pref to the energy Pe actually output from the engine 50, the control procedure is carried out to enable the newly set output energy Pd to be applied to the drive shaft 22. In accordance with another possible structure, an insufficient amount of energy may be supplemented by the power stored in the battery 94. In this case, the assist motor 40 is controlled according to an assist motor control routine shown in the flowchart of FIG. 18, instead of the control routine of FIGS. 10 and 11. In the assist motor control routine of FIG. 18, the torque command value Ta* of the assist motor 40 is set at step S210 by subtracting the torque command value Tc* of the clutch motor 30 set at step S113 in the clutch motor control routine of FIG. 8 from the output torque command value Td* determined at step S186 in the torque control routine of FIG. 16. The concrete procedures of steps S211 through S220 are identical with those of steps S141 through S150 in the assist motor control routine of FIGS. 10 and 11. In case that the step-on amount of the accelerator pedal 64 is remarkably varied and the engine 50 can not output the power corresponding to the step-on amount of the accelerator pedal 64, that is, even in the transient period while the driving point of the engine 50 is being shifted to a new target driving point for outputting the power corresponding to the step-on amount of the accelerator pedal 64, this control procedure of the assist motor 40 enables the torque set as the output torque command value Td* corresponding to the step-on amount of the accelerator pedal 64 to be output to the drive shaft 22.

The following describes still another power output apparatus 20B as a third embodiment according to the present invention. The structure of the power output apparatus 20B of the third embodiment is identical with that of the power output apparatus 20 of the first embodiment, and is thus not described specifically. The numerals and symbols used in the description of the first embodiment have the same meanings in the third embodiment, unless otherwise specified.

The power output apparatus 20B of the third embodiment executes the torque control routine of FIG. 5 carried out by the power output apparatus 20 of the first embodiment. The control procedure of the clutch motor 30 executed at step S108, however, follows a clutch motor control routine shown in the flowcharts of FIGS. 19 and 20, in place of the clutch motor control routine of FIG. 8. Like the power output apparatus 20 of the first embodiment, the control procedures of the assist motor 40 at step S110 and of the engine 50 at step S111 in the torque control routine of FIG. 5 respectively follow the assist motor control routine of FIGS. 10 and 11 and the throttle valve position control routine of FIG. 12 and the fuel injection control routine of FIG. 13. The following mainly describes the difference between the clutch motor control routine of FIG. 8 executed by the power output apparatus 20 of the first embodiment and that of FIGS. 19 and 20 executed by the power output apparatus 20B of the third embodiment.

When the program enters the routine, the control CPU 90 of the controller 80 reads the torque Tc which the clutch motor 30 applies to the drive shaft 22, that is, the torque command value Tc* currently set in the clutch motor 30, from the RAM 90a at step S230. The control CPU 90 then receives data of rotational speed ω of the crankshaft 56 of the engine 50 (hereinafter referred to as the rotational speed of the engine 50) at step S232. The rotational speed ω of the engine 50 may be calculated from the rotational angle θe of the crankshaft 56 which has been read from the resolver 39, or alternatively calculated from the revolving speed Ne of the engine 50 ($\omega=2\pi\times Ne$). The program then proceeds to step S234, at which the control CPU 90 subtracts previous data of rotational speed ω (previous ω) input in a previous cycle of this routine from the current data of rotational speed ω of the engine 50, and divides the difference by an interval Δt of activating this routine, so as to determine a change rate ω' of rotational speed of the engine 50. This routine can be normally executed even immediately after a start of the vehicle, since the previous ω is initialized to zero in an initialization routine (not shown) executed prior to this routine.

After calculating the change rate ω' of rotational speed of the engine 50, the program proceeds to step S236 to calculate an estimated torque Tef, which the engine 50 is assumed to currently output, according to Equation (13) given below:

$$Tef=Tc+1\times\omega' \tag{13}$$

The value '1' in the right side of Equation (13) represents the moment of inertia around the crankshaft 56, the outer rotor 32 linked with the crankshaft 56, or the like. Equation (13) is led as an equation of motion, based on the equilibrium of forces acting on the crankshaft 56. Namely the torque Te of the engine 50 acting on the crankshaft 56 is equal to the sum of the torque Tc of the clutch motor 30 and the force (1×ω') expressed as the motion of acceleration in the system.

Figure 21:
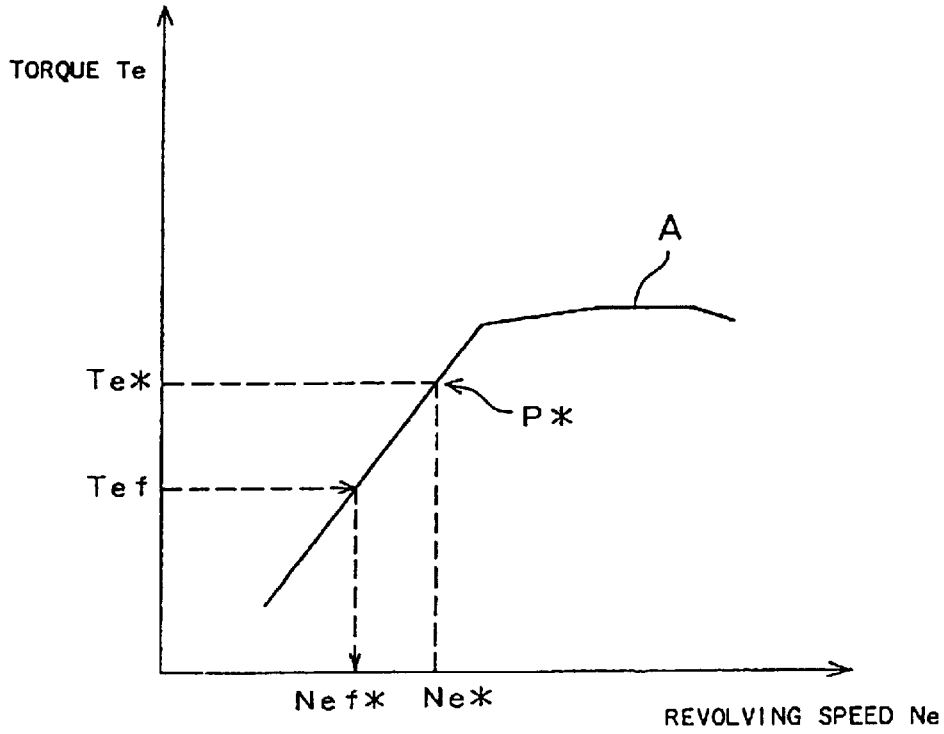
FIG. 21 shows a process of leading the estimated target revolving speed from the estimated torque.

At subsequent step S238, the control CPU 90 reads a revolving speed (estimated target revolving speed) Nef* corresponding to the estimated torque Tef of the engine 50 from the map of FIG. 6 for determining the driving point of the engine 50. For example, as shown in FIG. 21, the estimated target revolving speed Nef* is determined as a value corresponding to the estimated torque Tef on a curve A of driving points attaining the highest possible efficiency of the engine 50.

The torque command value Tc* of the clutch motor 30 is then calculated at step S240 from the estimated torque Tef and the estimated target revolving speed Nef* according to Equation (14) given below:

$$Tc^*=Tef+kc(Ne-Nef^*)+\int ki(Ne-Nef^*)dt \tag{14}$$

The second term in the right side of Equation (14) represents a correction term based on the difference between the actual revolving speed Ne of the engine 50 and the estimated target revolving speed Nef*, wherein kc denotes a constant. The third term in the right side of Equation (14) represents an integral term to cancel the stationary deviation of the revolving speed Ne of the engine 50 from the estimated target revolving speed Nef*, wherein ki denotes a constant. The clutch motor 30 is controlled with the torque command value Tc* of the clutch motor 30 thus obtained, so that the engine 50 is controlled to be driven at a specific driving point where the torque Te is equal to the estimated torque Tef and the revolving speed Ne is equal to the estimated target revolving speed Nef*.

Figure 20:
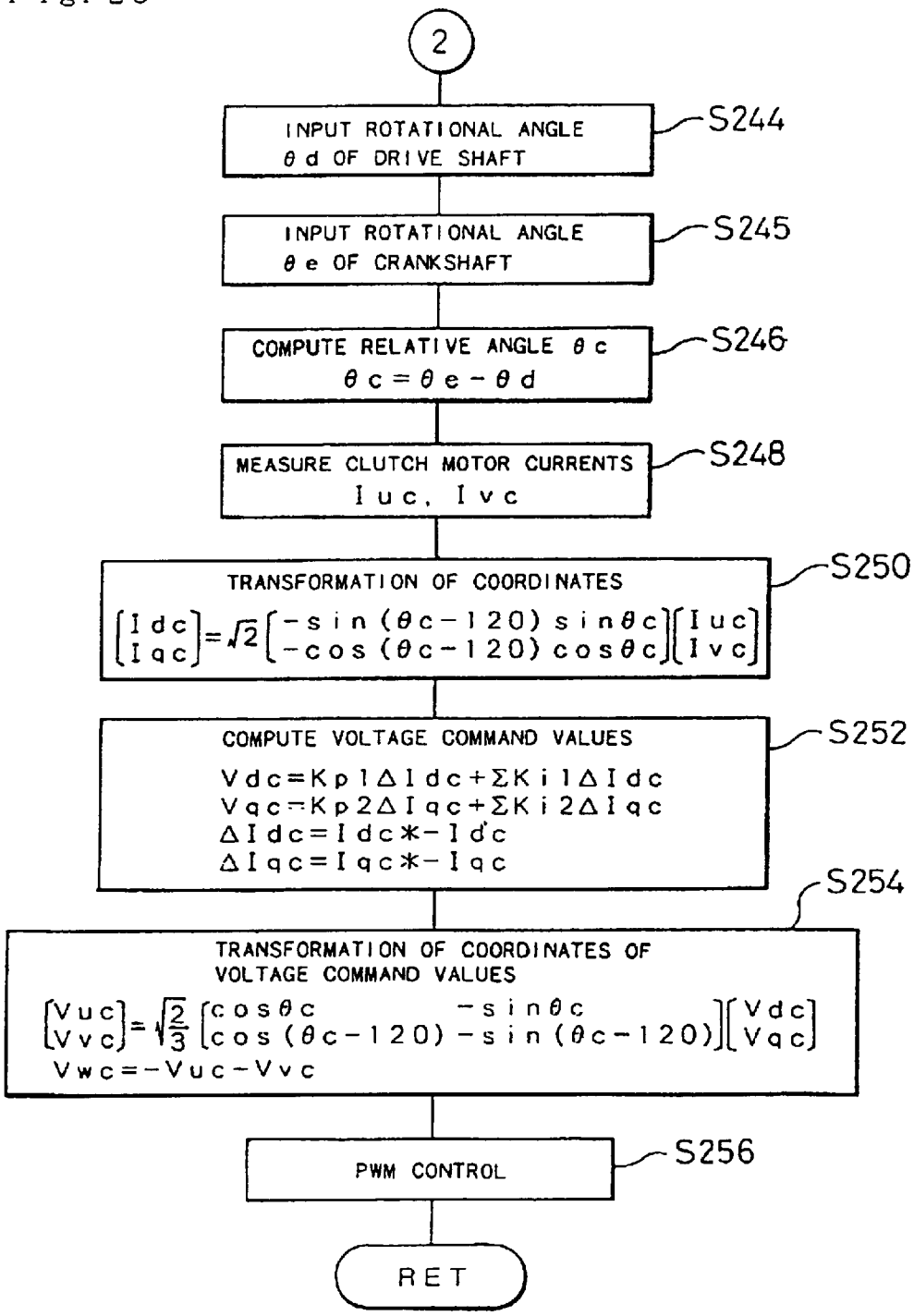

After setting the torque command value Tc* of the clutch motor 30, the control CPU 90 of the controller 80 executes the processing of steps S244 through S256 in the flowchart of FIG. 20. The concrete procedures are identical with those of steps S114 through S126 in the clutch motor control routine of FIG. 8 carried out by the power output apparatus 20 of the first embodiment, and are thus not specifically described here.

Figure 22:
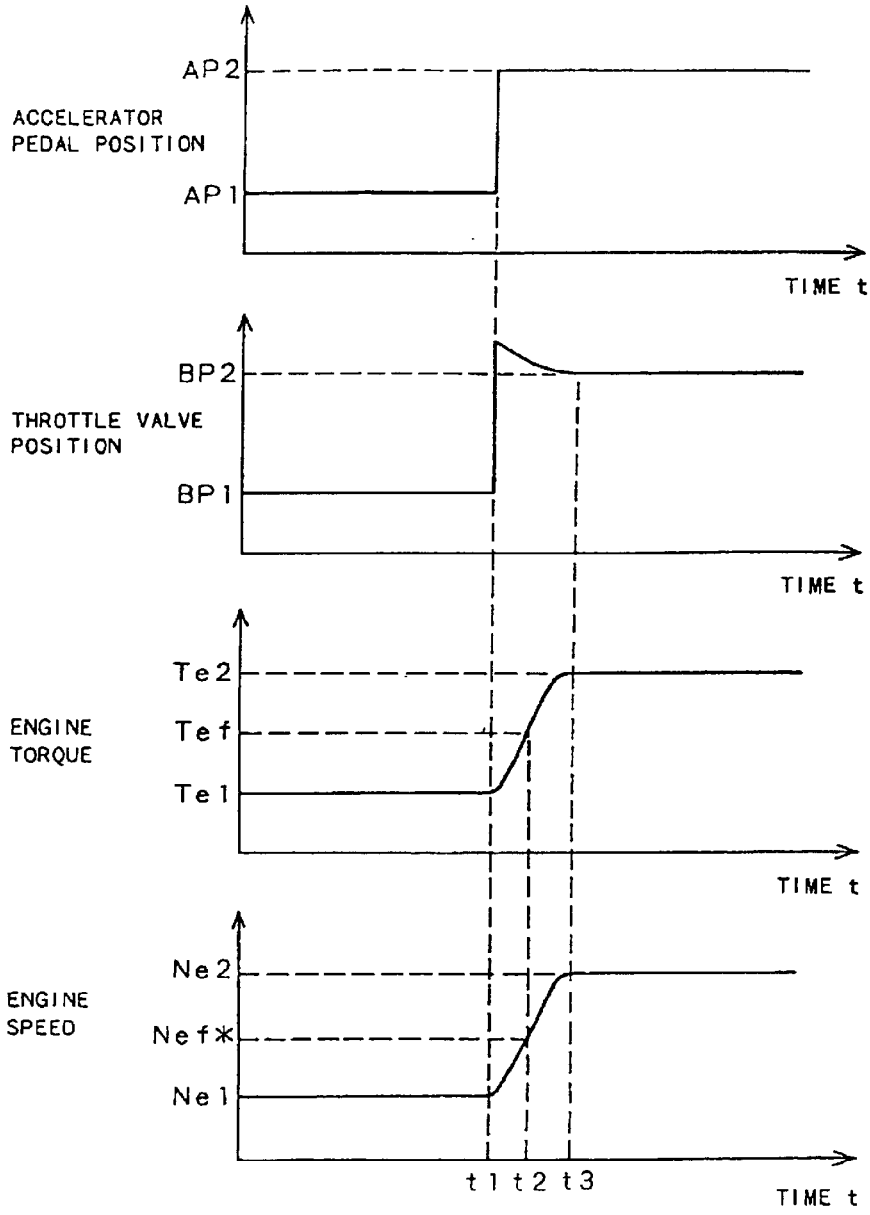
FIG. 22 shows variations in accelerator pedal position, throttle valve position, and torque and revolving speed of the engine when the driver steps on the accelerator pedal.

FIG. 22 shows the operations in the power output apparatus 20B of the third embodiment when the driver steps on the accelerator pedal 64 to a relatively large depth. By way of example, it is assumed that the driver steps on the accelerator pedal 64 by a relatively large amount at a time point t1 to change the accelerator pedal position AP from a value AP1 to another value AP2. The change of the accelerator pedal position AP causes the target torque Te* and the target revolving speed Ne* of the engine 50 to be newly set based on the new accelerator pedal position AP by the processing of steps S100 through S104 in the torque control routine of FIG. 5. The engine 50 is subsequently controlled at step S111 in the same routine, based on the target engine torque Te* and the target engine speed Ne*. In order to drive the engine 50 at the driving point defined by the target engine torque Te* and the target engine speed Ne*, the throttle valve position control routine of FIG. 12 is carried out to change the position BP of the throttle valve 66, whereas the fuel injection control routine of FIG. 13 is carried out to vary the amount of fuel injection from the fuel injection valve 51.

The standard position BPF of the throttle valve 66 based on the accelerator pedal position AP is set equal to a value BP2. Immediately after a change of the accelerator pedal position AP, there is a difference between the actual revolving speed Ne of the engine 50 and the target engine speed Ne*. The position BP of the throttle valve 66 is corrected according to the difference and temporarily made greater than the value BP2. The position BP of the throttle valve 66 then gradually decreases to the value BP2 as the revolving speed Ne of the engine 50 approaches the target engine speed Ne*.

As discussed previously, the engine 50 has a poorer response than motors and can thus not be driven at a target driving point immediately after a change of the position BP of the throttle valve 66. When the torque Tc of the clutch motor 30 acting as a loading torque of the engine 50 is set equal to the target engine torque Te* immediately after a change in accelerator pedal position AP, the engine 50 may stall or even stop in some cases. The power output apparatus 20B of the third embodiment carries out the clutch motor control routine of FIGS. 19 and 20 to calculate the estimated torque Tef, which the engine 50 is assumed to currently output, from the revolving speed Ne of the engine 50 and set the torque command value Tc* of the clutch motor 30 based on the estimated torque Tef and the estimated target revolving speed Nef* led from the estimated torque Tef. The engine 50 accordingly shifts its driving point to a target driving point (point P*) along the curve A shown in FIG. 21. Referring to FIG. 22, for example, at an arbitrary time point t2 between the time point t1 when the accelerator pedal position AP is varied and a time point t3 when the engine 50 is driven at the driving point of the target engine torque Te* and the target engine speed Ne*, the engine 50 is driven at a driving point defined by the estimated torque Tef, which the engine 50 is assumed to currently output, and by the estimated target revolving speed Nef* corresponding to the estimated torque Tef and read from the map of FIG. 6.

As discussed above, the power output apparatus 20B of the third embodiment estimates the torque currently output from the engine 50, and controls the torque Tc of the clutch motor 30 in order to enable the engine 50 to be driven at the driving point attaining the highest possible efficiency with respect to the estimated torque. The engine 50 can thus be driven at driving points of the highest possible efficiency. In case that the target driving point of the engine 50 is a fixed stationary state, the engine 50 is stably driven at the target driving point. When the target driving point is changed, the engine 50 is smoothly shifted to the new target driving point along the path of high-efficiency driving points. With a change of the target driving point, the position BP of the throttle valve 66 is immediately varied to a value corresponding to the new target driving point, so that the engine 50 can be quickly shifted to the new target driving point.

Like the first embodiment, the power output apparatus 20B of the third embodiment sets the torque Te and the revolving speed Ne at a specific driving point, which attains the highest possible efficiency among the respective driving points on each constant-output energy curve of the engine 50, as the target engine torque Te* and the target engine speed Ne*. This further enhances the operation efficiency of the engine 50 and thereby improves the efficiency of the whole power output apparatus 20B.

In the power output apparatus 20B of the third embodiment, the control procedure of the assist motor 40 executed at step S110 in the torque control routine of FIG. 5 follows the assist motor control routine shown in FIGS. 10 and 11. It may, however, alternatively follow the assist motor control routine shown in the flowchart of FIG. 18. In the latter case, when there is a difference between the energy output from the engine 50 and the energy to be output to the drive shaft 22, for example, while the engine 50 is being shifted to a new target driving point with a significant change in accelerator pedal position AP, the battery 94 is charged with the excess energy or the insufficient energy is discharged from the battery 94. Even in the transient period when the engine 50 has not yet reached the new target driving point with a significant change in accelerator pedal position AP, this structure enables the torque set as the output torque command value Td* corresponding to the step-on amount of the accelerator pedal 64 to be output to the drive shaft 22.

Figure 23:
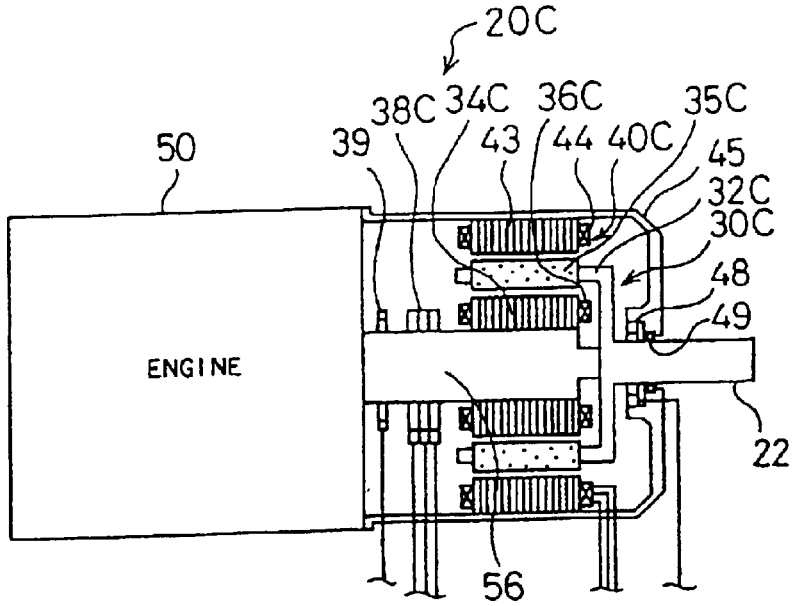
FIG. 23 shows structure of another power output apparatus as a modification of the first through the third embodiments.

In the structure of the power output apparatuses 20, 20A, and 20B of the first through the third embodiments discussed above, the clutch motor 30 and the assist motor 40 are separately attached to the different positions of the drive shaft 22. Like a power output apparatus 20C illustrated in FIG. 23 as a modification of the power output apparatus 20, however, the clutch motor and the assist motor may be joined integrally with each other. A clutch motor 30C of the power output apparatus 20C includes an inner rotor 34C connecting with the crankshaft 56 and an outer rotor 32C linked with the drive shaft 22. Three-phase coils 36C are attached to the inner rotor 34C, and permanent magnets 35C are set on the outer rotor 32C in such a manner that the outer surface and the inner surface thereof have different magnetic poles. An assist motor 40C includes the outer rotor 32C of the clutch motor 30C and a stator 43 with three-phase coils 44 mounted thereon. In this structure, the outer rotor 32C of the clutch motor 30C also works as the rotor of the assist motor 40C. Since the three-phase coils 36C are mounted on the inner rotor 34C linked with the crankshaft 56, the rotary transformer 38 for supplying electric power to the three-phase coils 36C of the clutch motor 30C is attached to the crankshaft 56.

In the power output apparatus 20C, the voltage applied to the three-phase coils 36C on the inner rotor 34C is controlled against the inner-surface magnetic pole of the permanent magnets 35C set on the outer rotor 32C. This enables the clutch motor 30C to work in the same manner as the clutch motor 30 of the power output apparatuses 20, 20A, and 20B of the first through the third embodiments having the clutch motor 30 and the assist motor 40 separately attached to the drive shaft 22. The voltage applied to the three-phase coils 44 on the stator 43 is controlled against the outer-surface magnetic pole of the permanent magnets 35C set on the outer rotor 32C. This enables the assist motor 40C to work in the same manner as the assist motor 40 of the power output apparatus 20. All the operations of the power output apparatuses 20, 20A, and 20B of the first through the third embodiments discussed above are accordingly applicable to the power output apparatus 20C of modified structure. The operations include the torque control process based on the routine of FIG. 5 or FIG. 16, the clutch motor control process based on the routine of FIG. 8 or FIGS. 19 and 20, the assist motor control process based on the routine of FIGS. 10 and 11 or FIG. 18, and modifications thereof.

The outer rotor 32C functions concurrently as one of the rotors in the clutch motor 30C and as the rotor of the assist motor 40C, thereby effectively reducing the size and weight of the power output apparatus 20C.

Figure 24:
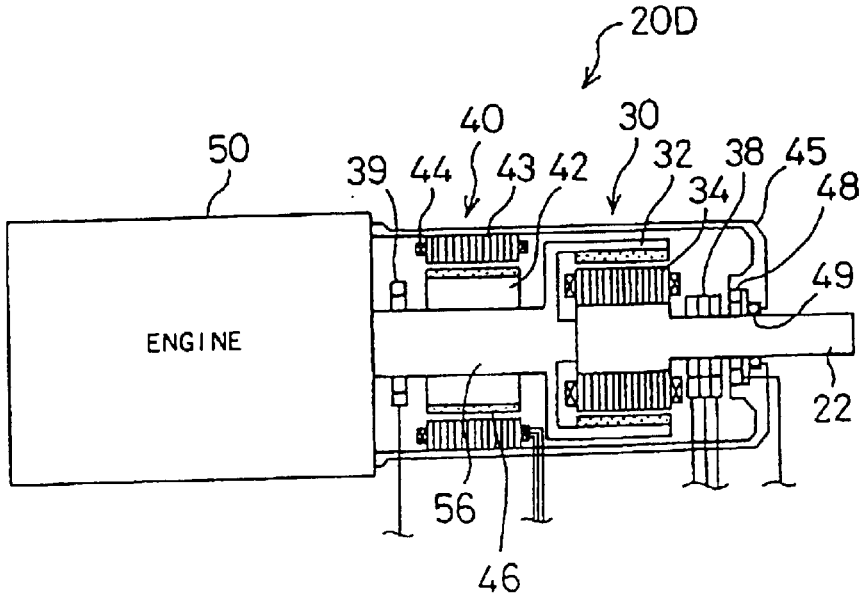
FIG. 24 shows structure of still another power output apparatus as a fourth embodiment of the present invention.

The following describes another power output apparatus 20D as a fourth embodiment according to the present invention. FIG. 24 schematically illustrates structure of the power output apparatus 20D of the fourth embodiment. Referring to FIG. 24, the power output apparatus 20D of the fourth embodiment has a similar structure to that of the power output apparatus 20 of the first embodiment, except that the assist motor 40 is attached to the crankshaft 56 placed between the engine 50 and the clutch motor 30. The same part as that of the power output apparatus 20 of the first embodiment shown in FIG. 1, such as the controller 80, is thus omitted from the drawing of FIG. 24. The power output apparatus 20D of the fourth embodiment can be mounted on the vehicle in the same manner as shown in FIG. 3. The constituents of the power output apparatus 20D of the fourth embodiment that are identical with those of the power output apparatus 20 of the first embodiment are expressed by like numerals and not specifically described here. The numerals and symbols used in the description of the first embodiment have the same meanings in the fourth embodiment, unless otherwise specified.

The power output apparatus 20D of the fourth embodiment works in the manner discussed below. By way of example, it is assumed that the engine 50 is driven at a driving point P1 (torque Te=T1 and revolving speed Ne=N1) on the constant-output energy curve of FIG. 4 defined by the torque and the revolving speed, and that the revolving speed Nd of the drive shaft is equal to a value N2. When the assist motor 40 attached to the crankshaft 56 applies a torque Ta (Ta=T2−T1) to the crankshaft 56, energy expressed as the sum of areas G2 and G3 in FIG. 4 is given to the crankshaft 56, so that the torque on the crankshaft 56 becomes equal to a value T2 (=T1+Ta). When the torque Tc of the clutch motor 30B is controlled to have the value T2, the torque Tc (=T1+Ta) is transmitted to the drive shaft 22, while electric power based on the revolving speed difference Nc between the revolving speed Ne of the engine 50 and the revolving speed Nd of the drive shaft Nd (that is, energy expressed by the sum of areas G1 and G3) is regenerated by the clutch motor 30. The torque Ta of the assist motor 40 is then set to be just compensated by the electric power regenerated by the clutch motor 30, and the regenerative power is supplied to the second driving circuit 92 via the power lines L1 and L2, so that the assist motor 40 is driven with the regenerative power.

In accordance with another example, it is assumed that the engine 50 is driven at a driving point P2 of FIG. 4 (torque Te=T2 and revolving speed Ne=N2) and that the revolving speed Nd of the drive shaft 22 is equal to the value N1. When the torque Ta of the assist motor 40 is controlled to have the value (T2−T1), the assist motor 40 carries out the regenerative operation and regenerates energy (electric power) expressed by the area G2 in FIG. 4 from the crankshaft 56. In the clutch motor 30, on the other hand, the inner rotor 34 rotates relative to the outer rotor 32 in the direction of rotation of the drive shaft 22 at the revolving speed difference Nc (=N1-N2). The clutch motor 30 accordingly functions as a normal motor and gives energy expressed by the area G1 corresponding to the revolving speed difference Nc to the drive shaft 22 as the energy of rotational motion. The torque Ta of the assist motor 40 is then set to enable the electric power consumed by the clutch motor 30 to be just compensated by the electric power regenerated by the assist motor 40, so that the clutch motor 30 is driven with the electric power regenerated by the assist motor 40.

Like the power output apparatus 20 of the first embodiment, in the power output apparatus 20D of the fourth embodiment, the torque Ta of the assist motor 40 and the torque Tc of the clutch motor 30 are controlled to hold Equations (15) and (16) given below. This enables the energy output from the engine 50 to be freely subjected to torque conversion and output to the drive shaft 22. The relations of Equations (15) and (16) represent an ideal state having the efficiency of 100%. In the actual state, Tc×Nd and Ta become a little smaller.

$$Te \times Ne = Tc \times Nd \tag{15}$$

$$Te + Ta = Tc \tag{16}$$

The power output apparatus 20D of the fourth embodiment can execute the torque control routine of FIG. 5, the clutch motor control routine of FIG. 8, the assist motor control routine of FIGS. 10 and 11, the throttle valve position control routine of FIG. 12, and the fuel injection control routine of FIG. 13, which are carried out by the power output apparatus 20 of the first embodiment. The power output apparatus 20D can also execute the torque control routine of FIG. 16 carried out by the power output apparatus 20A of the second embodiment and the clutch motor control routine of FIGS. 19 and 20 carried out by the power output apparatus 20B of the third embodiment. The power output apparatus 20D can further execute the assist motor control routine of FIG. 18 which may be carried out by the power output apparatus 20A of the second embodiment or the power output apparatus 20B of the third embodiment. When the target torque Te* and the target revolving speed Ne* of the engine 50 are set at step S104 in the torque control routine of FIG. 5 or at step S200 in the torque control routine of FIG. 16, the driving point which attains the highest possible efficiency among the respective driving points on each constant-output energy curve of the engine 50 can be set as the target driving point of the engine 50 as discussed above with the drawings of FIGS. 6 and 7.

The primary difference of the power output apparatus 20D of the fourth embodiment from the power output apparatuses 20 and 20A of the first and the second embodiments is the arrangement of the clutch motor 30 and the assist motor 40. The difference in arrangement inverts the power control and regenerative control of the clutch motor 30 and the assist motor 40 that are determined by the relationship between the revolving speed Ne of the engine 50 and the revolving speed Nd of the drive shaft 22. This also varies the setting of the torque command value Tc* of the clutch motor 30 at step S113 in the clutch motor control routine of FIG. 8 and the setting of the torque command value Ta* of the assist motor 40 at step S136 or S138 in the assist motor control routine of FIG. 10. When neglecting the efficiency of the clutch motor 30 and the assist motor 40, the power output apparatus 20D of the fourth embodiment can determine the torque command value Tc* of the clutch motor 30 at step S113 in the flowchart of FIG. 8 according to Equation (17) given below, instead of the above Equation (1), and determine the torque command value Ta* of the assist motor 40 at steps S131 through S140 in the flowchart of FIG. 10 according to Equation (18) given below:

$$Tc^*=kc(Ne-Ne^*)+Te^*+Ta^* \quad (17)$$

$$Ta^*=Td^*-Tc^* \quad (18)$$

The primary difference of the power output apparatus 20D of the fourth embodiment from the power output apparatus 20B of the third embodiment is also the arrangement of the clutch motor 30 and the assist motor 40. The difference in arrangement varies the calculation of the estimated torque Tef of the engine 50 at step S236 in the clutch motor control routine of FIG. 19 and the setting of the torque command value Tc* of the clutch motor 30 at step S240. The calculation of the estimated torque Tef of the engine 50 at step S236 follows Equation (19) given below instead of the above Equation (13), whereas Equation (20) given below is used instead of the above Equation (14) for the calculation of the torque command value Tc* of the clutch motor 30 at step S240.

$$Tef=Tc+1\times\omega'-Ta \quad (19)$$

$$Tc^*=Tef+Ta+kc(Ne-Nef^*)+\int ki(Ne-Nef^*)dt \quad (20)$$

As discussed above, the power output apparatus 20D of the fourth embodiment uses Equations (17) and (18) to implement the torque control routine of FIG. 5, the clutch motor control routine of FIG. 8, the assist motor control routine of FIGS. 10 and 11, and other related routines carried out by the power output apparatus 20 of the first embodiment. The torque Te and the revolving speed Ne at a specific driving point, which attain the highest possible efficiency among the respective driving points on each constant-output energy curve of the engine 50, are set as the target engine torque Te* and the target engine speed Ne*. This enhances the efficiency of the engine 50 and thereby improves the efficiency of the whole power output apparatus 20D. The driving points set as the target engine torque Te* and the target engine speed Ne* are continuous with respect to the amount of output energy. The driving point of the engine 50 can thus be shifted smoothly with a little change in output energy Pd.

The power output apparatus 20D of the fourth embodiment can also execute the torque control routine of FIG. 16, which is carried out by the power output apparatus 20A of the second embodiment. When the driver steps on the accelerator pedal 64 by a relatively large amount, the power output apparatus 20D controls the engine 50, the clutch motor 30, and the assist motor 40, based on the output energy at a driving point to which the engine 50 can smoothly shift from the current driving point, instead of the output energy Pd corresponding to the step-on amount of the accelerator pedal 64. This structure enables the driving point of the engine 50 to be smoothly shifted to the driving point giving the output energy Pd corresponding to the step-on amount of the accelerator pedal 64, thereby effectively preventing the engine 50 from stalling or stopping due to an abrupt change of the driving point of the engine 50.

Figure 19:
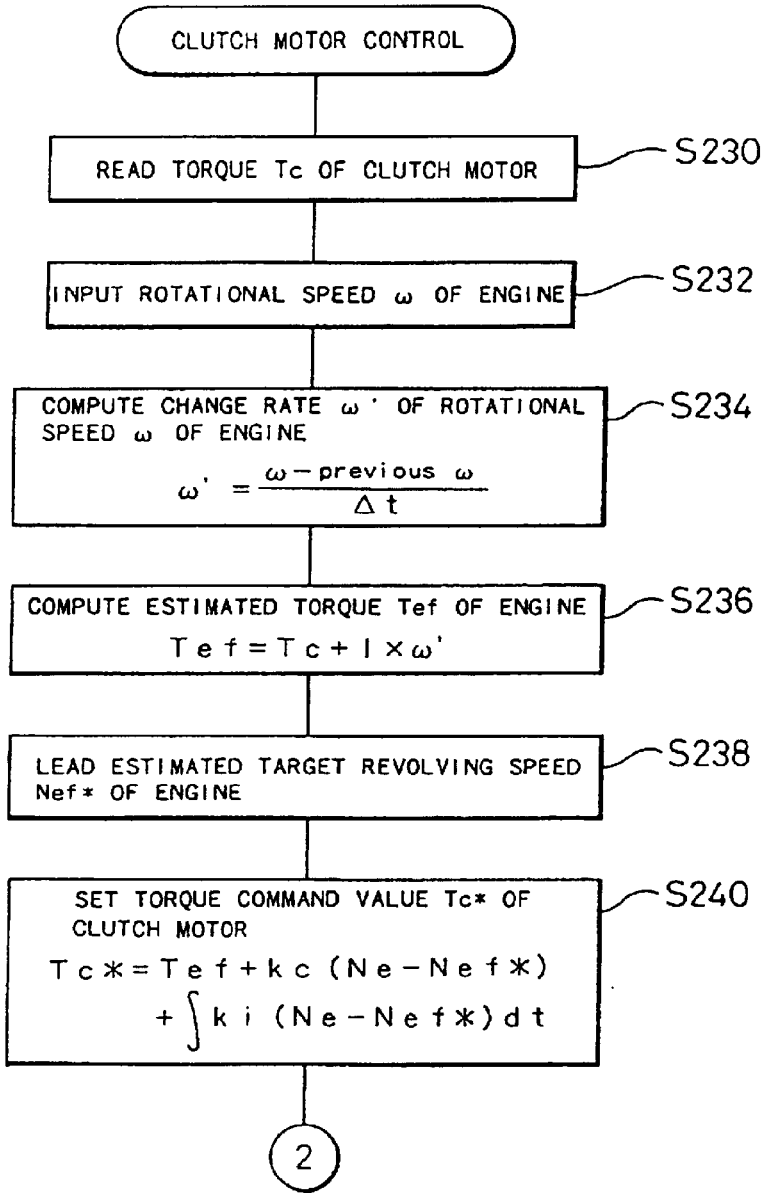
FIGS. 19 and 20 are flowcharts showing a control procedure of the clutch motor executed in a third embodiment of the present invention by the controller.

The power output apparatus 20D of the fourth embodiment uses Equations (19) and (20) to implement the torque control routine of FIG. 5 and the clutch motor control routine of FIGS. 19 and 20 carried out by the power output apparatus 20B of the third embodiment. The power output apparatus 20D estimates the torque currently output from the engine 50, and controls the torque Tc of the clutch motor 30 in order to enable the engine 50 to be driven at the driving point attaining the highest possible efficiency with respect to the estimated torque. The engine 50 can thus be driven at driving points of the highest possible efficiency. In case that the target driving point of the engine 50 is a fixed stationary state, the engine 50 is stably driven at the target driving point. When the target driving point is changed, the engine 50 is smoothly shifted to the new target driving point along the path of high-efficiency driving points. With a change of the target driving point, the position BP of the throttle valve 66 is immediately varied to a value corresponding to the new target driving point, so that the engine 50 can be quickly shifted to the new target driving point.

The torque command value Tc* of the clutch motor 30 is set to lessen the difference between the actual revolving speed Ne of the engine 50 and the target engine speed Ne*. The engine 50 can thus be driven stably at the target engine speed Ne*. The position BP of the throttle valve 66 is also adjusted to decrease the difference between the revolving speed Ne of the engine 50 and the target engine speed Ne*. This further ensures stable operation of the engine 50 at the target engine speed Ne*.

Figure 25:
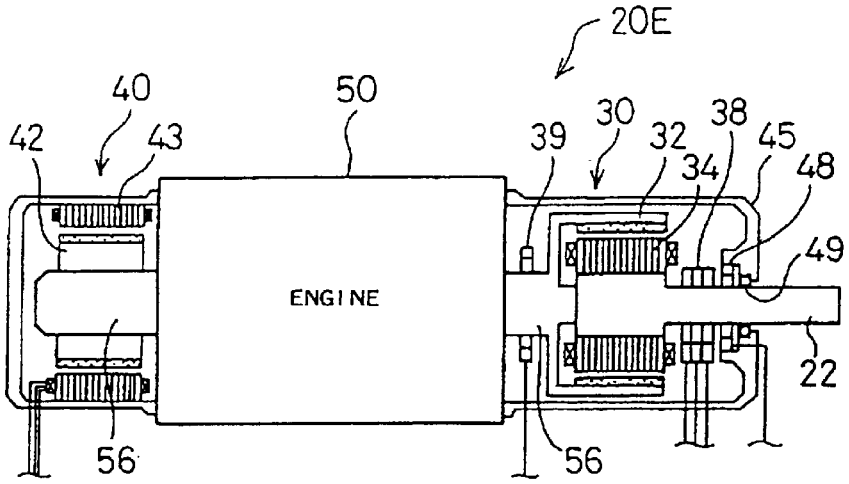
FIG. 25 shows structure of another power output apparatus as a modification of the fourth embodiment.

In the power output apparatus 20D of the fourth embodiment shown in FIG. 24, the assist motor 40 is attached to the crankshaft 56 placed between the engine 50 and the clutch motor 30. Like another power output apparatus 20E illustrated in FIG. 25, however, the engine 50 may be interposed between the clutch motor 30 and the assist motor 40, both of which are linked with the crankshaft 56.

Figure 26:
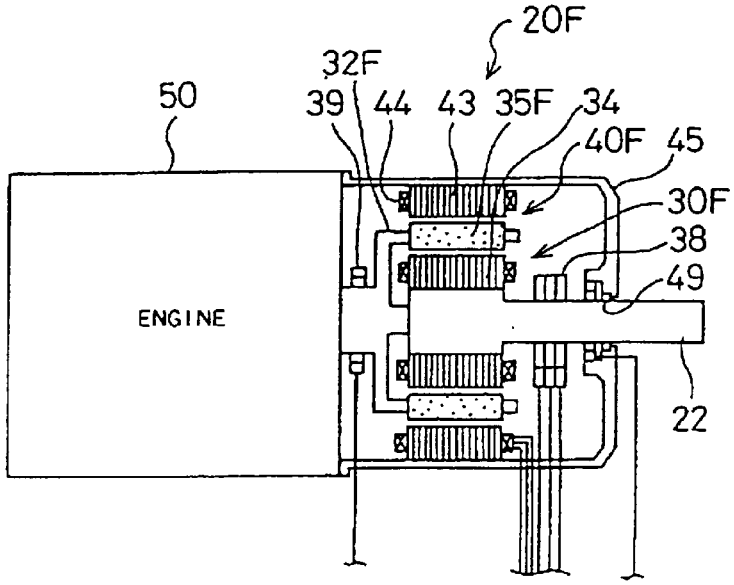
FIG. 26 shows structure of still another power output apparatus as another modification of the fourth embodiment.

One modification of the power output apparatus 20D of the fourth embodiment is given in FIG. 26 as a power output apparatus 20F, in which a clutch motor 30F and an assist motor 40F are integrally joined with each other. Referring to FIG. 26, in the power output apparatus 20F, an outer rotor 32F of the clutch motor 30F also works as a rotor of the assist motor 40F. The voltage applied to the three-phase coils 36 on the inner rotor 34 is controlled against the inner-surface magnetic pole of permanent magnets 35F set on the outer rotor 32F. This allows the clutch motor 30F to work in the same manner as the clutch motor 30 of the power output apparatus 20D shown in FIG. 24. The voltage applied to the three-phase coils 44 on the stator 43 is controlled against the outer-surface magnetic pole of the permanent magnets 35F set on the outer rotor 32F. This allows the assist motor 40F to work in the same manner as the assist motor 40 of the power output apparatus 20D. The power output apparatus 20F accordingly carries out the same operations and exerts the same effects as those in the power output apparatus 20D of the fourth embodiment discussed above. In addition to the effects of the power output apparatus 20D of the fourth embodiment, the power output apparatus 20F of the modified structure has further effects of reducing the size and weight of the whole power output apparatus 20F.

In the power output apparatuses 20 and 20A through 20F of the first through the fourth embodiments and their modifications, the torque Te and the revolving speed Ne at a specific driving point, which attains the highest possible efficiency among the respective driving points on each constant-output energy curve of the engine 50, are set as the target engine torque Te* and the target engine speed Ne*. The target torque Te* and the target revolving speed Ne* of the engine 50 may alternatively be set to allow the engine 50 as well as the clutch motor 30 and the assist motor 40 to be driven at a driving point having the highest possible comprehensive efficiency, which takes into account the efficiency of the clutch motor 30 and the assist motor 40 in addition to the efficiency of the engine 50. By way of example, the efficiency of the engine 50 is given as ηe, the efficiency of the clutch motor 30 and the first driving circuit 91 as ηc, and the efficiency of the assist motor 40 and the second driving circuit 92 as ηa. A comprehensive efficiency η is then expressed by multiplying the efficiency ηe of the engine 50 by an efficiency (transmission efficiency) of the power output apparatus 20 for transmitting the power from the engine 50 to the drive shaft 22 as given by Equation (21) below. The driving points of the engine 50, the clutch motor 30, and the assist motor 40 attaining the highest possible comprehensive efficiency η with respect to each amount of output energy Pd are determined experimentally or otherwise, and stored in advance as a map in the ROM 90b. The driving points corresponding to the output energy Pd, which depends upon the operation of the accelerator pedal 64, are read from the map. This structure further enhances the efficiency of the whole power output apparatus.

$$\eta = \eta e \times \frac{Te \times Nd + Te(Ne - Nd)\eta e \times \eta a}{Te \times Ne} \tag{21}$$

Figure 27:
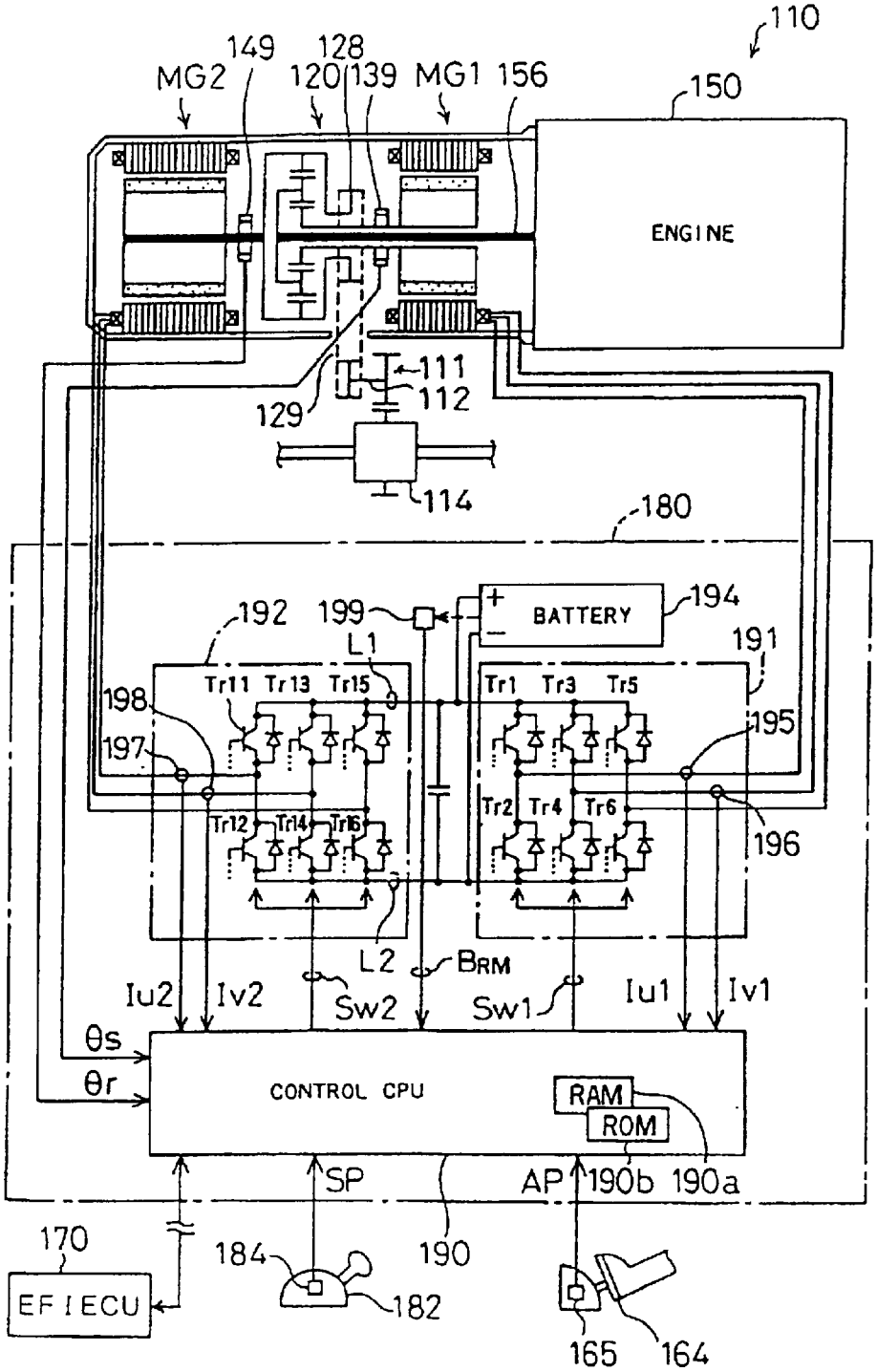
FIG. 27 shows structure of another power output apparatus as a fifth embodiment according to the present invention.
Figure 28:
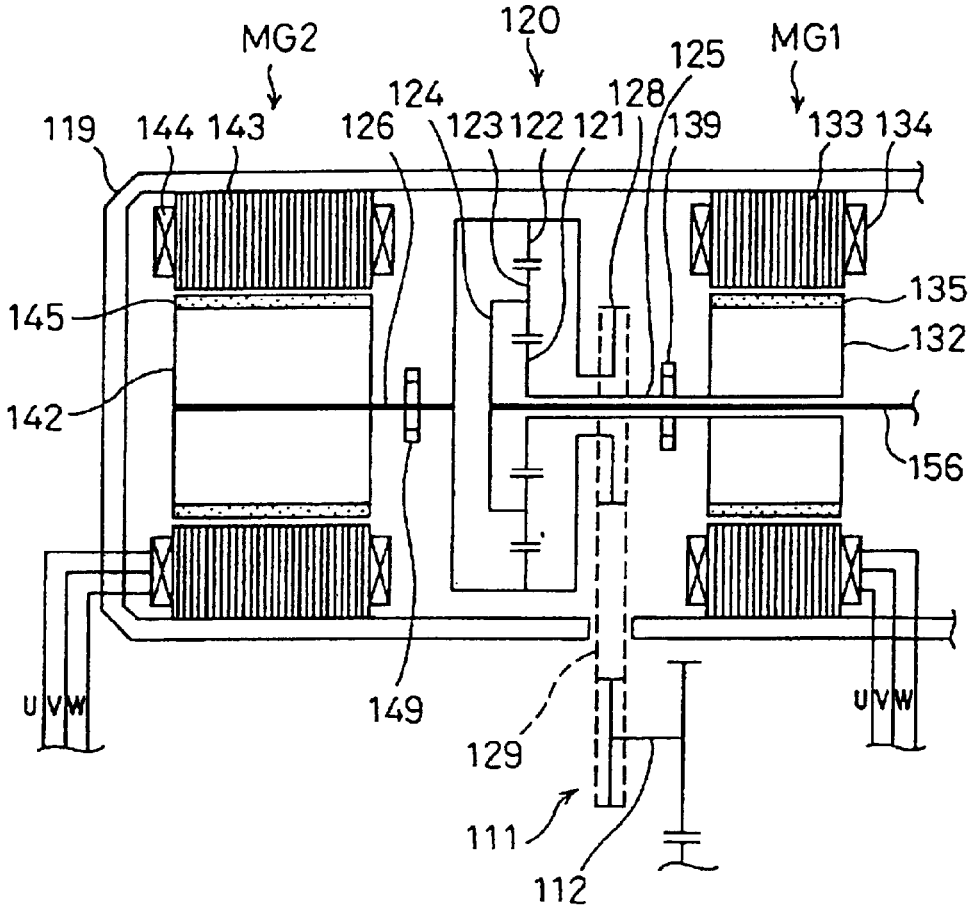
FIG. 28 is an enlarged view illustrating an essential part of the power output apparatus of the fifth embodiment.

The following describes still another power output apparatus 110 as a fifth embodiment according to the present invention. FIG. 27 schematically illustrates structure of the power output apparatus 110 of the fifth embodiment; FIG. 28 is an enlarged view illustrating an essential part of the power output apparatus 110 of FIG. 27; and FIG. 29 shows a vehicle with the power output apparatus 110 of FIG. 27 incorporated therein.

Figure 29:
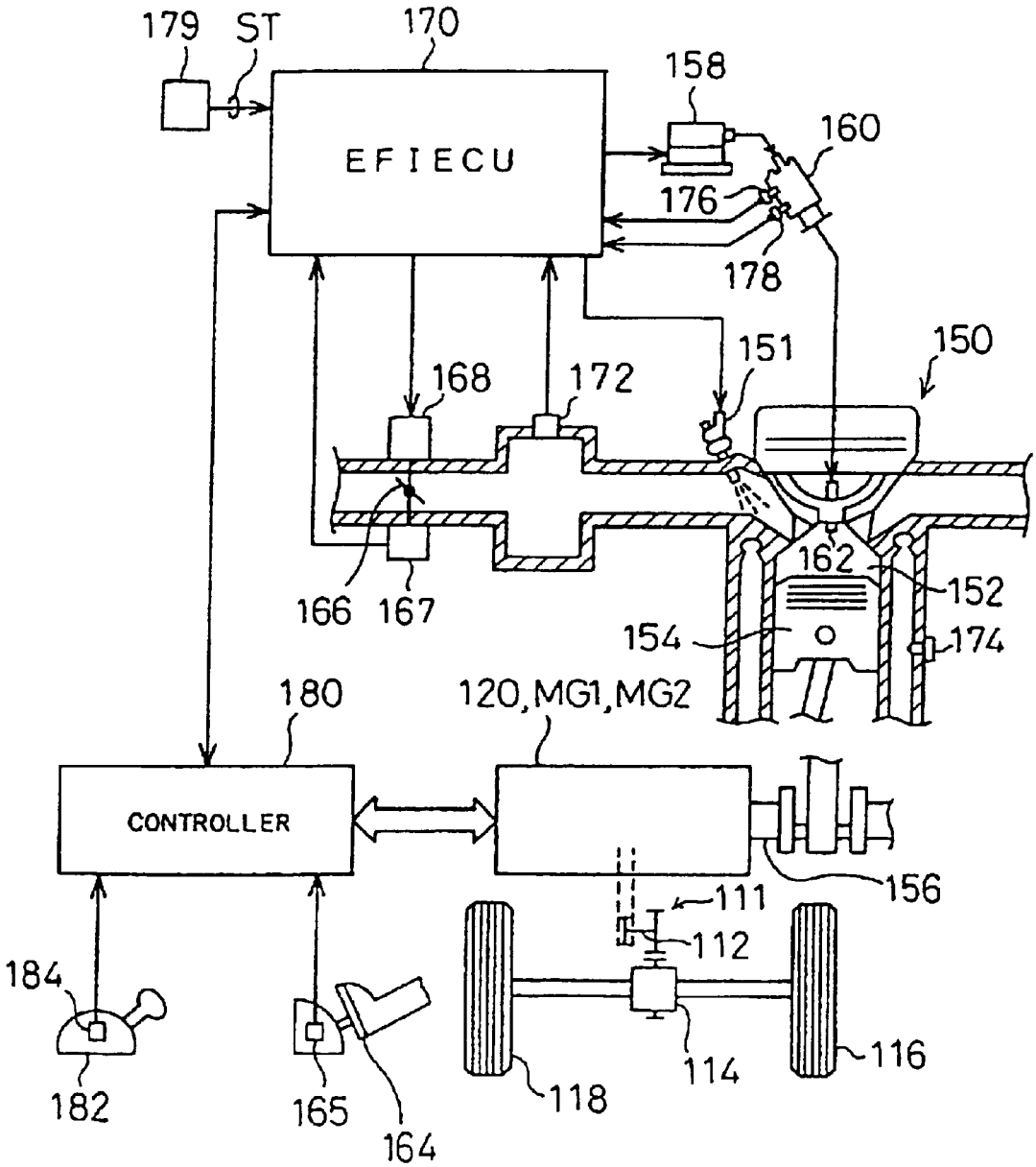
FIG. 29 is a schematic view illustrating general structure of a vehicle with the power output apparatus of the fifth embodiment incorporated therein.

The vehicle of FIG. 29 with the power output apparatus 110 of the fifth embodiment incorporated therein has a similar structure to that of the vehicle of FIG. 3 with the power output apparatus 20 of the first embodiment incorporated therein, except that a planetary gear 120 and motors MG1 and MG2 are attached to a crankshaft 156, instead of the clutch motor 30 and the assist motor 40. The same constituents are expressed by like numerals +100 and not specifically described here. The numerals and symbols used in the description of the power output apparatus 20 the first embodiment have the same meanings in the description of the power output apparatus 110 of the fifth embodiment, unless otherwise specified.

Referring to FIGS. 27 and 28, the power output apparatus 110 primarily includes an engine 150, a planetary gear 120 having a planetary carrier 124 mechanically linked with a crankshaft 156 of the engine 150, a first motor MG1 linked with a sun gear 121 of the planetary gear 120, a second motor MG2 linked with a ring gear 122 of the planetary gear 120, and a controller 180 for driving and controlling the first and the second motors MG1 and MG2.

The planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the power input to or output from any two shafts among the three shafts automatically determines the power input to or output from the residual one shaft. The details of the input and output operations of the power into or from the three shafts of the planetary gear 120 will be discussed later.

A power feed gear 128 for taking out the power is linked with the ring gear 122 and arranged one the side of the first motor MG1. The power feed gear 128 is further connected to a power transmission gear 111 via a chain belt 129, so that the power is transmitted between the power feed gear 128 and the power transmission gear 111. As shown in FIG. 29, the power transmission gear 111 is further linked with a differential gear 114. The power output from the power output apparatus 110 is thus eventually transmitted to left and right driving wheels 116 and 118.

The first motor MG1 is constructed as a synchronous motor-generator generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

Referring to FIG. 27, the controller 180 incorporated in the power output apparatus 110 of the fifth embodiment is constructed in the same manner as the controller 80 of the power output apparatus 20 of the first embodiment. The controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 further includes a RAM 190a used as a working memory, a ROM 190b in which various control programs are stored, an input/output port (not shown), and a serial communication port (not shown) through which data are sent to and received from an EFIECU 170. The control CPU 190 receives a variety of data via the input port. The input data include the rotational angle θs of the sun gear shaft 125 measured with the resolver 139, the rotational angle θr of the ring gear shaft 126 measured with the resolver 149, an accelerator pedal position AP output from an accelerator position sensor 165, a gearshift position SP output from a gearshift position sensor 184, currents Iu1 and Iv1 from two ammeters 195 and 196 disposed in the first driving circuit 191, currents Iu2 and Iv2 from two ammeters 197 and 198 disposed in the second driving circuit 192, and a remaining charge BRM of the battery 194 measured with a remaining charge meter 199.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The six transistors Tr11 through Tr16 in the second driving circuit 192 also constitute a transistor inverter and are arranged in the same manner. The three-phase coils 134 of the first motor MG1 are connected to the respective contacts of the paired transistors in the first driving circuit 191, whereas the three-phase coils 144 of the second motor MG2 are connected to those in the second driving circuit 192. The power lines L1 and L2 are respectively connected to plus and minus terminals of the battery 194. The control signals SW1 and SW2 output from the control CPU 190 thus successively control the power-on time of the paired transistors Tr1 through Tr6 and the paired transistors Tr11 through Tr16. The electric currents flowing through the three-phase coils 134 and 144 undergo PWM (pulse width modulation) to give quasi-sine waves, which enable the three-phase coils 134 and 144 to form revolving magnetic fields.

The power output apparatus 110 of the fifth embodiment thus constructed works in accordance with the operation principles discussed below, especially with the principle of torque conversion. By way of example, it is assumed that the engine 150 is driven at a driving point P1 having the revolving speed Ne and the torque Te and that the ring gear shaft 126 is driven at another driving point P2 having different revolving speed Nr and torque Tr but the same energy as an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

Figure 30:
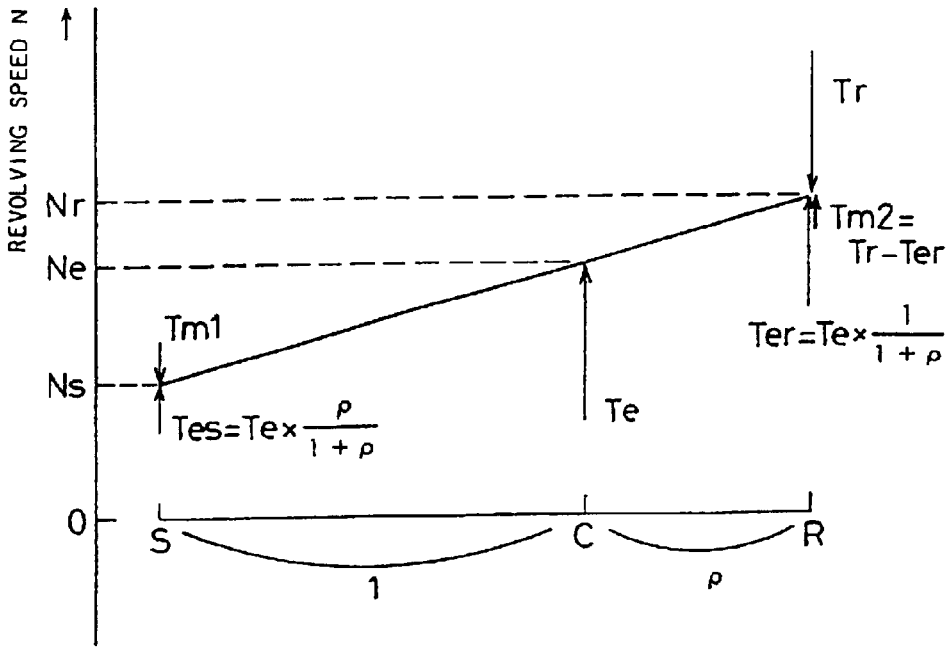
FIG. 30 is a nomogram showing the relationship between the revolving speed and the torque of the three different shafts linked with the planetary gear.
Figure 31:
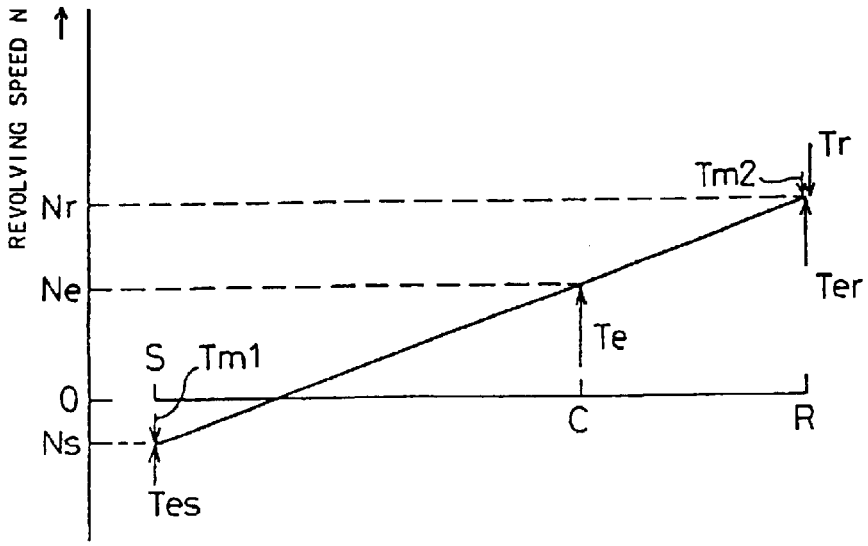
FIG. 31 is a nomogram showing the relationship between the revolving speed and the torque of the three different shafts linked with the planetary gear.

According to the mechanics, the relationship between the revolving speed and the torque of the three shafts in the planetary gear 120 (that is, the sun gear shaft 125, the ring gear shaft 126, and the planetary carrier 124) can be expressed as nomograms illustrated in FIGS. 30 and 31 and solved geometrically. The relationship between revolving speed and the torque of the three shafts in the planetary gear 120 may be analyzed numerically through calculation of energies of the respective shafts, without using the nomograms. For the clarity of explanation, the nomograms are used in the fifth embodiment.

In the graph of FIG. 30, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the ring gear 122 to that of the sun gear 121 and expressed as Equation (22) given below:

$$\rho = \frac{\text{the number of teeth of the sun gear}}{\text{the number of teeth of the ring gear}} \tag{22}$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as dynamic collinear line. The revolving speed Ns of the sun gear shaft 125 can be calculated from the revolving speed Ne of the engine 150 and the revolving speed Nr of the ring gear shaft 126 according to a proportional expression given as Equation (23) below. In the planetary gear 120, the determination of the rotations of any two shafts among the sun gear 121, the ring gear 122, and the planetary carrier 124 results in automatically setting the rotation of the residual one shaft.

$$Ns = Nr - (Nr - Ne)\frac{1+\rho}{\rho} \tag{23}$$

The torque Te of the engine 150 is then applied (upward in the drawing) to the dynamic collinear line at the coordinate axis C of the planetary carrier 124 as a line of action. The dynamic collinear line against the torque can be handled as a rigid body to which a force is applied as a vector. Based on the technique of dividing the force into different lines of action having the same direction, the torque Te acting on the coordinate axis C is divided into a torque Tes on the coordinate axis S and a torque Ter on the coordinate axis R. The magnitudes of the torques Tes and Ter are given by Equations (24) and (25) below:

$$Tes = Te \times \frac{\rho}{1+\rho} \tag{24}$$

$$Ter = Te \times \frac{1}{1+\rho} \tag{25}$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy or power Pm2, which is given as the product of the torque Tm2 and the revolving speed Nr, to the ring gear shaft 126.

In case that the electrical energy Pm1 is identical with the electrical energy Pm2, all the electric power consumed by the second motor MG2 can be supplied by the electric power regenerated by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 30, it may be negative according to the revolving speed Ne of the engine 150 and the revolving speed Nr of the ring gear shaft 126 as shown in the nomogram of FIG. 31. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the electric power regenerated by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', so that the energy Pe output from the engine 150 should be a little greater than the energy Pr output to the ring gear shaft 126 or alternatively the energy Pr output to the ring gear shaft 126 should be a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 30, the torque Tm2 of the second motor MG2 is calculated by multiplying the electric power regenerated by the first motor MG1 by the efficiencies of both the motors MG1 and MG2. In the state of the nomogram of FIG. 31, on the other hand, the torque Tm2 of the second motor MG2 is calculated by dividing the electric power consumed by the first motor MG1 by the efficiencies of both the motors MG1 and MG2. In the planetary gear 120, there is an energy loss of heat loss due to a mechanical friction or the like, though the amount of energy loss is significantly smaller than the whole amount of energy concerned. The efficiency of the synchronous motors used for the first and the second motors MG1 and MG2 is substantially equal to the value '1'. Known devices such as GTOs applicable to the transistors Tr1 through Tr16 have extremely small ON-resistance. The efficiency of power conversion thus becomes practically equal to the value '1'. For the matter of convenience, in the following discussion of the fifth embodiment, the efficiency is assumed to be equal to the value '1' (=100%) unless otherwise specified.

As clearly understood from the operation principle of the power output apparatus 110 of the fifth embodiment discussed above, controlling the motors MG1 and MG2 enables the engine 150 to be driven at any driving point that can output the energy identical with the energy to be output to the ring gear shaft 126. The planetary gear 120 (having the appropriate gear ratio) and the first motor MG1 in the power output apparatus 110 of the fifth embodiment have similar functions to those of the clutch motor 30 in the power output apparatus 20 of the first embodiment, while the second motor MG2 works in the similar manner to the assist motor 40. The map of FIG. 6, which is used to set the target torque Te* and the target revolving speed Ne* of the engine 50 in the torque control of the power output apparatuses 20 and 20A through 20C of the first through the third embodiments, can thus be applicable to set the target torque Te* and the target revolving speed Ne* of the engine 150 in the torque control of the power output apparatus 110 of the fifth embodiment.

By taking into account the gear ratio of the planetary gear 120, the power output apparatus 110 of the fifth embodiment can execute the torque control routine of FIG. 5, the clutch motor control routine of FIG. 8, the assist motor control routine of FIGS. 10 and 11, the throttle valve position control routine of FIG. 12, and the fuel injection control routine of FIG. 13, which are carried out by the power output apparatus 20 of the first embodiment. The power output apparatus 110 can also execute the torque control routine of FIG. 16 carried out by the power output apparatus 20A of the second embodiment and the clutch motor control routine of FIGS. 19 and 20 carried out by the power output apparatus 20B of the third embodiment. The power output apparatus 110 can further execute the assist motor control routine of FIG. 18 which may be carried out by the power output apparatus 20A of the second embodiment or the power output apparatus 20B of the third embodiment. The following describes a typical operation of the power output apparatus 110 of the fifth embodiment, which is similar to that of the power output apparatus 20B of the third embodiment.

Figure 32:
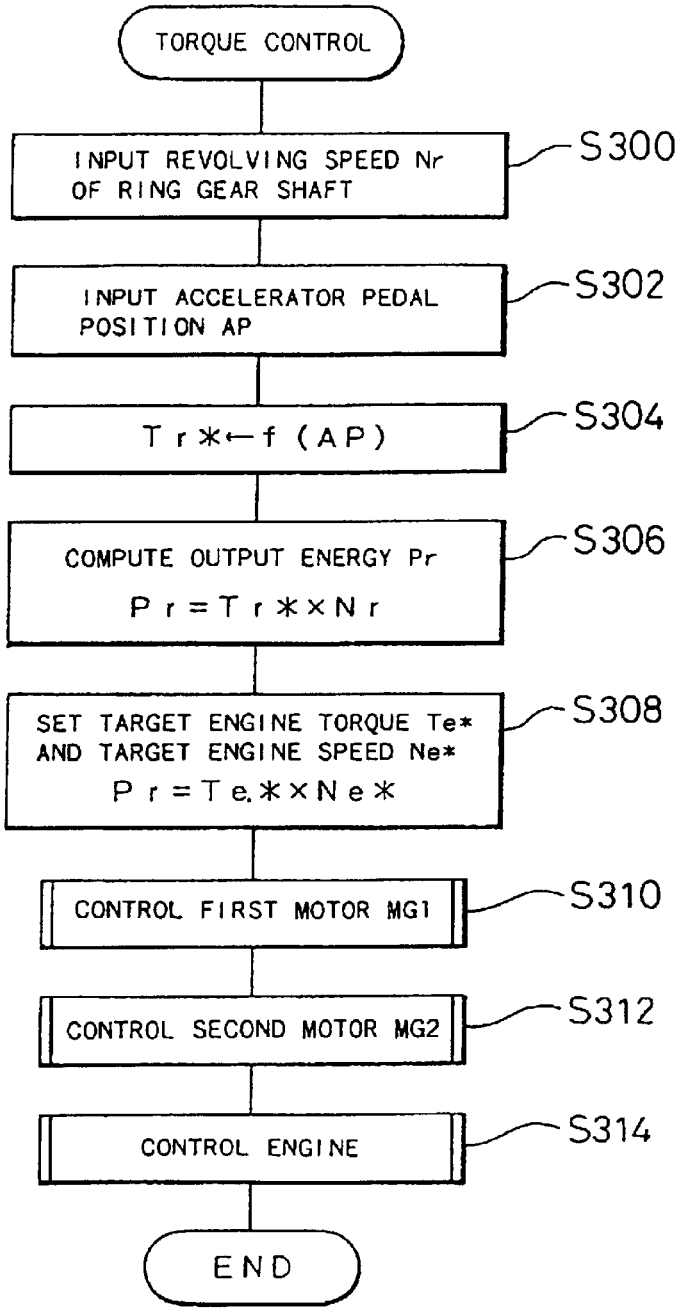
FIG. 32 is a flowchart showing a torque control routine executed in the fifth embodiment by the control CPU of the controller.

The torque control in the power output apparatus 110 of the fifth embodiment is carried out according to a torque control routine shown in the flowchart of FIG. 32. When the program enters the torque control routine, the control CPU 190 of the controller 180 first reads the revolving speed Nr of the ring gear shaft 126 at step S300. The revolving speed Nr of the ring gear shaft 126 may be calculated from the rotational angle θr of the ring gear shaft 126 read from the resolver 149. The control CPU 190 then reads the accelerator pedal position AP detected by the accelerator position sensor 165 at step S302, and determines a torque command value Tr* or a target torque to be output to the ring gear shaft 126, based on the input accelerator pedal position AP at step S304. Not the torque to be output to the driving wheels 116 and 118 but the torque to be output to the ring gear shaft 126 is calculated here from the accelerator pedal position AP. This is because the ring gear shaft 126 is mechanically linked with the driving wheels 116 and 118 via the power feed gear 128, the power transmission gear 111, and the differential gear 114 and the determination of the torque to be output to the ring gear shaft 126 thus results in determining the torque to be output to the driving wheels 116 and 118. In the fifth embodiment, a map representing the relationship between the torque command value Tr*, the revolving speed Nr of the ring gear shaft 126, and the accelerator pedal position AP is prepared in advance and stored in the ROM 190b. The torque command value Tr* corresponding to the input accelerator pedal position AP and the input revolving speed Nr of the ring gear shaft 126 is read from the map.

The control CPU 190 subsequently calculates an energy Pr to be output to the ring gear shaft 126 from the torque command value Tr* thus obtained and the input revolving speed Nr of the ring gear shaft 126 (Pr=Tr*×Nr) at step S306. The program then proceeds to step S308 to set a target torque Te* and a target revolving speed Ne* of the engine 150 based on the energy Pr to be output to the ring gear shaft 126. As mentioned above, the map of FIG. 6 used in the power output apparatus 20 of the first embodiment is applicable to set the target torque Te* and the target revolving speed Ne* of the engine 150. The map of FIG. 6 enables a specific driving point of the engine 150 that attains the highest possible efficiency with respect to each amount of energy Pr and allows a smooth variation in driving state of the engine 150 with a variation in energy Pr to be set as the target engine torque Te* and the target engine speed Ne*.

After setting the target torque Te* and the target revolving speed Ne* of the engine 150, the program proceeds to steps S310, S312, and S314 to respectively control the first motor MG1, the second motor MG2, and the engine 150 based on the target engine torque Te* and the target engine speed Ne* thus obtained. In the fifth embodiment, although the control operations of the first motor MG1, the second motor MG2, and the engine 150 are shown as separate steps for the matter of convenience, these controls are carried out simultaneously in the actual procedure.

Figure 33:
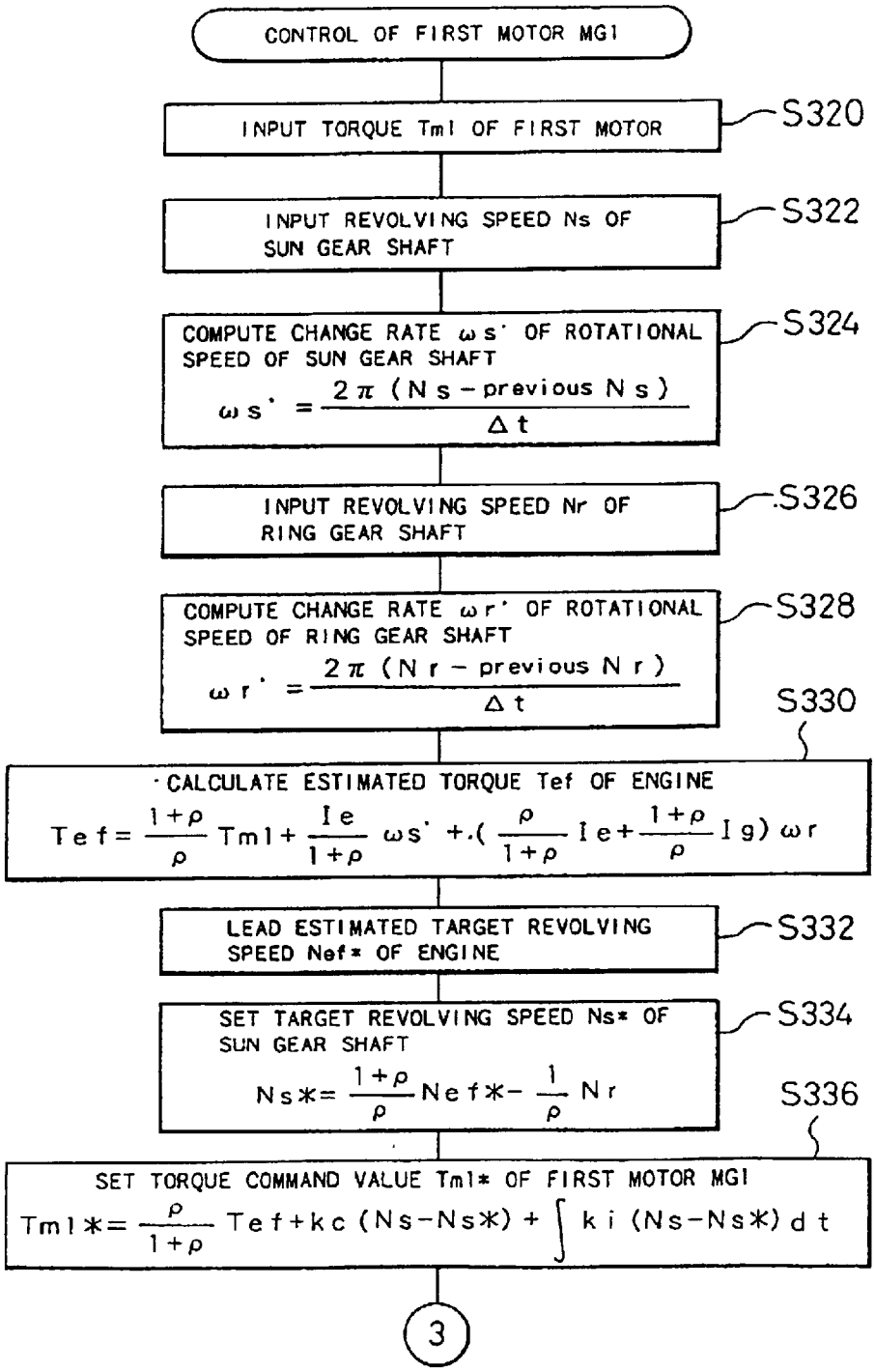
FIGS. 33 and 34 are flowcharts showing a control procedure of the first motor MG1 executed in the fifth embodiment by the controller.
Figure 34:
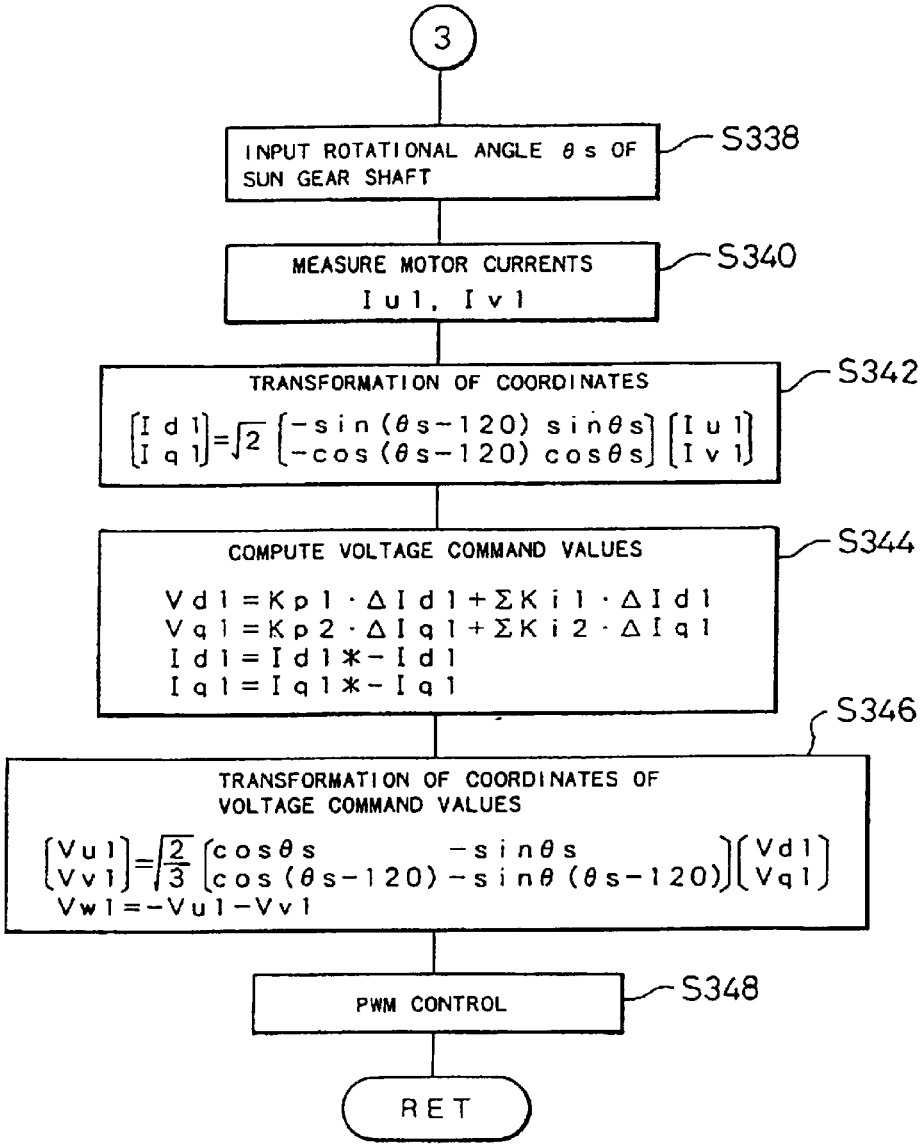

FIGS. 33 and 34 are flowcharts showing details of the control process of the first motor MG1 executed at step S310 in the flowchart of FIG. 32. When the program enters the control routine, the control CPU 190 of the controller 180 first reads the torque Tm1 which the first motor MG1 currently applies to the sun gear shaft 125 (that is, a torque command value Tm1* currently set in the first motor MG1) at step S320, and receives data of revolving speed Ns of the sun gear shaft 125 at step S322. The revolving speed Ns of the sun gear shaft 125 can be calculated from the rotational angle θs of the sun gear shaft 125 read from the resolver 139. At subsequent step S324, a change rate ωs' of rotational speed of the sun gear shaft 125 is calculated from the input revolving speed Ns of the sun gear shaft 125 according to Equation (26) given below. The calculation subtracts previous data of revolving speed NS of the sun gear shaft 125 (previous NS) input at step S322 in a previous cycle of this routine from the current data of revolving speed NS, multiplies the difference by 2π, and divides the product by an interval Δt of activating this routine, so as to determine the change rate ωs' of rotational speed of the sun gear shaft 125. The numerator in the right side of Equation (26) includes '2π' since the relationship between the rotational speed ωs and the revolving speed Ns of the sun gear shaft 125 is defined as ωs=2π×Ns [rad/sec]. Like the third embodiment, this routine of the fifth embodiment can be normally executed even immediately after a start of the vehicle, since the previous Ns is initialized to zero in an initialization routine (not shown) executed prior to this routine.

$$\omega s' = \frac{2\pi(\mathrm{Ns} - \text{previous Ns})}{\Delta t} \tag{26}$$

The control CPU 190 then reads the revolving speed Nr of the ring gear shaft 126 at step S326, and calculates a change rate ωr' of rotational speed of the ring gear shaft 126 at step S328 in a similar manner to the processing of step S324. After calculating the change rate ωs' of rotational speed of the sun gear shaft 125 and the change rate ωr' of rotational speed of the ring gear shaft 126, the program proceeds to step S330 to calculate an estimated torque Tef, which the engine 150 is assumed to currently output, according to Equation (27) given below:

$$\mathrm{Tef} = \frac{1+\rho}{\rho}\mathrm{Tm1} + \frac{\mathrm{Ie}}{1+\rho}\omega s' + \left(\frac{\rho}{1+\rho}\mathrm{Ie} + \frac{1+\rho}{\rho}\mathrm{Ig}\right)\omega r' \tag{27}$$

wherein 'Ie' in the right side of Equation (27) represents the moment of inertia around the engine 150 and the crankshaft 156, and 'Ig' represents the moment of inertia around the motor 132 of the first motor MG1 and the sun gear shaft 125. Equation (27) is led from the equation of motion based on the equilibrium of forces on the dynamic collinear line in the nomograms of FIGS. 30 and 31.

At subsequent step S332, the control CPU 190 reads a revolving speed (estimated target revolving speed) Nef* corresponding to the estimated torque Tef of the engine 150 from the map of FIG. 6 for determining the driving point of the engine 150. Like the third embodiment, for example, as shown in FIG. 21, the estimated target revolving speed Nef* is determined as a value corresponding to the estimated torque Tef on the curve A of driving points attaining the highest possible efficiency of the engine 150. A target revolving speed Ns* of the sun gear shaft 125 is then calculated at step S334 from the estimated target revolving speed Nef* thus obtained and the input revolving speed Nr of the ring gear shaft 126 according to Equation (28) given below:

$$\mathrm{Ns}^* = \frac{1+\rho}{\rho}\mathrm{Nef}^* - \frac{1}{\rho}\mathrm{Nr} \tag{28}$$

Equation (28) is readily obtained by calculating the ratio of revolving speeds of the respective coordinate axes S, C, and R in the nomograms of FIGS. 30 and 31.

At subsequent step S336, the control CPU 190 calculates a torque command value Tm1* of the first motor MG1 from the estimated torque Tef, the estimated target revolving speed Nef*, and the target revolving speed Ns* of the sun gear shaft 125 according to Equation (29) given below:

$$\mathrm{Tm1}^* = \frac{\rho}{1+\rho}\times\mathrm{Tef} + \mathrm{ke}(\mathrm{Ns} - \mathrm{Ns}^*) + \int \mathrm{ki}(\mathrm{Ns} - \mathrm{Ns}^*)dt \tag{29}$$

The second term in the right side of Equation (29) represents a correction term based on the difference between the actual revolving speed Ns of the sun gear shaft 125 and the target revolving speed Ns*, wherein ke denotes a constant. The third term in the right side of Equation (29) represents an integral term to cancel the stationary deviation of the revolving speed Ns of the sun gear shaft 125 from the target revolving speed Ns*, wherein ki denotes a constant. The first motor MG1 is controlled with the torque command value Tm1* of the first motor MG1 thus obtained, so that the engine 150 is controlled to be driven at a specific driving point where the torque Te is equal to the estimated torque Tef and the revolving speed Ne is equal to the estimated target revolving speed Nef*.

The engine 150 can be driven at the specific driving point of the estimated torque Tef and the estimated target revolving speed Nef* by controlling the revolving speed Ns of the sun gear shaft 125 to the target revolving speed Ns*. This is ascribed to the following reasons. As discussed above with the nomograms of FIGS. 30 and 31, in the planetary gear 120, the determination of the revolving speeds of any two shafts among the sun gear shaft 125, the ring gear shaft 126, and the planetary carrier 124 results in automatically setting the revolving speed of the residual one shaft. The revolving speed Nr of the ring gear shaft 126 mechanically linked with the driving wheels 116 and 118 is given as input data. Controlling either the revolving speed Ns of the sun gear shaft 125 or the revolving speed Ne of the engine 150 thus determines the rotational conditions of the three shafts in the planetary gear 120. The revolving speed Ne of the engine 150 should be controlled, in order to allow the engine 150 to be driven at the high-efficient driving point of the estimated torque Tef and the estimated target revolving speed Nef*. The torque Te and the revolving speed Ne of the engine 150 are, however, varied by the loading torque of the engine 150, even when the position BP of the throttle valve 166 and the amount of fuel injection are adjusted finely. It is thereby rather difficult to control the driving point of the engine 150 in an independent manner. The revolving speed Ns of the sun gear shaft 125 can, on the other hand, be controlled readily and precisely by controlling the revolving speed of the first motor MG1. In the fifth embodiment, the control of the revolving speed Ne of the engine 150 is thus implemented by controlling the revolving speed Ns of the sun gear shaft 125 with the first motor MG1.

Referring to the flowchart of FIG. 34, the control CPU 190 subsequently receives the rotational angle θs of the sun gear shaft 125 from the revolver 139 at step S338, and detects phase currents Iu1 and Iv1 of the first motor MG1 with the ammeters 195 and 196 at step S340. The control CPU 190 then executes transformation of coordinates for the phase currents at step S342, computes voltage command values Vd1 and Vq1 at step S344, and executes inverse transformation of coordinates for the voltage command values at step S346. At subsequent step S348, the control CPU 190 determines the on- and off-time of the transistors Tr1 through Tr6 in the first driving circuit 191 of the controller 180 for driving and controlling the first motor MG1 and carries out the PWM (pulse width modulation) control. The processing executed at steps S342 through S348 is similar to that executed at steps S120 through S126 in the clutch motor control routine of the first embodiment shown in the flowchart of FIG. 8.

Figure 35:
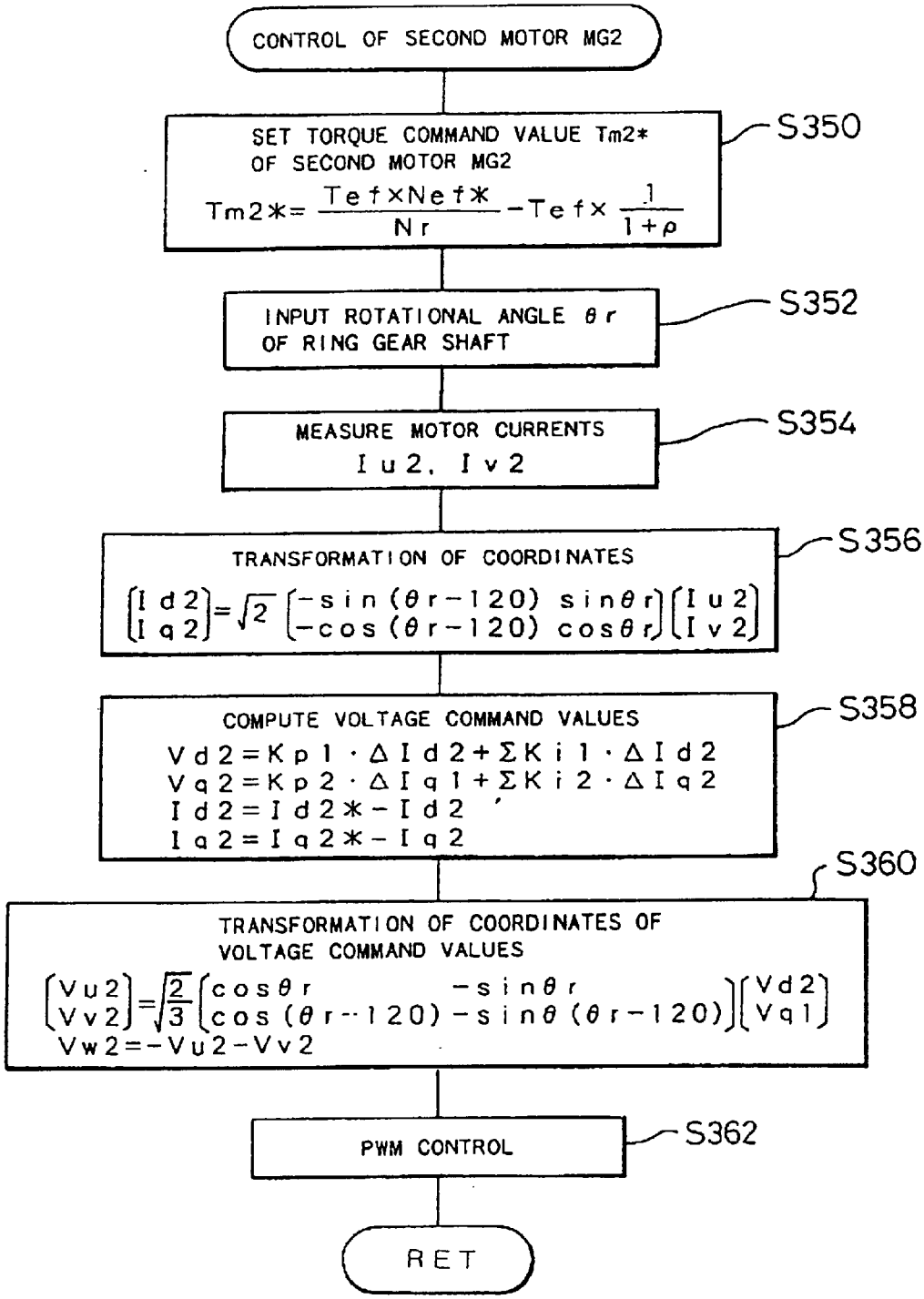
FIG. 35 is a flowchart showing a control procedure of the second motor executed in the fifth embodiment by the controller.

FIG. 35 is a flowchart showing details of the control process of the second motor MG2 executed at step S312 in the flowchart of FIG. 32. When the program enters the control routine, the control CPU 190 of the controller 180 first calculates a torque command value Tm2* of the second motor MG2 according to Equation (30) given below at step S350. Equation (30) gives the torque command value Tm2* of the second motor MG2, in order to enable all the power output from the engine 150 to be subjected to torque conversion by the planetary gear 120 and the motors MG1 and MG2 and to be output to the ring gear shaft 126. This is on the assumption that, when the engine 150 is driven at a specific driving point defined by the estimated torque Tef and the estimated target revolving speed Nef*, the dynamic collinear line in the nomogram is well-balanced.

$$Tm2^* = \frac{Tef \times Nef}{Nr} - Tef \times \frac{1}{1+\rho} \tag{30}$$

The control CPU 190 subsequently receives the rotational angle θr of the ring gear shaft 126 from the revolver 149 at step S352, and detects phase currents Iu2 and Iv2 of the second motor MG2 with the ammeters 197 and 198 at step S354. The control CPU 190 then executes transformation of coordinates for the phase currents at step S356, computes voltage command values Vd2 and Vq2 at step S358, and executes inverse transformation of coordinates for the voltage command values at step S360. At subsequent step S362, the control CPU 190 determines the on- and off-time of the transistors Tr11 through Tr16 in the second driving circuit 192 of the controller 180 for driving and controlling the second motor MG2 and carries out the PWM control. The processing executed at steps S356 through S362 is similar to that executed at steps S342 through S348 in the control procedure of the first motor MG1 illustrated in the flowcharts of FIGS. 33 and 34.

As discussed above, the power output apparatus 110 of the fifth embodiment estimates the torque currently output from the engine 150, and controls the torque Tm1 of the first motor MG1 in order to enable the engine 150 to be driven at the driving point attaining the highest possible efficiency with respect to the estimated torque. The engine 150 can thus be driven at driving points of the highest possible efficiency. In case that the target driving point of the engine 150 is a fixed stationary state, the engine 150 is stably driven at the target driving point. When the target driving point is changed, the engine 150 is smoothly shifted to the new target driving point along the path of high-efficiency driving points. With a change of the target driving point, the position BP of the throttle valve 166 is immediately varied to a value corresponding to the new target driving point, so that the engine 150 can be quickly shifted to the new target driving point.

The power output apparatus 110 of the fifth embodiment sets the torque Te and the revolving speed Ne at a specific driving point, which attains the highest possible efficiency among the respective driving points on each constant-output energy curve of the engine 150, as the target engine torque Te* and the target engine speed Ne*. This further enhances the operation efficiency of the engine 150 and thereby improves the efficiency of the whole power output apparatus 110.

A variety of processes applied to the hardware structures of the power output apparatuses 20, 20A, and 20B of the first through the third embodiments including the clutch motor 30 and the assist motor 40 are also applicable to the hardware structure of the power output apparatus 110 of the fifth embodiment including the planetary gear 120 and the two motors MG1 and MG2 instead of the clutch motor 30 and the assist motor 40, by taking into account the balance on the dynamic collinear line in the nomograms of FIGS. 30 and 31. The processes carried out by the power output apparatus 20B of the third embodiment are discussed above as an example of the applicable processes. By taking into account the balance on the dynamic collinear line in the nomograms of FIGS. 30 and 31, any processes carried out by the power output apparatus 20 of the first embodiment are also applicable to the power output apparatus 110 of the fifth embodiment, which thereby implements the same functions and exerts the same effects as those of the first embodiment. In the same manner, by taking into account the balance on the dynamic collinear line in the nomograms of FIGS. 30 and 31, any processes carried out by the power output apparatus 20A of the second embodiment are also applicable to the power output apparatus 110 of the fifth embodiment, which thereby implements the same functions and exerts the same effects as those of the second embodiment.

Figure 36:
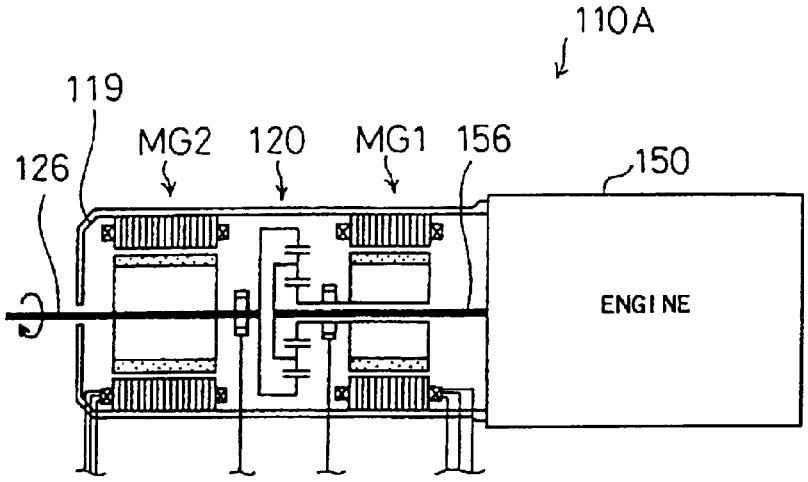
FIG. 36 shows structure of another power output apparatus as a modification of the fifth embodiment.
Figure 37:
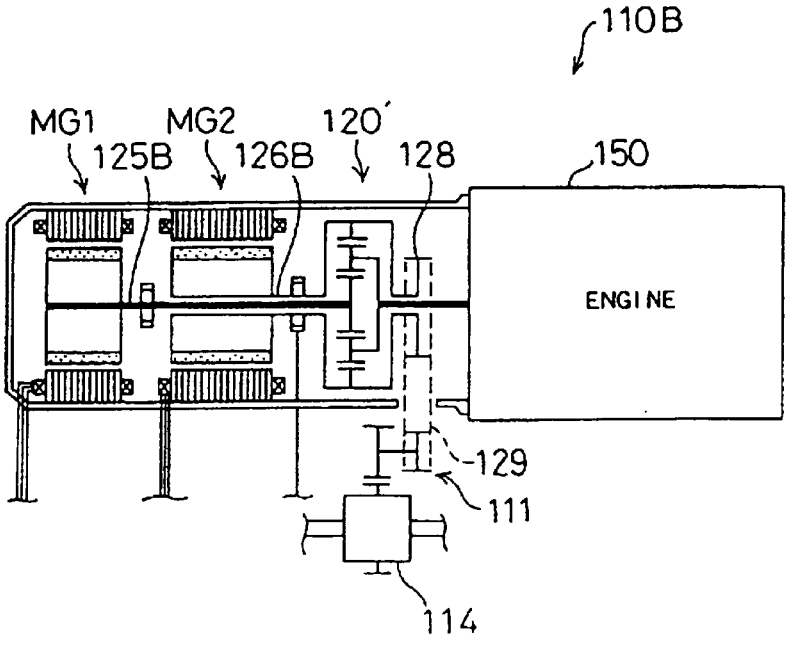
FIG. 37 shows structure of still another power output apparatus as another modification of the fifth embodiment.

In the power output apparatus 110 of the fifth embodiment, the power output to the ring gear shaft 126 is taken out of the place between the first motor MG1 and the second motor MG2 via the power feed gear 128 connecting with the ring gear 122. As shown by another power output apparatus 110A of FIG. 36 given as a possible modification, however, the power may be taken out of the casing 119, from which the ring gear shaft 126 is extended. FIG. 37 shows still another power output apparatus 110B as another possible modification, wherein the engine 150, the planetary gear 120, the second motor MG2, and the first motor MG1 are arranged in this order. In this case, a sun gear shaft 125B may not have a hollow structure, whereas a hollow ring gear shaft 126B is required. This modified structure enables the power output to the ring gear shaft 126B to be taken out of the place between the engine 150 and the second motor MG2.

Figure 38:
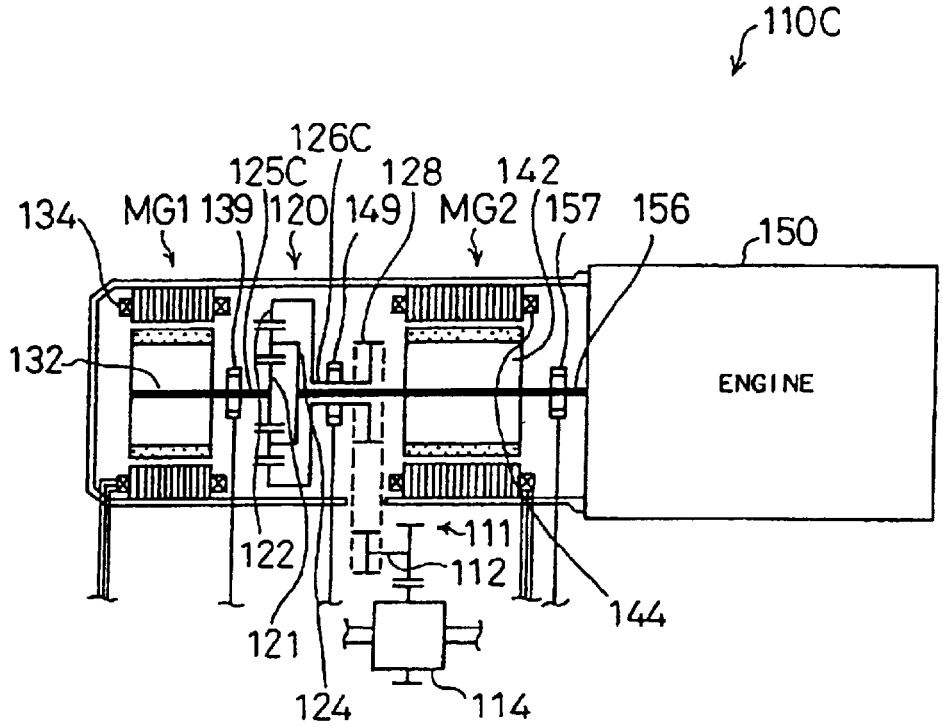
FIG. 38 shows structure of another power output apparatus as a sixth embodiment of the present invention.

The following describes still another power output apparatus 110C as a sixth embodiment according to the present invention. FIG. 38 shows an essential part of the power output apparatus 110C of the sixth embodiment. Referring to FIG. 38, the power output apparatus 110C of the sixth embodiment has a similar structure to that of the power output apparatus 110 of the fifth embodiment, except that the rotor 142 of the second motor MG2 is attached to the crankshaft 156 and that the two motors MG1 and MG2 have a different arrangement. The same part as that of the power output apparatus 110 of the fifth embodiment shown in FIG. 27, such as the controller 180, is thus omitted from the drawing of FIG. 38. The power output apparatus 110C of the sixth embodiment can be mounted on the vehicle in the same manner as shown in FIG. 29. The constituents of the power output apparatus 110C of the sixth embodiment that are identical with those of the power output apparatus 110 of the fifth embodiment are expressed by like numerals and not specifically described here. The numerals and symbols used in the description of the fifth embodiment have the same meanings in the sixth embodiment, unless otherwise specified.

Referring to FIG. 38, in the power output apparatus 110C of the sixth embodiment, the engine 150, the second motor MG2, the planetary gear 120, and the first motor MG1 are arranged in this order. The rotor 132 of the first motor MG1 is attached to a sun gear shaft 125C connecting with the sun gear 121 of the planetary gear 120. Like the power output apparatus 110 of the fifth embodiment, the planetary carrier 124 is attached to the crankshaft 156 of the engine 150. The rotor 142 of the second motor MG2 and a resolver 157 for detecting a rotational angle θe of the crankshaft 156 are further attached to the crankshaft 156. A ring gear shaft 126C linked with the ring gear 122 of the planetary gear 120 has another resolver 149 mounted thereon for detecting a rotational angle θr of the ring gear shaft 126C and is connected to the power feed gear 128.

The arrangement of the power output apparatus 110C of the sixth embodiment is different from that of the power output apparatus 110 of the fifth embodiment. In both the arrangements, however, the three-phase coils 134 of the first motor MG1 are connected with the first driving circuit 191 of the controller 180, and the three-phase coils 144 of the second motor MG2 with the second driving circuit 191. Although not being illustrated, the resolver 157 is connected to the input port of the control CPU 190 of the controller 180 via a signal line.

Figure 39:
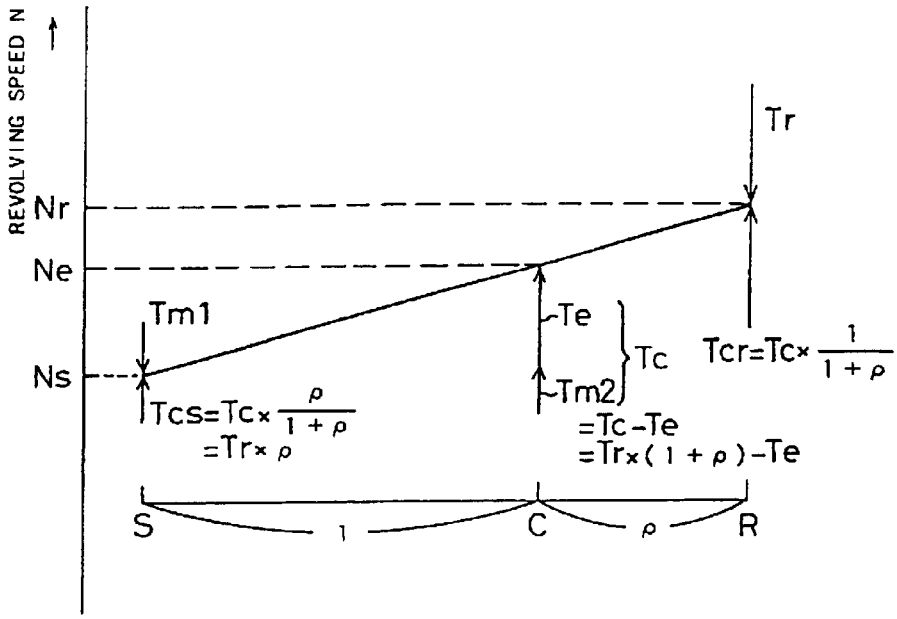
FIG. 39 is a nomogram showing the relationship between the revolving speed and the torque of the three different shafts linked with the planetary gear in the power output apparatus of the sixth embodiment.
Figure 40:
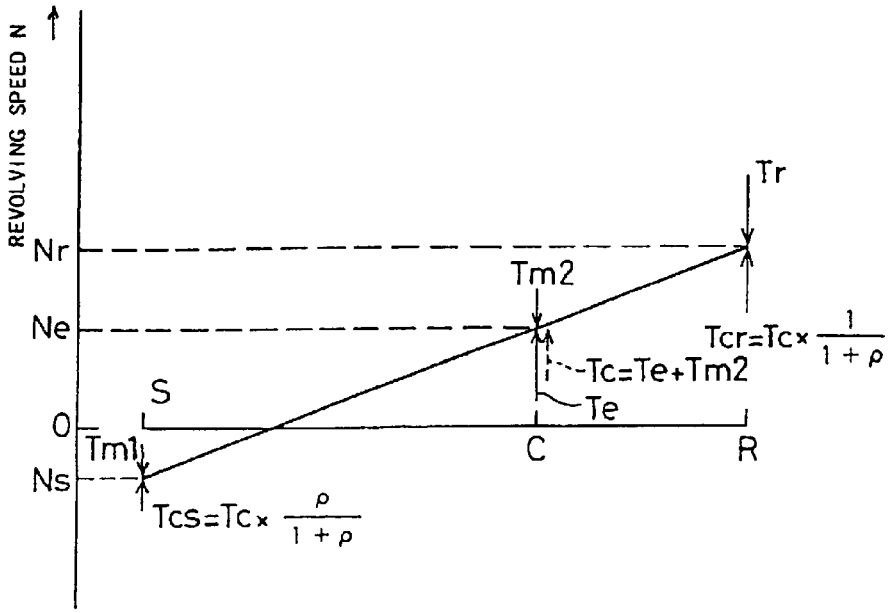
FIG. 40 is a nomogram showing the relationship between the revolving speed and the torque of the three different shafts linked with the planetary gear in the power output apparatus of the sixth embodiment.

The power output apparatus 110C of the sixth embodiment works in the manner discussed below. By way of example, it is assumed that the engine 150 is driven at the driving point P1 of the revolving speed Ne and the torque Te and that the ring gear shaft 126C is driven at the driving point P2 that is defined by the revolving speed Nr and the torque Tr and gives energy Pr (Pr=Nr×Tr) identical with energy Pe (Pe=Ne×Te) output from the engine 150. In this example, the power output from the engine 150 is thereby subjected to torque conversion and applied to the ring gear shaft 126C. FIGS. 39 and 40 are nomograms under such conditions.

Equations (31) through (34) given below are led by taking into account the balance on a dynamic collinear line in the nomogram of FIG. 39. Equation (31) is derived from the balance between the energy Pe input from the engine 150 and the energy Pr output to the ring gear shaft 126C. Equation (32) is given as a sum of energy input into the planetary carrier 124 via the crankshaft 156. Equations (33) and (34) are obtained by dividing the torque acting on the planetary carrier 124 into torques on the coordinate axes S and R working as lines of action.

$$Te \times Ne = Tr \times Nr \tag{31}$$

$$Tc = Te + Tm2 \tag{32}$$

$$Tes = Te \times \frac{\rho}{1+\rho} \tag{33}$$

$$Ter = Te \times \frac{1}{1+\rho} \tag{34}$$

The equilibrium of forces on the dynamic collinear line is essential for the stable state of the dynamic collinear line. For that purpose, the torque Tm1 should be made equal to a torque Tcs, and the torque Tr equal to a torque Tcr. Based on such relations, the torques Tm1 and Tm2 are expressed as Equations (35) and (36) given below:

$$Tm1 = Tr \times \rho \tag{35}$$

$$Tm2 = Tr \times (1+\rho) - Te \tag{36}$$

The first motor MG1 applies the torque Tm1 determined by Equation (35) to the sun gear shaft 125C, while the second motor MG2 applies the torque Tm2 determined by Equation (36) to the crankshaft 156. This enables the power output from the engine 150 and defined by the torque Te and the revolving speed Ne to be converted to the power defined by the torque Tr and revolving speed Nr and output to the ring gear shaft 126. Under the condition of the nomogram of FIG. 39 the first motor MG1 applies the torque in reverse of the rotation of the rotor 132 and thereby functions as a generator to regenerate electrical energy Pm1 expressed as the product of the torque Tm1 and the revolving speed Ns. The second motor MG2, on the other hand, applies the torque in the direction of rotation of the rotor 142 and thereby functions as a motor to consume electrical energy Pm2 expressed as the product of the torque Tm2 and the revolving speed Nr.

Although the revolving speed Ns of the sun gear shaft 125C is positive in the nomogram of FIG. 39, it may be negative according to the revolving speed Ne of the engine 150 and the revolving speed Nr of the ring gear shaft 126C as shown in the nomogram of FIG. 40. In the latter case, the first motor MG1 applies the torque in the direction of rotation of the rotor 132 and thereby functions as a motor to consume the electrical energy Pm1 expressed as the product of the torque Tm1 and the revolving speed Ns. The second motor MG2, on the other hand, applies the torque in reverse of the rotation of the rotor 142 and thereby functions as a generator to regenerate the electrical energy Pm2, which is expressed as the product of the torque Tm2 and the revolving speed Nr, from the ring gear shaft 126C.

Like the power output apparatus 110 of the fifth embodiment, the operation principle of the power output apparatus 110C of the six embodiment discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', so that the energy Pe output from the engine 150 should be a little greater than the energy Pr output to the ring gear shaft 126C or alternatively the energy Pr output to the ring gear shaft 126C should be a little smaller than the energy Pe output from the engine 150. As discussed previously, an energy loss in the planetary gear 120 due to a mechanical friction or the like is significantly small and the efficiency of the synchronous motors used for the first and the second motors MG1 and MG2 is substantially equal to the value '1'. The efficiency of power conversion thus becomes practically equal to the value '1'. In the following discussion of the sixth embodiment, the efficiency is assumed to be equal to the value '1' (=100%) unless otherwise specified.

As clearly understood from the operation principle of the power output apparatus 110C of the sixth embodiment discussed above, controlling the motors MG1 and MG2 enables the engine 150 to be driven at any driving point that can output the energy identical with the energy to be output to the ring gear shaft 126C. The planetary gear 120 and the first motor MG1 in the power output apparatus 110C of the sixth embodiment have similar functions to those of the clutch motor 30 in the power output apparatus 20D of the fourth embodiment, while the second motor MG2 works in the similar manner to the assist motor 40. The map of FIG. 6 , which is used to set the target torque Te* and the target revolving speed Ne* of the engine 50 in the torque control of the power output apparatus 20D of the fourth embodiment, can thus be applicable to set the target torque Te* and the target revolving speed Ne* of the engine 150 in the torque control of the power output apparatus 110C of the sixth embodiment.

As discussed previously, all the processes carried out by the power output apparatuses 20 and 20A through 20C of the first through the third embodiments and their modification are applicable to the power output apparatus 110 of the fifth embodiment, by taking into account the balance on the dynamic collinear line in the nomograms of FIGS. 30 and 31. In the same manner, all the processes carried out by the power output apparatus 20D of the fourth embodiment, that is, all the processes in the power output apparatus 20 and 20A through 20C of the first through the third embodiments and their modification applied to the structure where the assist motor 40 is attached to the crankshaft 56 of the engine 50, are also applicable to the power output apparatus 110C of the sixth embodiment, by taking into account the balance on the dynamic collinear line in the nomograms of FIGS. 39 and 40. Namely the power output apparatus 110C of the sixth embodiment implements the same functions and exerts the same effects as those of the power output apparatuses 20 and 20A through 20C of the first through the third embodiments and their modification.

Figure 41:
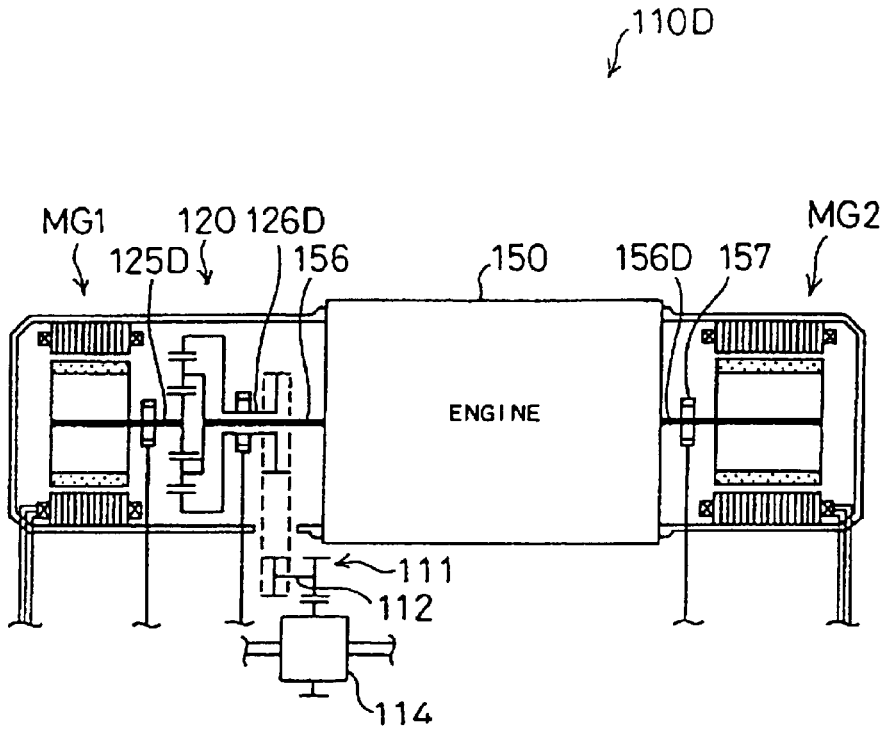
FIG. 41 shows structure of another power output apparatus as a modification of the sixth embodiment.
Figure 42:
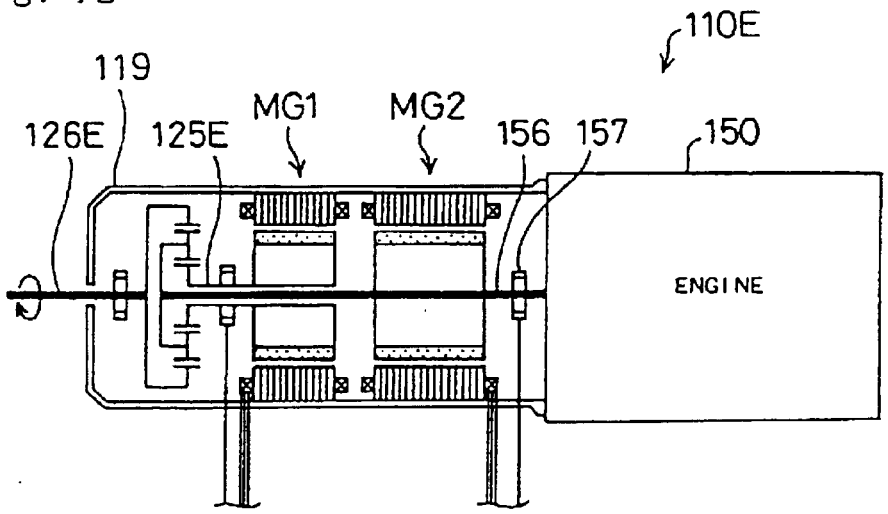
FIG. 42 shows structure of still another power output apparatus as another modification of the sixth embodiment.

Although the second motor MG2 is interposed between the engine 150 and the first motor MG1 in the power output apparatus 110C of the sixth embodiment, the engine 150 may be interposed between the first motor MG1 and the second motor MG2 as shown by another power output apparatus 110D of FIG. 41 having a modified structure. In the power output apparatus 110C of the sixth embodiment, the power output to the ring gear shaft 126C is taken out of the place between the first motor MG1 and the second motor MG2 via the power feed gear 128 linked with the ring gear 122. As shown by still another power output apparatus 110E of FIG. 42 given as another possible modification, however, the power may be taken out of the casing 119, from which a ring gear shaft 126E is extended.

The present invention is not restricted to the above embodiments or applications, but there may be many modifications, changes, and alterations without departing from the scope or spirit of the main characteristics of the present invention. Some examples of possible modification are given below.

Figure 43:
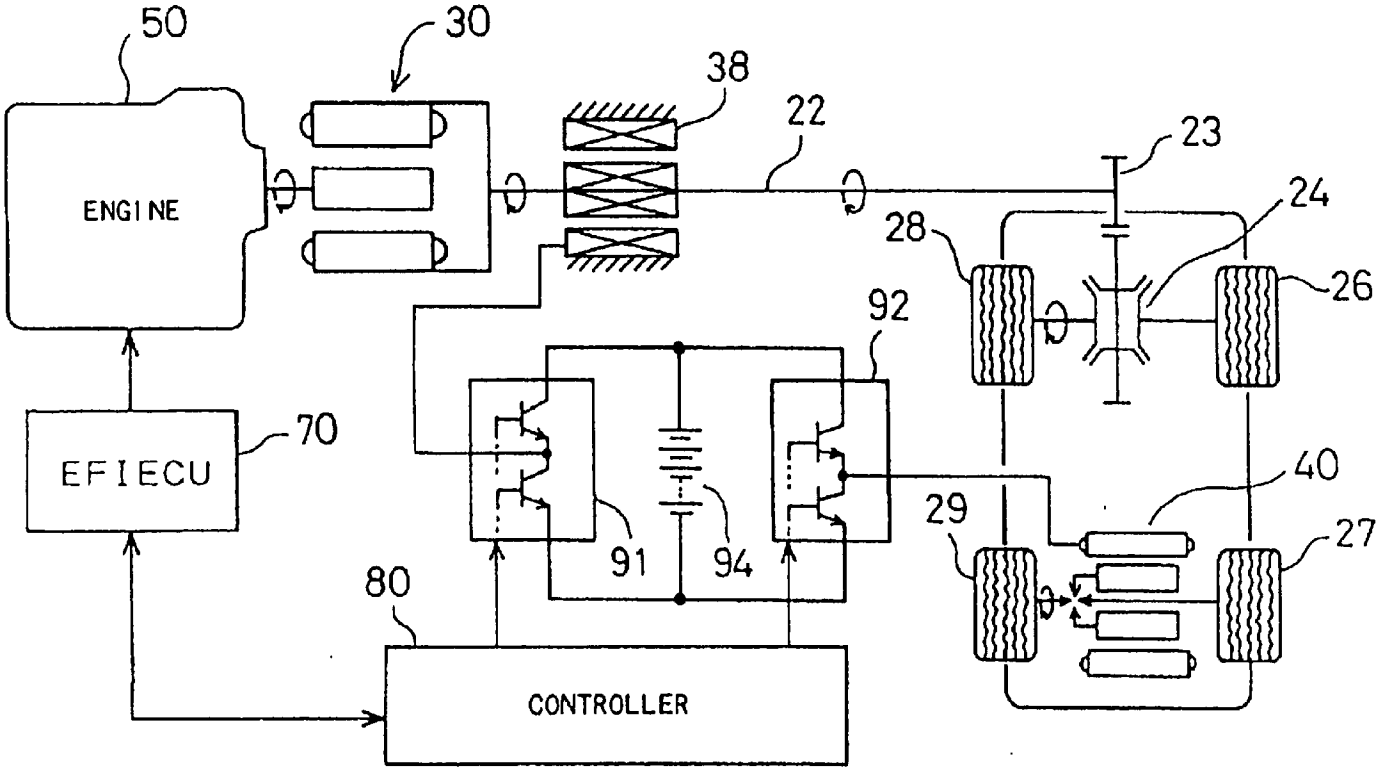
FIG. 43 shows an exemplified structure when the essential structure of the first through the third embodiments is applied to the vehicle with a four-wheel drive.

For example, any one of the power output apparatuses 20 and 20A through 20C of the first through the third embodiments may be applied to the vehicle with a four-wheel drive (4WD) as shown in FIG. 43. In the structure of FIG. 43, the assist motor 40,r which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23, so as to drive front driving wheels 26 and 28. The control procedures of the first through the third embodiments are also applicable to the structure of FIG. 43.

Figure 44:
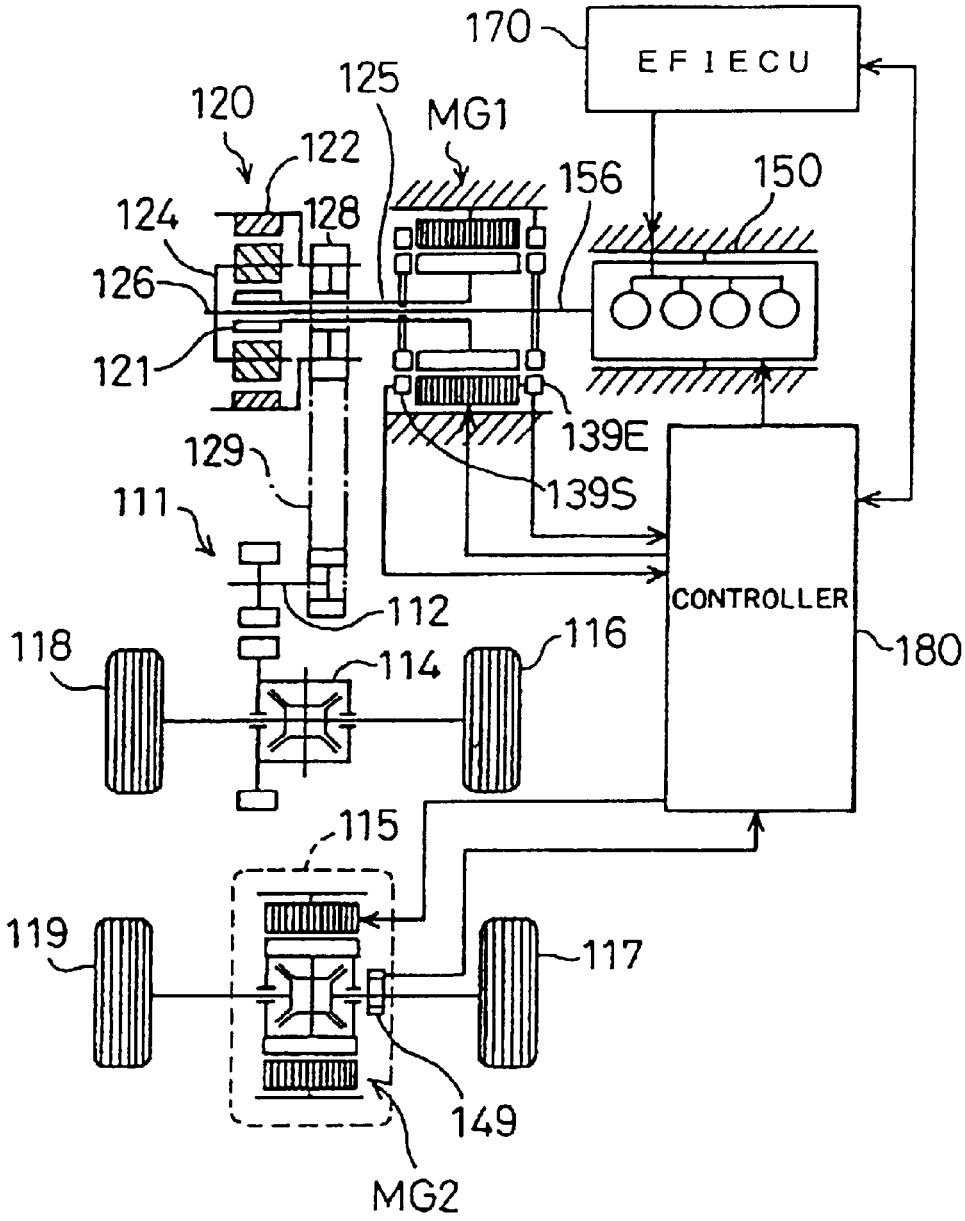
FIG. 44 shows an exemplified structure when the essential structure of the fifth embodiment is applied to the vehicle with a four-wheel drive.

FIG. 44 shows another example, in which the power output apparatus 110 of the fifth embodiment is applied to the vehicle with a four-wheel drive (4WD). In the structure of FIG. 44, the second motor MG2, which is attached to the ring gear shaft 126 in the structure of FIG. 27, is separated from the ring gear shaft 126 and independently disposed in a rear-wheel portion of the vehicle in order to drive rear driving wheels 117 and 119. The power feed gear 128 linked with the ring gear shaft 126 is connected to a differential gear 114 in a front-wheel portion of the vehicle via the chain belt 129 and the power transmission gear 111, so as to drive front driving wheels 116 and 118. The control procedures of the fifth embodiment are also applicable to the structure of FIG. 44. The gasoline engine driven by means of gasoline is used as the engine 50 or the engine 150 in the above embodiments. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the first through the fourth embodiments and for the first motor MG1 and the second motor MG2 in the fifth and the sixth embodiments. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

The rotary transformer 38 used in the first through the fourth embodiments as means for transmitting the electric power to the clutch motor 30 may be replaced by a slip ring-brush contact, a slip ring-mercury contact, a semiconductor coupling of magnetic energy, or the like.

Transistor inverters are used for the first and the second driving circuits 91 and 92 of the first through the fourth embodiments and for the [fist] *first* and the second driving circuits 191 and 192 of the fifth and the sixth embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 in the first through the fourth embodiments or the battery 194 in the fifth and the sixth embodiments may include Pb cells, NiMH cells, Li cells, or the like cells. A capacitor may be used in place of the battery 94 or the battery 194. Although the power output apparatus is mounted on the vehicle in all the above embodiments, it may be mounted on other transportation means like ships and airplanes as well as a variety of industrial machines.

It should be clearly understood that the above embodiments discussed above are only illustrative and not restrictive in any sense. The scope and spirit of the present invention are limited only by the terms of the appended claims.

We claim:

1. A power output apparatus for outputting power to a drive shaft, said power output apparatus[,] comprising:

an engine having an output shaft;

energy adjustment means having a first shaft connected with said output shaft of said engine and a second shaft connected with said drive shaft, said energy adjustment means adjusting a difference in energy between [power] one of *power* input into and *power* output from said first shaft and [power] one of *power* input into and *power* output from said second shaft [by regulating input and output of corresponding electrical energy];

a drive motor, wherein power is transmitted between said drive motor and said drive shaft;

target power setting means for setting a target power output to said drive shaft;

driving state setting means for setting a target driving state of said engine that outputs energy corresponding to the target power set by said target power setting means, based on a predetermined condition; and control means for controlling said engine, so as to enable said engine to be driven in the target driving state set by said driving state setting means, and for controlling said energy adjustment means and said drive motor, so as to enable power output from said engine to be subjected to torque conversion and output as the target power to said drive shaft.

2. The power output apparatus in accordance with claim 1, wherein the predetermined condition in said driving state setting means comprises a condition for enhancing an energy efficiency of said engine that outputs energy corresponding to the target power.

3. The power output apparatus in accordance with claim 1, wherein the predetermined condition in said driving state setting means comprises a condition for enhancing a comprehensive efficiency, which is calculated by multiplying an energy efficiency of said engine that outputs energy corresponding to the target power by a transmission efficiency of said energy adjustment means and said drive motor when the power output from said engine is subjected to torque conversion and output to said drive shaft.

4. The power output apparatus in accordance with claim 1, wherein the predetermined condition in said driving state setting means comprises a condition for continuously varying a driving state of said engine with a variation in target power.

5. The power output apparatus in accordance with claim 1, wherein said energy adjustment means comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.

6. A power output apparatus in accordance with claim 5, wherein said drive motor comprises said second rotor included in said twin-rotor motor and a stator for rotating said second rotor.

7. The power output apparatus in accordance with claim 1, wherein said energy adjustment means further comprises:

three-shaft-type power input and output means connected with said first shaft, said second shaft, and a third shaft, said three-shaft-type power input and output means for, when [powers] one of *powers* input into and *powers* output from any two shafts among said three different shafts are determined, automatically setting a [power] one of *power* input into and *power* output from a residual shaft based on the powers thus determined; and a shaft motor connected with said third shaft, wherein power is transmitted between said third shaft and said shaft motor.

8. The power output apparatus in accordance with claim 1, further comprising driving state detecting means for detecting a driving state of said engine, wherein said control means further comprises means for controlling said energy adjustment means, so as to enable said engine to be driven in the target driving state, based on the driving state of said engine detected by said driving state detecting means.

9. The power output apparatus in accordance with claim 1, further comprising driving state detecting means for detecting a driving state of said engine, wherein said control means further comprises tentative target driving state setting means for, when a state deviation of the driving state detected by said driving state detecting means from the target driving state is out of a predetermined range, selecting a driving state within the predetermined range based on the state deviation and the predetermined condition and setting the selected driving state as a tentative target driving state, the tentative target driving state set by said tentative target driving state setting means being used in place of the target driving state for operation *and* control of said engine and control of said energy adjustment means and said drive motor, until the state deviation enters the predetermined range.

10. The power output apparatus in accordance with claim 9, wherein said tentative target driving state setting means further comprises predetermined range setting means for setting the predetermined range based on the driving state detected by said driving state detecting means.

11. The power output apparatus in accordance with claim 9, wherein said control means further comprises means for controlling said energy adjustment means, so as to enable said engine to be driven in the target driving state, based on the driving state detected by said driving state detecting means, when the state deviation is within the predetermined range.

12. The power output apparatus in accordance with claim 9, further comprising storage battery means that is charged with electrical energy taken out of said energy adjustment means, that is charged with electrical energy taken out of said drive motor, that is discharged to release electrical energy used in said energy adjustment means, and that is discharged to release electrical energy used in said drive motor, wherein said control means further comprises means for, when the tentative target driving state is used in place of the target driving state for the operation *and* control of said engine and the control of said energy adjustment means and said drive motor, utilizing the electrical energy one of stored into and released from said storage battery means and controlling said drive motor, so as to enable said drive motor to one of input and output a specific power one of into and from said drive shaft, said specific power corresponding to an energy difference between the target power and the power output from said engine that is driven in the tentative target driving state.

13. The power output apparatus in accordance with claim 1, wherein said control means further comprises:

driving state estimating means for estimating a driving state of said engine when said target power setting means sets a different target power; and estimated-condition control means for controlling said energy adjustment means and said drive motor based on the estimated driving state of said engine.

14. The power output apparatus in accordance with claim 13, wherein said driving state estimating means further comprises means for estimating the driving state of said engine based on a revolving speed of said output shaft of said engine and a state of said energy adjustment means.

15. The power output apparatus in accordance with claim 13, wherein said estimated-condition control means further comprises means for controlling said energy adjustment means and said drive motor, so as to enable an estimated power output from said engine corresponding to the driving state of said engine estimated by said driving state estimating means to be subjected to torque conversion and output as the target power to said drive shaft.

16. The power output apparatus in accordance with claim 13, further comprising storage battery means that is charged with electrical energy taken out of said energy adjustment means, that is charged with electrical energy taken out of said drive motor, that is discharged to release electrical energy used in said energy adjustment means, and that is discharged to release electrical energy used in said drive motor, wherein said estimated-condition control means further comprises means for utilizing the electrical energy one of stored into and released from said storage battery means and controlling said drive motor, so as to enable said drive motor to one of input and output a specific power one of into and from said drive shaft, said specific power corresponding to an energy difference between the target power and the estimated power output from said engine corresponding to the driving state of said engine estimated by said driving state estimating means.

17. A power output apparatus for outputting power to a drive shaft, said power output apparatus comprising:

an engine having an output shaft;

energy adjustment means having a first shaft connected with said output shaft of said engine and a second shaft connected with said drive shaft, said energy adjustment means adjusting a difference in energy between [power] one of *power* input into and *power* output from said first shaft and [power] one of *power* input into and *power* output from said second shaft [by regulating input and output of corresponding electrical energy];

a drive motor, wherein power is transmitted between said drive motor and said output shaft of said engine;

target power setting means for setting a target power output to said drive shaft;

driving state setting means for setting a target driving state of said engine that outputs energy corresponding to the target power set by said target power setting means, based on a predetermined condition; and control means for controlling said engine, so as to enable said engine to be driven in the target driving state set by said driving state setting means, and for controlling said energy adjustment means and said drive motor, so as to enable power output from said engine to be subjected to torque conversion and output as the target power to said drive shaft.

18. [A] *The* power output apparatus in accordance with claim 17, wherein the predetermined condition in said driving state setting means comprises a condition for enhancing an energy efficiency of said engine that outputs energy corresponding to the target power.

19. [A] *The* power output apparatus in accordance with claim 17, wherein the predetermined condition in said driving state setting means comprises a condition for enhancing a comprehensive efficiency, which is calculated by multiplying an energy efficiency of said engine that outputs energy corresponding to the target power by a transmission efficiency of said energy adjustment means and said drive motor when the power output from said engine is subjected to torque conversion and output to said drive shaft.

20. [A] *The* power output apparatus in accordance with claim 17, wherein the predetermined condition in said driving state setting means comprises a condition for continuously varying a driving state of said engine with a variation in target power.

21. [A] *The* power output apparatus in accordance with [claims- 17, 18, 49-r or20] *claim 17*, wherein [saidenergy] *said energy* adjustment means [comprisesatwin-rotor] *comprises a twin-rotor* motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.

22. The power output apparatus in accordance with claim 21, wherein said drive motor comprises said first rotor included in said twin-rotor motor and a stator for rotating said first rotor.

23. The power output apparatus in accordance with claim 17, wherein said energy adjustment means further comprises:

three-shaft-type power input and output means connected with said first shaft, said second shaft, and a third shaft, said three-shaft-type power input and output means for, when [powers] one of *powers* input into and *powers* output from any two shafts among said three different shafts are determined, automatically setting a [power] one of *power* input into and *power* output from a residual shaft based on the powers thus determined; and a shaft motor connected with said third shaft, wherein power is transmitted between said third shaft and said shaft motor.

24. The power output apparatus in accordance with claim 17, further comprising driving state detecting means for detecting a driving state of said engine, wherein said control means further comprises tentative target driving state setting means for, when a state deviation of the driving state detected by said driving state detecting means from the target driving state is out of a predetermined range, selecting a driving state within the predetermined range based on the state deviation and the predetermined condition and setting the selected driving state as a tentative target driving state, the tentative target driving state set by said tentative target driving state setting means being used in place of the target driving state for operation *and* control of said engine and control of said energy adjustment means and said drive motor, until the state deviation enters the predetermined range.

25. The power output apparatus in accordance with claim 17, wherein said control means further comprises:

driving state estimating means for estimating a driving state of said engine when said target power setting means sets a different target power; and estimated-condition control means for controlling said energy adjustment means and said drive motor based on the estimated driving state of said engine.

26. The power output apparatus in accordance with claim 25, wherein said estimated-condition control means further comprises means for controlling said energy adjustment means and said drive motor, so as to enable an estimated power output from said engine corresponding to the driving state of said engine estimated by said driving state estimating means to be subjected to torque conversion and output as the target power to said drive shaft.

27. The power output apparatus in accordance with claim 25, further comprising storage battery means, that is charged with electrical energy taken out of said energy adjustment means, that is charged with electrical energy taken out of said drive motor, that is discharged to release electrical energy used in said energy adjustment means, and that is discharged to release electrical energy used in said drive motor, wherein said estimated-condition control means further comprises means for utilizing the electrical energy one of stored into and released from said storage battery means and controlling said drive motor, so as to enable said drive motor to one of input and output a specific power one of into and from said output shaft of said engine, said specific power corresponding to an energy difference between the target power and the estimated power output from said engine corresponding to the driving state of said engine estimated by said driving state estimating means.

28. A driving system, comprising:

an engine having an output shaft;

energy adjustment means having a first shaft connected with said output shaft of said engine and a second shaft connected with a drive shaft of said driving system, said energy adjustment means adjusting a difference in energy between [power] one of *power* input into and *power* output from said first shaft and [power] one of *power* input into and *power* output from said second shaft by regulating input and output of corresponding electrical energy;

a drive motor, wherein power is transmitted between said drive motor and said drive shaft;

target power setting means for setting a target power output to said drive shaft;

driving state setting means for setting a target driving state of said engine that outputs energy corresponding to the target power set by said target power setting means, based on a first condition for enhancing an energy efficiency of said engine that outputs energy corresponding to the target power and a second condition for making a vibration due to an operation of said engine out of a range of resonance frequency of said driving system; and control means for controlling said engine, so as to enable said engine to be driven in the target driving state set by said driving state setting means, and for controlling said energy adjustment means and said drive motor, so as to enable power output from said engine to be subjected to torque conversion and output as the target power to said drive shaft.

29. The driving system in accordance with claim 28, wherein said energy adjustment means comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.

30. The driving system in accordance with claim 29, wherein said drive motor comprises said second rotor included in said twin-rotor motor and a stator for rotating said second rotor.

31. The driving system in accordance with claim 28, wherein said energy adjustment means further comprises:

three-shaft-type power input and output means connected with said first shaft, said second shaft, and a third shaft, said three-shaft-type power input and output means for, when [powers] one of *powers* input into and *powers* output from any two shafts among said three different shafts are determined, automatically setting a [power] one of *power* input into and *power* output from a residual shaft based on the powers thus determined; and a shaft motor connected with said third shaft, wherein power is transmitted between said third shaft and said shaft motor.

32. A driving system, comprising:

an engine having an output shaft;

energy adjustment means having a first shaft connected with said output shaft of said engine and a second shaft connected with a drive shaft of said driving system, said energy adjustment means adjusting a difference in energy between [power] one of *power* input into and *power* output from said first shaft and [power] one of *power* input into and *power* output from said second shaft [by regulating input and output of corresponding electrical energy];

a drive motor, wherein power is transmitted between said drive motor and said output shaft of said engine;

target power setting means for setting a target power output to said drive shaft;

driving state setting means for setting a target driving state of said engine that outputs energy corresponding to the target power set by said target power setting means, based on a first condition for enhancing an energy efficiency of said engine that outputs energy corresponding to the target power and a second condition for making a vibration due to an operation of said engine out of a range of resonance frequency of said driving system; and control means for controlling said engine, so as to enable said engine to be driven in the target driving state set by said driving state setting means, and for controlling said energy adjustment means and said drive motor, so as to enable power output from said engine to be subjected to torque conversion and output as the target power to said drive shaft.

33. The driving system in accordance with claim 32, wherein said energy adjustment means comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.

34. The driving system in accordance with claim 33, wherein said drive motor comprises said first rotor included in said twin-rotor motor and a stator for rotating said first rotor.

35. The driving system in accordance with claim 32, wherein said energy adjustment means further comprises:

three-shaft-type power input and output means connected with said first shaft, said second shaft, and a third shaft, said three-shaft-type power input and output means for, when [powers] one of *powers* input into and *powers* output from any two shafts among said three different shafts are determined, automatically setting a [power] one of *power* input into and *power* output from a residual shaft based on the powers thus determined; and a shaft motor connected with said third shaft, wherein power is transmitted between said third shaft and said shaft motor.

36. A method of controlling a power output apparatus for outputting power to a drive shaft, said method comprising the steps of:

(a) providing an engine having an output shaft; energy adjustment means having a first shaft connected with said output shaft of said engine and a second shaft connected with said drive shaft, said energy adjustment means adjusting a difference in energy between [power] one of *power* input into and *power* output from said first shaft and [power] one of *power* input into and *power* output from said second shaft [by regulating input and output of corresponding electrical energy]; and a drive motor, wherein power is transmitted between said drive motor and said drive shaft;

(b) setting a target power output to said drive shaft;

(c) setting a target driving state of said engine that outputs energy corresponding to the target power set in said step (b), based on a specific condition of selecting a specific driving point that attains a highest possible efficiency among a plurality of available driving points of said engine that outputs energy corresponding to the target power; and (d) controlling said engine, so as to enable said engine to be driven in the target driving state set in said step (c), and [for] controlling said energy adjustment means and said drive motor, so as to enable power output from said engine to be subjected to torque conversion and output as the target power to said drive shaft.

37. The method in accordance with claim 36, wherein said step (d) further comprises the steps of:

(e) detecting a driving state of said engine;

(f) when a state deviation of the driving state of said engine detected in said step (e) from the target driving state is out of a predetermined range, selecting a driving state within the predetermined range based on the state deviation and the specific condition and setting the selected driving state as a tentative target driving state; and (g) using the tentative target driving state set in said step (f) in place of the target driving state, in order to control said engine, said energy adjustment means, and said drive motor, until the state deviation enters the predetermined range.

38. The method in accordance with claim 36, wherein said step (d) further comprises the steps of:

(h) when a different target power is set, estimating a driving state of said engine based on a revolving speed of said output shaft of said engine and a state of said energy adjustment means; and (i) controlling said energy adjustment means and said drive motor, so as to enable power output from said engine to be subjected to torque conversion and output to said drive shaft, based on the estimated driving state of said engine.

39. A method of controlling a power output apparatus for outputting power to a drive shaft, said method comprising the steps of:

(a) providing an engine having an output shaft; energy adjustment means having a first shaft connected with said output shaft of said engine and a second shaft connected with said drive shaft, said energy adjustment means adjusting a difference in energy between [power] one of *power* input into and *power* output from said first shaft and [power] one of *power* input into and *power* output from said second shaft [by regulating input and output of corresponding electrical energy]; and a drive motor, wherein power is transmitted between said drive motor and said drive shaft;

(b) setting a target power output to said drive shaft;

(c) setting a target driving state of said engine that outputs energy corresponding to the target power set in said step (b), based on a specific condition of selecting a specific driving point that attains a highest possible efficiency among a plurality of available driving points of said engine that outputs energy corresponding to the target power, said [comprehensive] *highest possible* efficiency being calculated by multiplying an energy efficiency of said engine by a transmission efficiency of said energy adjustment means and said drive motor when the power output from said engine is subject to torque conversion and output to said drive shaft; and (d) controlling said engine, so as to enable said engine to be driven in the target driving state set in said step (c), and [for] controlling said energy adjustment means and said drive motor, so as to enable power output from said engine to be subjected to torque conversion and output as the target power to said drive shaft.

40. The method in accordance with claim 39, wherein said step (d) further comprises the steps of:

(e) detecting a driving state of said engine;

(f) when a state deviation of the driving state of said engine detected in said step (e) from the target driving state is out of a predetermined range, selecting a driving state within the predetermined range based on the state deviation and the specific condition and setting the selected driving state as a tentative target driving state; and (g) using the tentative target driving state set in said step (f) in place of the target driving state, in order to control said engine, said energy adjustment means, and said drive motor, until the state deviation enters the predetermined range.

41. The method in accordance with claim 39, wherein said step (d) further comprises the steps of:

(h) when a different target power is set, estimating a driving state of said engine based on a revolving speed of said output shaft of said engine and a state of said energy adjustment means; and (i) controlling said energy adjustment means and said drive motor so as to enable power output from said engine to be subjected to torque conversion and output to said drive shaft, based on the estimated driving state of said engine.

*42. A power output apparatus for outputting power to a drive shaft, said power output apparatus comprising:*

*an engine having an output shaft;*

*an energy adjustment system having a first shaft connected with said output shaft of said engine and a second shaft connected with said drive shaft, said energy adjustment system adjusting a difference in energy between one of power input into and power output from said first shaft and one of power input into and power output from said second shaft;*

*a drive motor, wherein power is transmitted between said drive motor and said drive shaft;*

*an accelerator used to set a target power output to said drive shaft;*

*a controller that sets a target driving state of said engine to output energy corresponding to the target power set by said accelerator, based on a predetermined condition; that controls said engine, so as to enable said engine to be driven in the target driving state; and that controls said energy adjustment system and said drive motor, so as to enable power output from said engine to be subjected to torque conversion and output as the target power to said drive shaft.*

*43. The power output apparatus in accordance with claim 42, wherein the predetermined condition used by said controller comprises a condition for enhancing an energy efficiency of said engine that outputs energy corresponding to the target power.*

*44. The power output apparatus in accordance with claim 42, wherein the predetermined condition used by said controller comprises a condition for enhancing a comprehensive efficiency, which is calculated by multiplying an energy efficiency of said engine that outputs energy corresponding to the target power by a transmission efficiency of said energy adjustment system and said drive motor when the power output from said engine is subjected to torque conversion and output to said drive shaft.*

*45. The power output apparatus in accordance with claim 42, wherein the predetermined condition used by said controller comprises a condition for continuously varying a driving state of said engine with a variation in target power.*

*46. The power output apparatus in accordance with claim 42, wherein said energy adjustment system comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.*

*47. A power output apparatus in accordance with claim 46, wherein said drive motor comprises said second rotor included in said twin-rotor motor and a stator for rotating said second rotor.*

*48. The power output apparatus in accordance with claim 46, wherein said first shaft comprises one end of said output shaft of said engine and said second shaft comprises one end of said drive shaft.*

*49. The power output apparatus in accordance with claim 42, wherein said energy adjustment system further comprises:*

*a three-shaft-type power input and output system connected with said first shaft, said second shaft, and a third shaft, said three shafts having a relationship such that, when one of powers input into and powers output from any two shafts among said three different shafts are determined, one of power input into and power output from a residual shaft is set automatically based on the powers thus determined; and*

*a shaft motor connected with said third shaft, wherein power is transmitted between said third shaft and said shaft motor.*

*50. The power output apparatus in accordance with claim 42, further comprising a driving state detecting system that detects a driving state of said engine,*

*wherein said controller controls said energy adjustment system, so as to enable said engine to be driven in the target driving state, based on the driving state of said engine detected by said driving state detecting system.*

*51. The power output apparatus in accordance with claim 50, wherein said driving state detecting system comprises a resolver used to measure a revolving speed of said drive shaft.*

*52. The power output apparatus in accordance with claim 42, further comprising a driving state detecting system that detects a driving state of said engine,*

*wherein said controller sets a tentative target driving state, such that when a state deviation of the driving state detected by said driving state detecting system from the target driving state is out of a predetermined range, the controller selects a driving state within the predetermined range based on the state deviation and the predetermined condition and sets the selected driving state as a tentative target driving state, said controller using the tentative target driving state in place of the target driving state for operation and control of said engine and control of said energy adjustment system and said drive motor, until the state deviation enters the predetermined range.*

*53. The power output apparatus in accordance with claim 52, wherein said controller sets a predetermined range based on the driving state detected by said driving state detecting system.*

*54. The power output apparatus in accordance with claim 52, wherein said controller controls said energy adjustment system, so as to enable said engine to be driven in the target driving state, based on the driving state detected by said*

*driving state detecting system, when the state deviation is within the predetermined range.*

*55. The power output apparatus in accordance with claim 52, further comprising a storage battery that is charged with electrical energy taken out of said energy adjustment system, that is charged with electrical energy taken out of said drive motor, that is discharged to release electrical energy used in said energy adjustment system, and that is discharged to release electrical energy used in said drive motor,*

*wherein, when the tentative target driving state is used in place of the target driving state for the operation and control of said engine and the control of said energy adjustment system and said drive motor, said controller utilizes one of the electrical energy stored into and released from said storage battery and controls said drive motor, so as to enable said drive motor to one of input and output a specific power one of into and from said drive shaft, said specific power corresponding to an energy difference between the target power and the power output from said engine that is driven in the tentative target driving state.*

*56. The power output apparatus in accordance with claim 42, wherein said controller estimates a driving state of said engine when said accelerator sets a different target power, and controls said energy adjustment system and said drive motor based on the estimated driving state of said engine.*

*57. The power output apparatus in accordance with claim 56, wherein said controller estimates the driving state of said engine based on a revolving speed of said output shaft of said engine and a state of said energy adjustment system.*

*58. The power output apparatus in accordance with claim 56, wherein said controller controls said energy adjustment system and said drive motor, so as to enable an estimated power output from said engine corresponding to the driving state of said engine estimated by said controller to be subjected to torque conversion and output as the target power of said drive shaft.*

*59. The power output apparatus in accordance with claim 56, further comprising a storage battery that is charged with electrical energy taken out of said energy adjustment system, that is charged with electrical energy taken out of said drive motor, that is discharged to release electrical energy used in said energy adjustment system, and that is discharged to release electrical energy used in said drive motor,*

*wherein said controller utilizes one of the electrical energy stored into and released from said storage battery and controls said drive motor, so as to enable said drive motor to one of input and output a specific power one of into and from said drive shaft, said specific power corresponding to an energy difference between the target power and the estimated power output from said engine corresponding to the driving state of said engine estimated by said controller.*

*60. A power output apparatus for outputting power to a drive shaft, said power output apparatus comprising:*

*an engine having an output shaft;*

*an energy adjustment system having a first shaft connected with said output shaft of said engine and a second shaft connected with said drive shaft, said energy adjustment system adjusting a difference in energy between one of power input into and power output from said first shaft and one of power input into and power output from said second shaft;*

*a drive motor, wherein power is transmitted between said drive motor and said output shaft of said engine;*

*an accelerator used to set a target power output to said drive shaft;*

*a controller that sets a target driving state of said engine to output energy corresponding to the target power set by said accelerator, based on a predetermined condition; that controls said engine, so as to enable said engine to be driven in the target driving state; and that controls said energy adjustment system and said drive motor, so as to enable power output from said engine to be subjected to torque conversion and output as the target power to said drive shaft.*

*61. The power output apparatus in accordance with claim 60, wherein the predetermined condition used by said controller comprises a condition for enhancing an energy efficiency of said engine that outputs energy corresponding to the target power.*

*62. The power output apparatus in accordance with claim 60, wherein the predetermined condition used by said controller comprises a condition for enhancing a comprehensive efficiency, which is calculated by multiplying an energy efficiency of said engine that outputs energy corresponding to the target power by a transmission efficiency of said energy adjustment system and said drive motor when the power output from said engine is subjected to torque conversion and output to said drive shaft.*

*63. The power output apparatus in accordance with claim 60, wherein the predetermined condition used by said controller comprises a condition for continuously varying a driving state of said engine with a variation in target power.*

*64. The power output apparatus in accordance with claim 60, wherein said energy adjustment system comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.*

*65. The power output apparatus in accordance with claim 64, wherein said drive motor comprises said first rotor included in said twin-rotor motor and a stator for rotating said first rotor.*

*66. The power output apparatus in accordance with claim 64, wherein said first shaft comprises one end of said output shaft of said engine and said second shaft comprises one end of said drive shaft.*

*67. The power output apparatus in accordance with claim 60, wherein said energy adjustment system further comprises:*

*a three-shaft-type power input and output system connected with said first shaft, said second shaft, and a third shaft, said three shafts having a relationship such that, when one of powers input into and powers output from any two shafts among said three different shafts are determined, one of power input into and power output from a residual shaft is automatically set based on the powers thus determined; and*

*a shaft motor connected with said third shaft, wherein power is transmitted between said third shaft and said shaft motor.*

*68. The power output apparatus in accordance with claim 60, further comprising a driving state detecting system that detects a driving state of said engine,*

*wherein said controller sets a tentative target driving state, such that when a state deviation of the driving state detected by said driving state detecting system*

*from the target driving state is out of a predetermined range, the controller selects a driving state within the predetermined range based on the state deviation and the predetermined condition and sets the selected driving state as a tentative target driving state, said controller using the tentative target driving state in place of the target driving state for operation and control of said engine and control of said energy adjustment system and said drive motor, until the state deviation enters the predetermined range.*

*69. The power output apparatus in accordance with claim 68, wherein said driving state detecting system comprises a resolver used to measure a revolving speed of said drive shaft.*

*70. The power output apparatus in accordance with claim 60, wherein said controller estimates a driving state of said engine when said accelerator sets a different target power, and*

*controls said energy adjustment system and said drive motor based on the estimated driving state of said engine.*

*71. The power output apparatus in accordance with claim 70, wherein said controller controls said energy adjustment system and said drive motor, so as to enable an estimated power output from said engine corresponding to the driving state of said engine estimated by said controller to be subjected to torque conversion and output as the target power to said drive shaft.*

*72. The power output apparatus in accordance with claim 70, further comprising a storage battery that is charged with electrical energy taken out of said energy adjustment system, that is charged with electrical energy taken out of said drive motor, that is discharged to release electrical energy used in said energy adjustment system, and that is discharged to release electrical energy used in said drive motor,*

*wherein said controller utilizes one of the electrical energy stored into and released from said storage battery and controls said drive motor, so as to enable said drive motor to one of input and output a specific power one of into and from said output shaft of said engine, said specific power corresponding to an energy difference between the target power and the estimated power output from said engine corresponding to the driving state of said engine estimated by said controller.*

*73. A driving system, comprising:*

*an engine having an output shaft;*

*an energy adjustment system having a first shaft connected with said output shaft of said engine and a second shaft connected with a drive shaft of said driving system, said energy adjustment system adjusting a difference in energy between one of power input into and power output from said first shaft and one of power input into and power output from said second shaft by regulating input and output of corresponding electrical energy;*

*a drive motor, wherein power is transmitted between said drive motor and said drive shaft;*

*an accelerator used to set a target power output to said drive shaft;*

*a controller that sets a target driving state of said engine to output energy corresponding to the target power set by said accelerator, based on a first condition for enhancing an energy efficiency of said engine that outputs energy corresponding to the target power and a second condition for making a vibration due to an operation of said engine out of a range of resonance frequency of said driving system; that controls said engine, so as to enable said engine to be driven in the target driving state; and that controls said energy adjustment system and said drive motor, so as to enable power output from said engine to be subjected to torque conversion and output as the target power to said drive shaft.*

*74. The driving system in accordance with claim 73, wherein said energy adjustment system comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.*

*75. The driving system in accordance with claim 74, wherein said drive motor comprises said second rotor included in said twin-rotor motor and a stator for rotating said second rotor.*

*76. The driving system in accordance with claim 74, wherein said first shaft comprises one end of said output shaft of said engine and said second shaft comprises one end of said drive shaft.*

*77. The driving system in accordance with claim 73, wherein said energy adjustment system further comprises:*

*a three-shaft-type power input and output system connected with said first shaft, said second shaft, and a third shaft, said three shafts having a relationship such that, when one of powers input into and powers output from any two shafts among said three different shafts are determined, one of power input into and power output from a residual shaft is automatically set based on the powers thus determined; and*

*a shaft motor connected with said third shaft, wherein power is transmitted between said third shaft and said shaft motor.*

*78. A driving system, comprising:*

*an engine having an output shaft;*

*an energy adjustment system having a first shaft connected with said output shaft of said engine and a second shaft connected with a drive shaft of said driving system, said energy adjustment system adjusting a difference in energy between one of power input into and power output from said first shaft and one of power input into and power output from said second shaft;*

*a drive motor, wherein power is transmitted between said drive motor and said output shaft of said engine;*

*an accelerator used to set a target power output to said drive shaft;*

*a controller that sets a target driving state of said engine to output energy corresponding to the target power set by said accelerator, based on a first condition for enhancing an energy efficiency of said engine that outputs energy corresponding to the target power and a second condition for making a vibration due to an operation of said engine out of a range of resonance frequency of said driving system; that controls said engine, so as to enable said engine to be driven in the target driving state; and that controls said energy adjustment system and said drive motor, so as to enable power output from said engine to be subjected to torque conversion and output as the target power to said drive shaft.*

*79. The driving system in accordance with claim 78, wherein said energy adjustment system comprises a twin-rotor motor comprising a first rotor connected with said first shaft and a second rotor connected with said second shaft, said second rotor being rotatable relative to said first rotor, whereby power is transmitted between said first shaft and said second shaft via an electromagnetic coupling of said first rotor with said second rotor, said twin-rotor motor inputting and outputting electrical energy based on the electromagnetic coupling of said first rotor with said second rotor and a difference in revolving speed between said first rotor and said second rotor.*

*80. The driving system in accordance with claim 79, wherein said drive motor comprises said first rotor included in said twin-rotor motor and a stator for rotating said first rotor.*

*81. The driving system in accordance with claim 79, wherein said first shaft comprises one end of said output shaft of said engine and said second shaft comprises one end of said drive shaft.*

*82. The driving system in accordance with claim 78, wherein said energy adjustment system further comprises:*

*a three-shaft-type power input and output system connected with said first shaft, said second shaft, and a third shaft, said three shafts having a relationship such that, when one of powers input into and powers output from any two shafts among said three different shafts are determined, one of power input into and power output from a residual shaft is automatically set based on the powers thus determined; and*

*a shaft motor connected with said third shaft, wherein power is transmitted between said third shaft and said shaft motor.*

*83. A method of controlling a power output apparatus for outputting power to a drive shaft, said method comprising the steps of:*

*(a) providing an engine having an output shaft; an energy adjustment system having a first shaft connected with said output shaft of said engine and a second shaft connected with said drive shaft said energy adjustment system adjusting a difference in energy between one of power input into and power output from said first shaft and one of power input into and power output from said second shaft; and a drive motor, wherein power is transmitted between said drive motor and said drive shaft;*

*(b) setting a target power output to said drive shaft;*

*(c) setting a target driving state of said engine to output energy corresponding to the target power set in said step (b), based on a specific condition of selecting a specific driving point that attains a highest possible efficiency among a plurality of available driving points of said engine that outputs energy corresponding to the target power; and*

*(d) controlling said engine, so as to enable said engine to be driven in the target driving state set in said step (c), and controlling said energy adjustment system and said drive motor, so as to enable power output from said engine to be subjected to torque conversion and output as the target power to said drive shaft.*

*84. The method in accordance with claim 83, wherein said step (d) further comprises the steps of:*

*(e) detecting a driving state of said engine;*

*(f) when a state deviation of the driving state of said engine detected in said step (e) from the target driving state is out of a predetermined range, selecting a driving state within the predetermined range based on the state deviation and the specific condition and setting the selected driving state as a tentative target driving state; and*

*(g) using the tentative target driving state set in said step (f) in place of the target driving state, in order to control said engine, said energy adjustment system, and said drive motor, until the state deviation enters the predetermined range.*

*85. The method in accordance with claim 83, wherein said step (d) further comprises the steps of:*

*(h) when a different target power is set, estimating a driving state of said engine based on a revolving speed of said output shaft of said engine and a state of said energy adjustment system; and*

*(i) controlling said energy adjustment system and said drive motor, so as to enable power output from said engine to be subjected to torque conversion and output to said drive shaft, based on the estimated driving state of said engine.*

*86. A method of controlling a power output apparatus for outputting power to a drive shaft, said method comprising the steps of:*

*(a) providing an engine having an output shaft; an energy adjustment system having a first shaft connected with said output shaft of said engine and a second shaft connected with said drive shaft, said energy adjustment system adjusting a difference in energy between one of power input into and power output from said first shaft and one of power input into and power output from said second shaft; and a drive motor, wherein power is transmitted between said drive motor and said drive shaft;*

*(b) setting a target power output to said drive shaft;*

*(c) setting a target driving state of said engine to output energy corresponding to the target power set in said step (b), based on a specific condition of selecting a specific driving point that attains a highest possible efficiency among a plurality of available driving points of said engine that outputs energy corresponding to the target power, said highest possible efficiency being calculated by multiplying an energy efficiency of said engine by a transmission efficiency of said energy adjustment system and said drive motor when the power output from said engine is subject to torque conversion and output to said drive shaft; and*

*(d) controlling said engine, so as to enable said engine to be driven in the target driving state set in said step (c), and controlling said energy adjustment system, and said drive motor, so as to enable power output from said engine to be subjected to torque conversion and output as the target power to said drive shaft.*

*87. The method in accordance with claim 86, wherein said step (d) further comprises the steps of:*

*(e) detecting a driving state of said engine;*

*(f) when a state deviation of the driving state of said engine detected in said step (e) from the target driving state is out of a predetermined range, selecting a driving state within the predetermined range based on the state deviation and the specific condition and setting the selected driving state as a tentative target driving state; and*

*(g) using the tentative target driving state set in said step (f) in place of the target driving state, in order to control said engine, said energy adjustment system, and*

*said drive motor, until the state deviation enters the predetermined range.*

*88. The method in accordance with claim 86, wherein said step (d) further comprises the steps of:*

*(h) when a different target power is set, estimating a driving state of said engine based on a revolving speed of said output shaft of said engine and a state of said energy adjustment system; and*

*(i) controlling said energy adjustment system and said drive motor so as to enable power output from said engine to be subjected to torque conversion and output to said drive shaft, based on the estimated driving state of said engine.*

*89. A power output apparatus for outputting power to a drive shaft, said power output apparatus comprising:*

*an engine having an output shaft;*

*an energy adjustment system having a twin-rotor motor, said twin-rotor motor comprising a first rotor connected with said output shaft of said engine and a second rotor connected with said drive shaft, said energy adjustment system adjusting a difference in energy between one of power input into and power output from said first rotor and one of power input into and power output from said second rotor by regulating input and output of corresponding electrical energy;*

*a drive motor, wherein power is transmitted between said drive motor and said drive shaft;*

*an accelerator used to set a target power output to said drive shaft;*

*a controller that sets a target driving state of said engine to output energy corresponding to the target power set by said accelerator, based on a predetermined condition; that controls said engine, so as to enable said engine to be driven in the target driving state; and that controls said energy adjustment system and said drive motor, so as to enable power output from said engine to be subjected to torque conversion and output as the target power to said drive shaft.*

*90. A power output apparatus for outputting power to a drive shaft, said power output apparatus comprising:*

*an engine having an output shaft;*

*an energy adjustment system having a twin-rotor motor, said twin-rotor motor comprising a first rotor connected with said output shaft of said engine and a second rotor connected with said drive shaft, said energy adjustment system adjusting a difference in energy between one of power input into and power output from said first rotor and one of power input into and power output from said second rotor by regulating input and output of corresponding electrical energy;*

*a drive motor, wherein power is transmitted between said drive motor and said output shaft of said engine;*

*an accelerator used to set a target power output to said drive shaft;*

*a controller that sets a target driving state of said engine to output energy corresponding to the target power set by said accelerator, based on a predetermined condition; that controls said engine, so as to enable said engine to be driven in the target driving state; and that controls said energy adjustment system and said drive motor, so as to enable power output from said engine to be subjected to torque conversion and output as the target power to said drive shaft.*

*91. The power output apparatus in accordance with claim 5, wherein said first shaft comprises one end of said output shaft of said engine and said second shaft comprises one end of said drive shaft.*

*92. The power output apparatus in accordance with claim 21, wherein said first shaft comprises one end of said output shaft of said engine and said second shaft comprises one end of said driver shaft.*

*93. The driving system in accordance with claim 29, wherein said first shaft comprises one end of said output shaft of said engine and said second shaft comprises one end of said drive shaft.*

*94. The driving system in accordance with claim 33, wherein said first shaft comprises one end of said output shaft of said engine and said second shaft comprises one end of said drive shaft.*

*95. A method of controlling a power output apparatus for outputting power to a drive shaft, said method comprising the steps of:*

*(a) providing an engine having an output shaft; an energy adjustment system having a first shaft connected with said output shaft of said engine and a second shaft connected with said drive shaft, said energy adjustment system adjusting a difference in energy between one of power input into and power output from said first shaft and one of power input into and power output from said second shaft; and a drive motor, wherein power is transmitted between said drive motor and said output shaft of said engine;*

*(b) setting a target power output to said drive shaft;*

*(c) setting a target driving state of said engine to output energy corresponding to the target power set in said step (b), based on a predetermined condition; and*

*(d) controlling said engine, so as to enable said engine to be driven in the target driving state set in said step (c), and controlling said energy adjustment system and said drive motor, so as to enable power output from said engine to be subjected to torque conversion and output as the target power to said drive shaft.*

*96. A method of controlling a driving system, said method comprising the steps of:*

*(a) providing an engine having an output shaft; an energy adjustment system having a first shaft connected with said output shaft of said engine and a second shaft connected with a drive shaft of said driving system, said energy adjustment system adjusting a difference in energy between one of power input into and power output from said first shaft and one of power input into and power output from said second shaft; and a drive motor, wherein power is transmitted between said drive motor and said output shaft of said engine;*

*(b) setting a target power output to said drive shaft;*

*(c) setting a target driving state of said engine to output energy corresponding to the target power set in said step (b), based on a first condition for enhancing an energy efficiency of said engine that outputs energy corresponding to the target power and a second condition for making a vibration due to an operation of said engine out of a range of resonance frequency of said driving system; and*

*(d) controlling said engine, so as to enable said engine to be driven in the target driving state set in said step (c), and for controlling said energy adjustment system and said drive motor, so as to enable power output from said engine to be subjected to torque conversion and output as the target power to said drive shaft.*

* * * * *